United States Patent
Hraha

(10) Patent No.: US 12,480,956 B2
(45) Date of Patent: Nov. 25, 2025

(54) CONTROLLING INTERSAMPLE ANALYTE VARIABILITY IN COMPLEX BIOLOGICAL MATRICES

(71) Applicant: SomaLogic Operating Co., Inc., Boulder, CO (US)

(72) Inventor: Thomas Hraha, Boulder, CO (US)

(73) Assignee: SomaLogic Operating Co., Inc., Boulder, CO (US)

( * ) Notice: Subject to any disclaimer, the term of this patent is extended or adjusted under 35 U.S.C. 154(b) by 1029 days.

(21) Appl. No.: 17/610,927

(22) PCT Filed: May 15, 2020

(86) PCT No.: PCT/US2020/033033
§ 371 (c)(1),
(2) Date: Nov. 12, 2021

(87) PCT Pub. No.: WO2020/236544
PCT Pub. Date: Nov. 26, 2020

(65) Prior Publication Data
US 2022/0260585 A1    Aug. 18, 2022

Related U.S. Application Data

(60) Provisional application No. 62/849,212, filed on May 17, 2019.

(51) Int. Cl.
*G01N 33/68* (2006.01)
*G01N 33/50* (2006.01)
*G16C 20/20* (2019.01)

(52) U.S. Cl.
CPC ......... *G01N 33/6848* (2013.01); *G01N 33/50* (2013.01); *G16C 20/20* (2019.02)

(58) Field of Classification Search
CPC .... G01N 33/48; G01N 33/50; G01N 33/6848; G16C 20/20
See application file for complete search history.

(56) References Cited

U.S. PATENT DOCUMENTS

| | | | |
|---|---|---|---|
| 2007/0043518 A1 | 2/2007 | Nicholson et al. | |
| 2009/0098549 A1 | 4/2009 | Schneider et al. | |
| 2010/0049444 A1* | 2/2010 | Likuski | G01N 33/721 702/19 |

(Continued)

FOREIGN PATENT DOCUMENTS

| | | |
|---|---|---|
| JP | 2013528379 A | 7/2013 |
| WO | 2011146143 A2 | 11/2011 |
| WO | 2016/161022 A8 | 10/2016 |

OTHER PUBLICATIONS

International Search Report and Written Opinion issued in International Application No. PCT/US2020/033033, mailed Aug. 20, 2020, 14 pages.

(Continued)

*Primary Examiner* — Loren C Edwards
(74) *Attorney, Agent, or Firm* — McNeill PLLC

(57) ABSTRACT

Described herein are compositions and methods for normalizing the variability of inter-sample analyte measurements from a biological matrix. In some embodiments, the present disclosure relates to methods for normalizing the levels of one or more proteins from urine as measured by an aptamer based assay.

20 Claims, 53 Drawing Sheets

Exemplary method 1

(56) References Cited

U.S. PATENT DOCUMENTS

2012/0142554 A1* 6/2012 Zhang .................. G01N 33/543
506/13
2016/0348112 A1 12/2016 Ochsner et al.

OTHER PUBLICATIONS

Middleton et al., "Assessing urinary flow rate, creatinine, osmolality and other hydration adjustment methods for urinary biomonitoring using NHANES arsenic, iodine, lead and cadmium data," Environmental Health 15(68), 14 pages (2016).
Taylor et al., "Overcoming the Effects of Matric Interference in the Measurement of Urine Protein Analytes," Biomarker Insights 7:1-8 (2012).
Kitayama et al., "Development of the Computerized Data-processing System for Antibody Measurement by ELISA," Report of Chiba Prefectural Institute of Public Health vol. 12, pp. 41-44 (1988), Brief report, and English translation.
Morita et al., "Detection of Antibody to Rubella Virus by ELISA with Protein-G and Monoclonal Antibody," Clinical and Viral 19(2):135-154 (1991), and English translation.
Harada et al. "Potency Comparison Using Parallel Line Assay (Straight Line and Sigmoid Curve," Publication of the 21st Regular Meeting of the Japanese Society for Biopharmaceutical Statistics, Nov. 18, 2017, pp. 1-16 (online), with English translation.

* cited by examiner

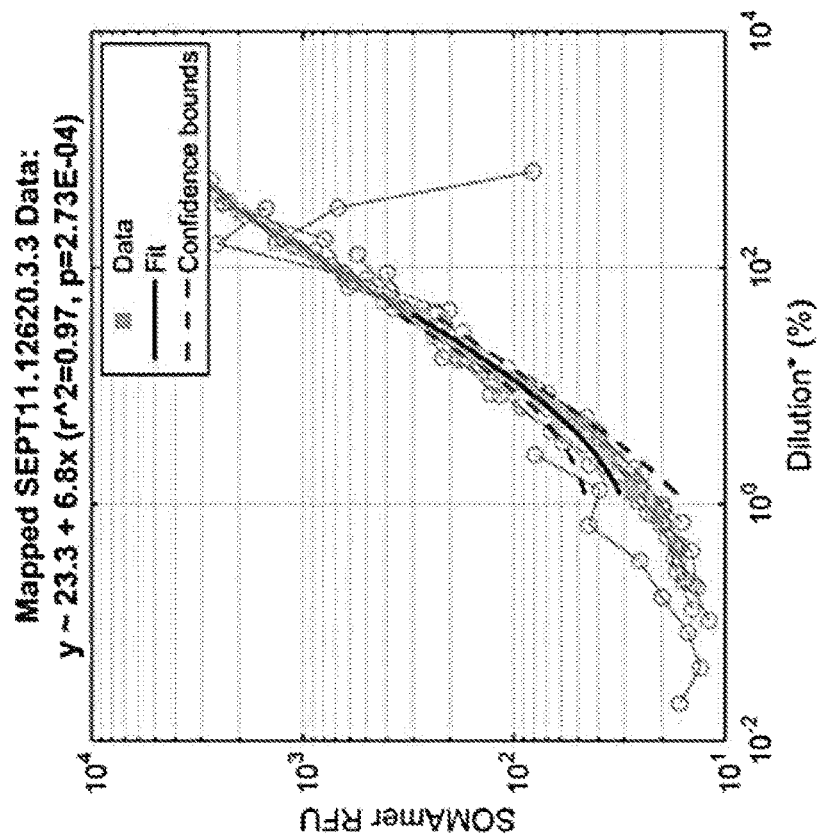
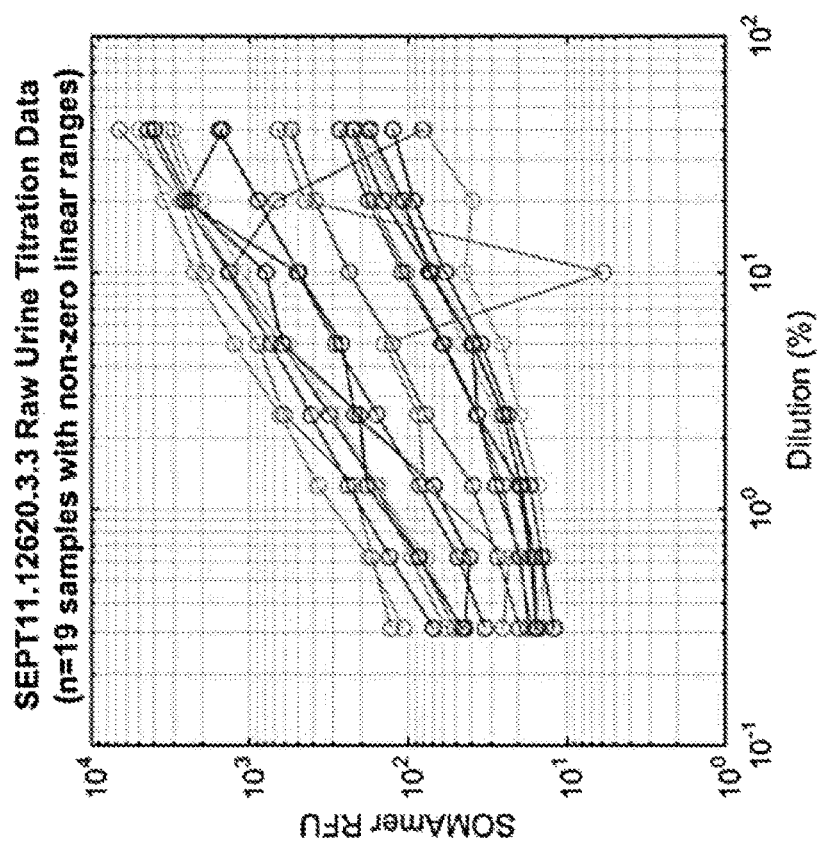
Fig. 7B
Fig. 7A

Participant 6

Participant 6

Participant 8

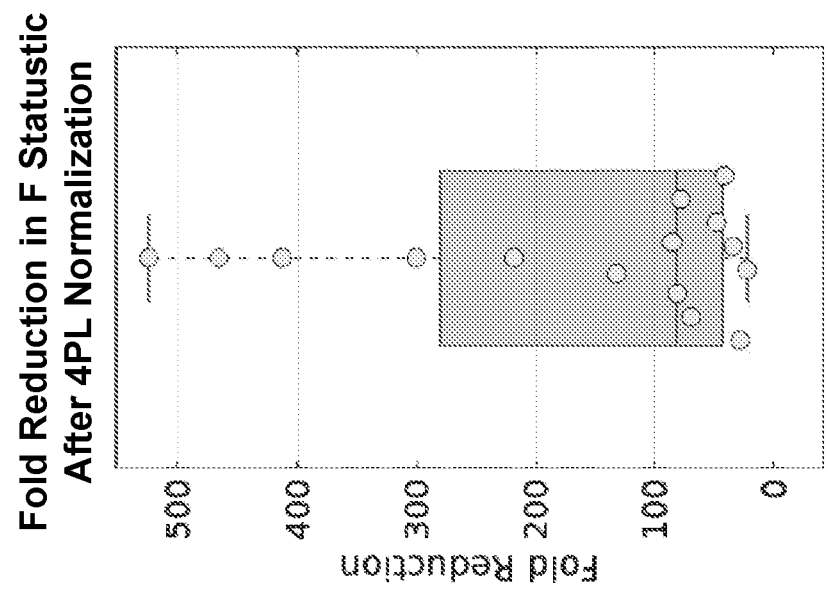
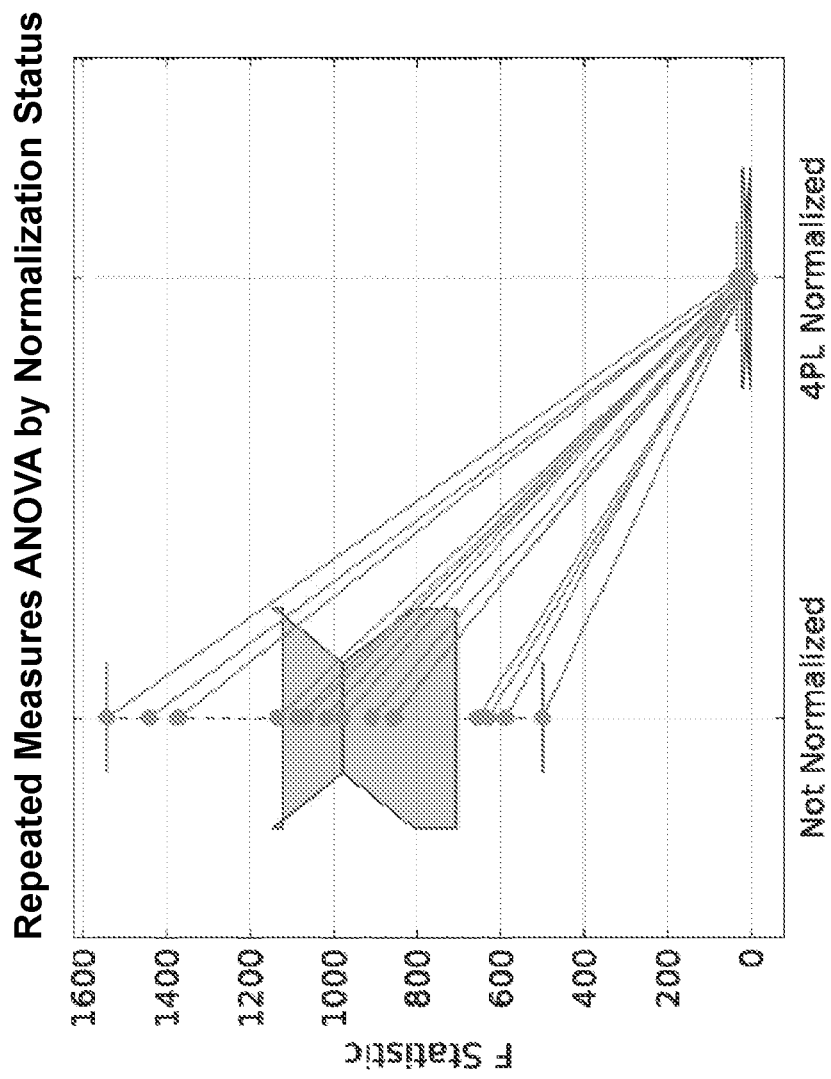
Fig. 17A
Fig. 17B

CONTROLLING INTERSAMPLE ANALYTE VARIABILITY IN COMPLEX BIOLOGICAL MATRICES

CROSS-REFERENCE TO RELATED APPLICATIONS

This application is a national phase entry pursuant to 35 U.S.C. § 371 of International Application No. PCT/US2020/033033, filed May 15, 2020, which claims the benefit of priority of U.S. Provisional Application No. 62/849,212, filed May 17, 2019, each of which is incorporated by reference herein in its entirety for any purpose.

FIELD

The present disclosure relates generally to controlling variability of inter-sample analyte measurements from a biological matrix. In some embodiments, the present disclosure relates to methods for controlling the levels of one or more proteins from a urine sample as measured by an aptamer based assay.

BACKGROUND

Inter-sample variability of analyte measurement in biological samples is a problem for biomarker discovery, metabolic analyses, gene expression analysis, protein pathway analysis, and diagnostic and prognostic tools, particularly when the outcome relies on quantitative biological signals that differ by a relatively small magnitude. Biological sample types that exhibit high between-sample variability are a primary challenge of working with these sample types. Controlling for such variability would provide for more consistent and meaningful datasets for experimental and clinical applications.

Therefore, there continues to be a need for alternative compositions and methods for controlling inter-sample analyte measurement variability in biological matrices. The present disclosure meets such needs by providing novel compositions and methods for normalizing biological signals in complex matrices, which reduce, minimize, or remove such variability.

SUMMARY

Embodiment 1. A method for generating a composite dilution model, the method comprising:
  a) determining the level of an analyte in a first dilution series of a first biological sample comprising the analyte, wherein the first dilution series comprises at least three (3) different dilutions, and the level of the analyte is determined in each of the at least three different dilutions;
  b) determining the levels of the analyte in a second dilution series of a second biological sample comprising the analyte, wherein the second dilution series comprises at least three (3) different dilutions, and the level of the analyte is determined in each of the at least three different dilutions;
  c) generating a model based on the levels of the analyte of the first dilution series;
  d) selecting a reference value, wherein the reference value is selected from:
    (i) a second dilution series reference value that is an analyte level at a specific dilution of the second dilution series;
    (ii) a model reference value that is an analyte level at a specific dilution of the model; and
    (iii) an arbitrary reference value that is an analyte level at a specific dilution, wherein the analyte level at that specific dilution is not found in the second dilution series or the model;
  e) performing at least one horizontal translation, wherein the at least one horizontal translation is selected from:
    (i) a horizontal translation ($\Delta X$) of the second dilution series reference value to a model value, wherein the model value is an analyte level at a specific dilution of the model, wherein the second dilution series reference value and the model value are equivalent or substantially equivalent;
    (ii) a horizontal translation ($\Delta X$) of the model reference value to a second dilution series value, wherein the second dilution series value is an analyte level at a specific dilution of the second dilution series, wherein the model reference value and the second dilution series value are equivalent or substantially equivalent; and
    (iii) horizontal translations of a second dilution series value ($\Delta X$) and a model value ($\Delta Y$) to the arbitrary reference value, wherein the model value is an analyte level at a specific dilution of the model, wherein the second dilution series value is an analyte level at a specific dilution of the second dilution series, and wherein the second dilution series value, the model value and the arbitrary reference value are equivalent or substantially equivalent;
  f) performing the at least one horizontal translation of the remaining values in (i) the second dilution series, (ii) the model, or (iii) the second dilution series and the model, wherein the horizontal translations of the remaining values results in a lined composite translation; and
  g) fitting a function to the lined composite translation series thereby forming a composite dilution model.

Embodiment 2. The method of embodiment 1, wherein the method comprises:
  d) selecting a second dilution series reference value that is an analyte level at a specific dilution of the second dilution series;
  e) performing a horizontal translation ($\Delta X$) of the second dilution series reference value to a model value, wherein the model value is an analyte level at a specific dilution of the model, wherein the second dilution series reference value and the model value are equivalent or substantially equivalent; and
  f) performing the horizontal translation of the remaining values in the second dilution series, wherein the horizontal translation of the remaining values results in a lined composite translation.

Embodiment 3. The method of embodiment 1, wherein the method comprises:
  d) selecting a model reference value that is an analyte level at a specific dilution of the model;
  e) performing a horizontal translation ($\Delta X$) of the model reference value to a second dilution series value, wherein the second dilution series value is an analyte level at a specific dilution of the second dilution series, wherein the model reference value and the second dilution series value are equivalent or substantially equivalent; and f) performing the horizontal translation of the remaining values in the model, wherein the horizontal translation of the remaining values results in a lined composite translation.

Embodiment 4. The method of embodiment 1, wherein the method comprises:
  d) selecting an arbitrary reference value that is an analyte level at a specific dilution, wherein the analyte level at that specific dilution is not found in the second dilution series or the model;
  e) performing a horizontal translation of a second dilution series value ($\Delta X$) and a model value ($\Delta Y$) to the arbitrary reference value, wherein the model value is an analyte level at a specific dilution of the model, wherein the second dilution series value is an analyte level at a specific dilution of the second dilution series, and wherein the second dilution series value, the model value and the arbitrary reference value are equivalent or substantially equivalent; and
  f) performing the horizontal translations of the remaining values in the second dilution series and the model, wherein the horizontal translations of the remaining values results in a lined composite translation.

Embodiment 5. A method for generating a composite dilution model, the method comprising:
  a) determining the level of an analyte in a first dilution series of a first biological sample comprising the analyte, wherein the first dilution series comprises at least three (3) different dilutions, and the level of the analyte is determined in each of the at least three different dilutions;
  b) determining the levels of the analyte in a second dilution series of a second biological sample comprising the analyte, wherein the second dilution series comprises at least three (3) different dilutions, and the level of the analyte is determined in each of the at least three different dilutions;
  c) generating a model based on the levels of the analyte of the first dilution series;
  d) performing at least one horizontal translation, wherein the at least one horizontal translation is selected from:
    (i) a horizontal translation ($\Delta X$) of the second dilution series to the model;
    (ii) a horizontal translation ($\Delta X$) of the model to the second dilution series; and
    (iii) horizontal translations of the second dilution series ($\Delta X$) and the model ($\Delta Y$) to an arbitrary reference value, wherein the arbitrary reference value is an analyte level at a specific dilution, wherein the analyte level at that specific dilution is not found in the second dilution series or the model, wherein the at least one horizontal translation results in a lined composite translation series; and
  e) fitting a function to the lined composite translation series thereby forming a composite dilution model.

Embodiment 6. The method of embodiment 5, wherein the method comprises performing a horizontal translation ($\Delta X$) of the second dilution series to the model.

Embodiment 7. The method of embodiment 5, wherein the method comprises performing a horizontal translation ($\Delta X$) of the model to the second dilution series.

Embodiment 8. The method of embodiment 5, wherein the method comprises performing a horizontal translation of the second dilution series ($\Delta X$) and the model ($\Delta Y$) to an arbitrary reference value that is an analyte level at a specific dilution, wherein the analyte level at that specific dilution is not found in the second dilution series or the model.

Embodiment 9. A method for generating a composite dilution model, the method comprising:
  a) determining the level of an analyte in a first dilution series of a first biological sample comprising the analyte, wherein the first dilution series comprises at least three (3) different dilutions, and the level of the analyte is determined in each of the at least three different dilutions;
  b) determining the levels of the analyte in a second dilution series of a second biological sample comprising the analyte, wherein the second dilution series comprises at least three (3) different dilutions, and the level of the analyte is determined in each of the at least three different dilutions;
  c) selecting a reference value, wherein the reference value is selected from:
    (i) a second dilution series reference value that is an analyte level at a specific dilution of the second dilution series; and
    (ii) an arbitrary reference value that is an analyte level at a specific dilution, wherein the analyte level at that specific dilution is not found in the first dilution series or the second dilution series;
  d) performing at least one horizontal translation, wherein the at least one horizontal translation is selected from:
    (i) a horizontal translation ($\Delta X$) of the second dilution series reference value to a first dilution series value, wherein the first dilution series value is an analyte level at a specific dilution of the first dilution series, wherein the second dilution series reference value and the first dilution series value are equivalent or substantially equivalent; and
    (ii) horizontal translations of the first dilution series ($\Delta X$) and the second dilution series ($\Delta Y$) to the arbitrary reference value;
  wherein the at least one horizontal translation results in a lined composite translation series; and
  e) fitting a function to the lined composite translation series thereby forming a composite dilution model.

Embodiment 10. The method of embodiment 9, wherein the method comprises performing a horizontal translation ($\Delta X$) of the second dilution series to the first dilution series.

Embodiment 11. The method of embodiment 9, wherein the method comprises horizontal translations of the first dilution series ($\Delta X$) and the second dilution series ($\Delta Y$) to an arbitrary reference value, wherein the arbitrary reference value is an analyte level at a specific dilution, wherein the analyte level at that specific dilution is not found in the first dilution series or the second dilution series.

Embodiment 12. A method for generating a composite dilution model, the method comprising:
  a) determining the level of an analyte in a first dilution series of a first biological sample comprising the analyte, wherein the first dilution series comprises at least three (3) different dilutions, and the level of the analyte is determined in each of the at least three different dilutions;
  b) determining the levels of the analyte in a second dilution series of a second biological sample comprising the analyte, wherein the second dilution series comprises at least three (3) different dilutions, and the level of the analyte is determined in each of the at least three different dilutions;
  c) performing at least one horizontal translation, wherein the at least one horizontal translation is selected from:
    (i) a horizontal translation ($\Delta X$) of the second dilution series to the first dilution series; and (ii) horizontal translations of the first dilution series ($\Delta X$) and the second dilution series ($\Delta Y$) to an arbitrary reference value, wherein the arbitrary reference value is an analyte level at a specific dilution, wherein the analyte level at that specific dilution is not found in the first dilution series or the second dilution series;

wherein the at least one horizontal translation results in a lined composite translation series; and d) fitting a function to the lined composite translation series thereby forming a composite dilution model.

Embodiment 13. The method of embodiment 12, wherein the method comprises performing a horizontal translation ($\Delta X$) of the second dilution series to the first dilution series.

Embodiment 14. The method of embodiment 12, wherein the method comprises horizontal translations of the first dilution series ($\Delta X$) and the second dilution series ($\Delta Y$) to an arbitrary reference value, wherein the arbitrary reference value is an analyte level at a specific dilution, wherein the analyte level at that specific dilution is not found in the first dilution series or the second dilution series.

Embodiment 15. A method for generating a composite dilution model, the method comprising:
a) determining the level of an analyte in a first dilution series of a first biological sample comprising the analyte, wherein the first dilution series comprises at least three (3) different dilutions, and the level of the analyte is determined in each of the at least three different dilutions;
b) determining the levels of the analyte in a second dilution series of a second biological sample comprising the analyte, wherein the second dilution series comprises at least three (3) different dilutions, and the level of the analyte is determined in each of the at least three different dilutions;
c) generating a first model based on the levels of the analyte of the first dilution series and a second model based on the levels of the analyte of the second dilution series;
d) selecting a reference value, wherein the reference value is selected from:
(i) a first model reference value that is an analyte level at a specific dilution of the first model; and
(ii) an arbitrary reference value that is an analyte level at a specific dilution, wherein the analyte level at that specific dilution is not found in the first model or the second model;
d) performing at least one horizontal translation, wherein the at least one horizontal translation is selected from:
(i) a horizontal translation ($\Delta X$) of the first model to the second model; and
(ii) horizontal translations of the first model ($\Delta X$) and the second model ($\Delta Y$) to the arbitrary reference value; and
wherein the horizontal translation result in a lined composite translation series; and
e) fitting a function to the lined composite translation series thereby forming a composite dilution model.

Embodiment 16. The method of embodiment 15, wherein the method comprises performing a horizontal translation ($\Delta X$) of the first model to the second model.

Embodiment 17. The method of embodiment 15, wherein the method comprises horizontal translations of the first model ($\Delta X$) and the second model ($\Delta Y$) to the arbitrary reference value.

Embodiment 18. A method for generating a composite dilution model, the method comprising:
a) determining the level of an analyte in a first dilution series of a first biological sample comprising the analyte, wherein the first dilution series comprises at least three (3) different dilutions, and the level of the analyte is determined in each of the at least three different dilutions;
b) determining the levels of the analyte in a second dilution series of a second biological sample comprising the analyte, wherein the second dilution series comprises at least three (3) different dilutions, and the level of the analyte is determined in each of the at least three different dilutions;
c) generating a first model based on the levels of the analyte of the first dilution series and a second model based on the levels of the analyte of the second dilution series;
d) performing at least one horizontal translation, wherein the at least one horizontal translation is selected from:
(i) a horizontal translation ($\Delta X$) of the first model to the second model; and
(ii) horizontal translations of the first model ($\Delta X$) and the second model ($\Delta Y$) to an arbitrary reference value, wherein the analyte level at that specific dilution is not found in the first model or the second model; and wherein the horizontal translation result in a lined composite translation series; and
e) fitting a function to the lined composite translation series thereby forming a composite dilution model.

Embodiment 19. The method of embodiment 18, wherein the method comprises performing a horizontal translation ($\Delta X$) of the first model to the second model.

Embodiment 20. The method of embodiment 18, wherein the method comprises horizontal translations of the first model ($\Delta X$) and the second model ($\Delta Y$) to an arbitrary reference value.

Embodiment 21. The method of any one of the preceding embodiments, wherein the level of the analyte is determined in each of at least 4, 5, 6, 7, 8, 9, 10, 11, 12, 13, 14, 15 or 16 different dilutions in the first dilution series.

Embodiment 22. The method of any one of the preceding embodiments, wherein the level of the analyte is determined in each of at least 8 different dilutions.

Embodiment 23. The method of any one of the preceding embodiments, wherein the level of the analyte is determined in each of at least 4, 5, 6, 7, 8, 9, 10, 11, 12, 13, 14, 15 or 16 different dilutions in the second dilution series.

Embodiment 24. The method of any one of the preceding embodiments, wherein the level of the analyte is determined in each of at least 8 different dilutions in the second dilution series.

Embodiment 25. The method of any one of the preceding embodiments, wherein each model is independently selected from a linear regression model, a LOESS curve fitting model, a non-linear regression model, a spline fit model, a mixed effects regression model, a fixed effects regression model, a generalized linear model, a matrix decomposition model, and a four parameter logistic regression (4PL) model, Embodiment 26. The method of any one of the previous embodiments, wherein the level of the analyte is the relative amount of the analyte or the analyte concentration.

Embodiment 27. The method of any one of the preceding embodiments, wherein the selected reference value is within the linear range of the dilution series or model.

Embodiment 28. The method of embodiment 21, wherein the selected reference value is the center point of the linear range.

Embodiment 29. The method of any one of the preceding embodiments, wherein the first and second biological samples comprise urine or are derived from urine.

Embodiment 30. The method of any one of the preceding embodiments, wherein the first and second biological samples are collected from the same subject.

Embodiment 31. The method of any one of the preceding embodiments, wherein the first and second biological samples are collected from different subjects.

Embodiment 32. The method of embodiment 31, wherein the first biological sample is collected at a first time point and the second biological sample is collected at a second time point.

Embodiment 33. The method of embodiment 32, wherein the first time point and the second time point differ by at least about 0.5 hours, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 36 hours, 48 hours, 60 hours or 72 hours.

Embodiment 34. The method of any one of the preceding embodiments, wherein the level of the analyte is measured by an assay the uses an aptamer, antibody, mass spectrophotometer or a combination thereof.

Embodiment 35. The method of any one of preceding embodiments, wherein the dilution factor for each of the first dilution series and second dilution series is a constant dilution factor.

Embodiment 36. The method of any one of any one of the preceding embodiments, wherein the dilution factor for each of the first dilution series and the second dilutions series is at least a two-fold, a three-fold, a four-fold, a five-fold, a six-fold, a seven-fold, an eight-fold, a nine-fold, a ten-fold dilution.

Embodiment 37. The method of any one of embodiments 1 to 35, wherein the dilution factor for each of the first dilution series and the second dilutions series is an exponential or logarithmic dilution factor.

Embodiment 38. The method of any one of the preceding embodiments, wherein the first biological sample and the second biological sample are the same type of biological sample.

Embodiment 39. The method of any one of embodiments 1 to 35, wherein the first dilution series and the second dilution series are each at least a 5-point serial titration at at least a 1:2 titration factor.

Embodiment 40. The method of any one of the preceding embodiments, wherein the method further comprises horizontally translating the level of at least one analyte from a biological test sample to the composite dilution model for the at least one analyte, thereby determining the relative dilution of the biological test sample.

Embodiment 41. The method of embodiment 40, wherein the biological test sample and the first and second biological samples used to form the composite dilution model are the same sample type.

Embodiment 42. The method of embodiment 40 or embodiment 41, wherein the biological test sample and the first and second biological samples used to form the composite dilution model are urine samples or are derived from urine samples.

Embodiment 43. A method for determining a relative dilution of a biological test sample from a subject, the method comprising horizontally translating the level of at least one analyte from a biological test sample to a composite dilution model developed for the at least one analyte, thereby determining the relative dilution of the biological test sample from the subject.

Embodiment 44. The method of any one of embodiments 40 to 43, comprising horizontally translating the level of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 50, at least 75, at least 100, at least 150, or at least 200 different analytes from the biological test sample to the respective composite dilution model developed for each of the different analytes to determine the relative dilution of the biological test sample for each of the different analytes, and using the relative dilution for each of the different analytes to determine the relative dilution of the biological test sample.

Embodiment 45. The method of embodiment 44, wherein the relative dilution of the biological test sample is derived from the central tendency of the relative dilutions of each of the different analytes.

Embodiment 46. The method of embodiment 44 or embodiment 45, wherein the relative dilution of the biological test sample is derived from the median, mean or mode of the relative dilutions of each of the different analytes.

Embodiment 47. The method of any one of embodiments 43 to 46, wherein the composite dilution model was developed using the method of any one of embodiments 1 to 42.

Embodiment 48. The method of any one of embodiments 43 to 48, wherein the biological test sample and the samples used to develop the composite dilution model are the same sample type.

Embodiment 49. The method of embodiment 41, wherein the biological test sample and the samples used to develop the composite dilution model are urine samples or derived from urine samples.

Embodiment 50. The method of any one of embodiments 40 to 49, further comprising calculating the relative dilution of the biological test sample with the derived relative dilution factor.

Embodiment 51. The method of any one of the preceding embodiments, wherein each analyte is a target protein.

Embodiment 52. A computer system, comprising:
a non-transitory memory storing instructions; and
one or more hardware processors coupled to the non-transitory memory and configured to read the instructions from the non-transitory memory to cause the computer system to perform operations comprising:
  receiving analyte measurement data from a plurality of different biological samples;
  analyzing respective analyte measurements for each one of a plurality of selected analytes in the analyte measurement data; and
  generating a composite dilution model for each one of the selected analytes based on the analyzing.

Embodiment 53. The computer system of embodiment 52, wherein the analyzing comprises:
determining, for each selected analyte, the biological sample with the greatest linear dilution range.

Embodiment 54. The computer system of embodiment 53, wherein the analyzing further comprises:
generating, for each selected analyte, a reference dilution model based on the determined greatest linear range for the respective selected analyte.

Embodiment 55. The computer system of embodiment 54, wherein the analyzing further comprises:

translating, for each selected analyte, the analyte measurement data associated with the respective selected analyte based on the reference dilution model generated for the respective selected analyte.

Embodiment 56. The computer system of any one of embodiments 52 to 55, wherein the biological samples are urine samples.

Embodiment 57. The computer system of any one of embodiments 52 to 56, wherein the analyte measurement data comprises relative fluorescence unit (RFU) measurements.

Embodiment 58. A non-transitory computer-readable medium comprising computer-readable instructions which, when executed by a processing device, cause the processing device to perform operations comprising:
  receiving analyte measurement data from a plurality of different biological samples;
  analyzing respective analyte measurements for each one of a plurality of selected analytes in the analyte measurement data; and
  generating a composite dilution model for each one of the selected analytes based on the analyzing.

Embodiment 59. A computer-implemented method for generating a composite dilution model for biological material, comprising:
  receiving, by one or more processing devices, analyte measurement data from a plurality of different biological samples;
  analyzing, by one or more of the processing devices, respective analyte measurements for each one of a plurality of selected analytes in the analyte measurement data; and
  generating, by one or more of the processing devices, a composite dilution model for each one of the selected analytes based on the analyzing.

Embodiment 60. A computer system, comprising:
  a non-transitory memory storing instructions; and
  one or more hardware processors coupled to the non-transitory memory and configured to read the instructions from the non-transitory memory to cause the computer system to perform operations comprising:
  receiving analyte measurement data for analytes in a biological sample;
  selecting a plurality of the analytes for determining a predicted relative dilution of the biological sample;
  receiving a composite dilution model generated for each respective one of the selected analytes;
  determining, for each one of the selected analytes, a predicted relative dilution value based on a corresponding composite dilution model generated for the respective selected analyte; and
  determining the predicted relative dilution of the biological sample based on the determined predicted relative dilution values for the selected analytes.

The foregoing and other objects, features, and advantages of the invention will become more apparent from the following detailed description, which proceeds with reference to the accompanying figures.

DESCRIPTION OF THE FIGURES

FIG. 2A shows measurement of CST3 levels using serial dilutions of urine samples. FIG. 2B shows generation of a regression line for CST3 using a weighted linear regression model. FIG. 2C shows a 4 parameter logistic function (4PL) fit of data for CST3. FIG. 2D shows measurement of EPHB6 levels using serial dilutions of urine samples. FIG. 2E shows generation of a regression line for EPHB6 using a weighted linear regression model.

FIG. 3A shows measurement of PDGFD levels using serial dilutions of urine samples. FIG. 3B shows generation of a regression line using a weighted linear regression model. FIG. 3C shows a 4PL fit of data for PDGFD.

FIG. 4A shows measurement of RARRES2 levels using serial dilutions of urine samples. FIG. 4B shows generation of a regression line using a weighted linear regression model. FIG. 4C shows a 4PL fit of data for RARRES2.

FIG. 5A shows measurement of IL1RL2 levels using serial dilutions of urine samples. FIG. 5B shows generation of a regression line using a weighted linear regression model. FIG. 5C shows a 4PL fit of data for IL1RL2.

FIG. 6A shows measurement of F11 levels using serial dilutions of urine samples. FIG. 6B shows generation of a regression line using a weighted linear regression model. FIG. 6C shows a 4PL fit of data for F11.

FIGS. 7A-7C show analysis of septin 11 (SEPT11) levels. FIG. 7A shows measurement of SEPT11 levels using serial dilutions of urine samples. FIG. 7B shows generation of a regression line using a weighted linear regression model. FIG. 7C shows a 4PL fit of data for SEPT11.

FIG. 8A shows measurement of TWO levels using serial dilutions of urine samples. FIG. 8B shows generation of a regression line using a weighted linear regression model. FIG. 8C shows a 4PL fit of data for TWO.

FIG. 9A shows measurement of SHISA3 levels using serial dilutions of urine samples. FIG. 9B shows generation of a regression line using a weighted linear regression model. FIG. 9C shows a 4PL fit of data for SHISA3.

FIG. 17A-17B shows the F-statistic for non-normalized and normalized data for each study participant (17A) and fold reduction in F statistic for each study participant (17B).

DETAILED DESCRIPTION

I. Terms and Methods

Figure 1:
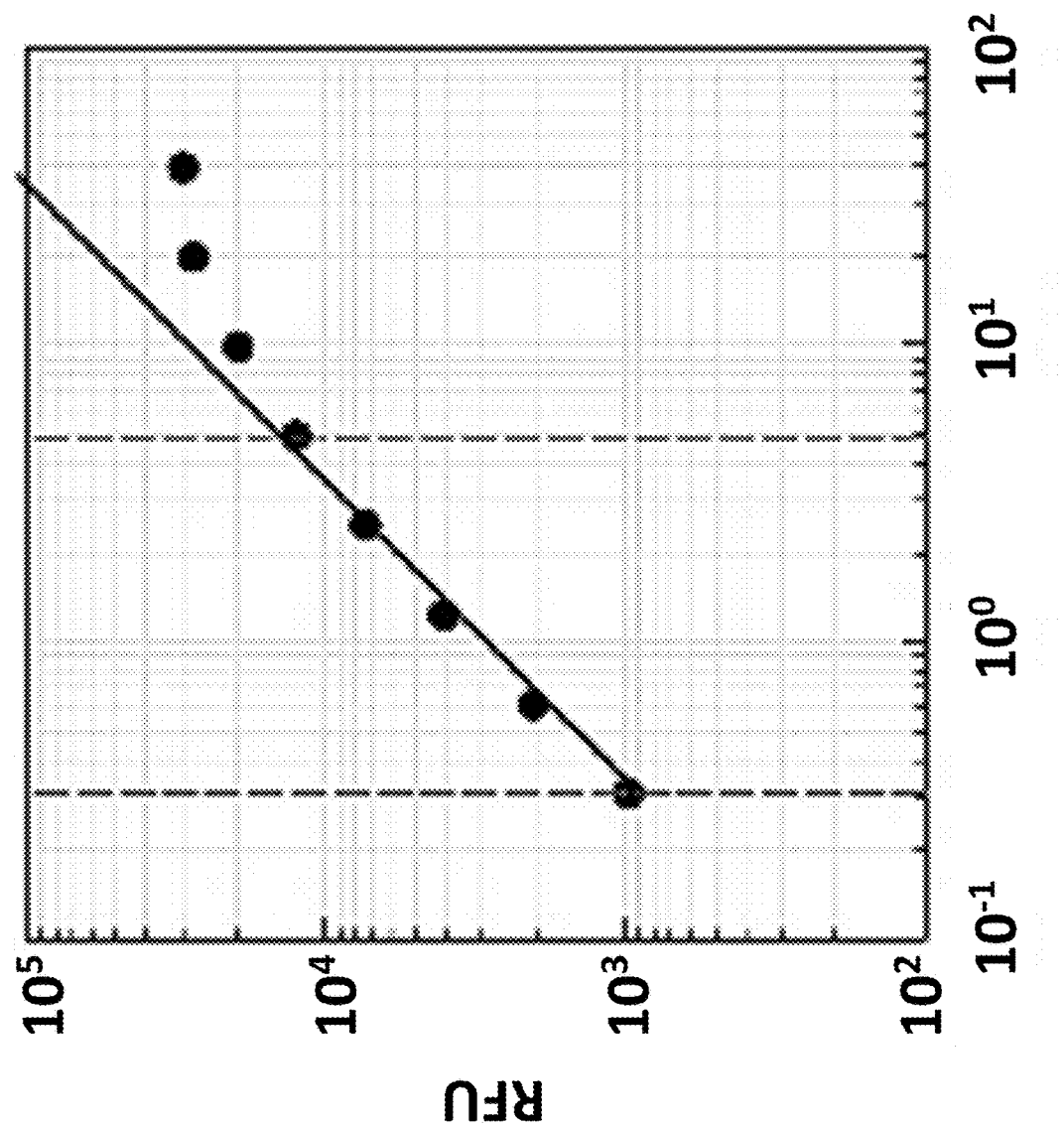
FIG. 1 shows determination of a linear range by serial dilutions. RFU=relative fluorescence units.

While the invention will be described in conjunction with certain representative embodiments, it will be understood that the invention is defined by the claims, and is not limited to those embodiments.

One skilled in the art will recognize many methods and materials similar or equivalent to those described herein may be used in the practice of the present invention. The present invention is in no way limited to the methods and materials described.

Unless defined otherwise, technical and scientific terms used herein have the meaning commonly understood by one of ordinary skill in the art to which this invention belongs. Definitions of common terms in molecular biology may be found in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: a Comprehensive Desk Reference*, published by VCH Publishers, Inc., 1995 (ISBN 1-56081-569-8). Although any methods, devices, and materials similar or equivalent to those described herein can be used in the practice of the invention, certain methods, devices, and materials are described herein.

All publications, published patent documents, and patent applications cited herein are hereby incorporated by reference to the same extent as though each individual publication, published patent document, or patent application was specifically and individually indicated as being incorporated by reference.

As used in this application, including the appended claims, the singular forms "a," "an," and "the" include the plural, unless the context clearly dictates otherwise, and may be used interchangeably with "at least one" and "one or more." Thus, reference to "an aptamer" includes mixtures of aptamers, reference to "a probe" includes mixtures of probes, and the like.

As used herein, the terms "comprises," "comprising," "includes," "including," "contains," "containing," and any variations thereof, are intended to cover a non-exclusive inclusion, such that a process, method, product-by-process, or composition of matter that comprises, includes, or contains an element or list of elements may include other elements not expressly listed.

It is further to be understood that all base sizes or amino acid sizes, and all molecular weight or molecular mass values, given for nucleic acids or polypeptides are approximate, and are provided for description.

Further, ranges provided herein are understood to be shorthand for all of the values within the range. For example, a range of 1 to 50 is understood to include any number, combination of numbers, or sub-range from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as fractions thereof unless the context clearly dictates otherwise.

Any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as polymer subunits, size or thickness, are to be understood to include any integer within the recited range, unless otherwise indicated.

As used herein, "about" or "consisting essentially of" mean±20% of the indicated range, value, or structure, unless otherwise indicated.

The use of the alternative (e.g., "or") should be understood to mean either one, both, or any combination thereof of the alternatives.

In order to facilitate review of the various embodiments of the disclosure, the following explanations of specific terms are provided:

Antibody: The term "antibody" refers to full-length antibodies of any species and fragments and derivatives of such antibodies that retain the ability to bind to antigen, including Fab fragments, F(ab')2 fragments, single chain antibodies, Fv fragments, and single chain Fv fragments. The term "antibody" also includes synthetically-derived antibodies, such as phage display-derived antibodies and fragments, affybodies and nanobodies.

Aptamer: As used herein, an "aptamer" refers to a nucleic acid that has a specific binding affinity for a target molecule, wherein the binding of the aptamer to the target molecule does not comprise Watson-Crick base pairing. It is recognized that affinity interactions are a matter of degree; however, in this context, the "specific binding affinity" of an aptamer for its target means that the aptamer binds to its target generally with a much higher degree of affinity than it binds to other components in a test sample. An "aptamer" is a set of copies of one type or species of nucleic acid molecule that has a particular nucleotide sequence. An aptamer can include any suitable number of nucleotides, including any number of chemically modified nucleotides. The plural "aptamers" refers to more than one such set of molecules. Different aptamers can have either the same or different numbers of nucleotides. Aptamers can be DNA or RNA or chemically modified nucleic acids, and can be single-stranded, double-stranded, or contain both single- and double-stranded regions, and can include higher ordered structures. An aptamer can also comprise a photoreactive or chemically reactive functional group to allow it to be covalently linked to its corresponding target. Any of the aptamer methods disclosed herein can include the use of two or more aptamers that specifically bind the same target molecule. As further described below, an aptamer may include a tag. If an aptamer includes a tag, all copies of the aptamer need not have the same tag. Moreover, if different aptamers each include a tag, each different aptamer can have either the same tag or a different tag.

Biological Sample or Biological Matrix: As used herein, "biological sample" and "biological matrix" refer to any material, solution, or mixture obtained from an organism. This includes blood (including whole blood, leukocytes, peripheral blood mononuclear cells, plasma, and serum), sputum, breath, urine, semen, saliva, meningeal fluid, amniotic fluid, glandular fluid, lymph fluid, nipple aspirate, bronchial aspirate, synovial fluid, joint aspirate, cells, a cellular extract, and cerebrospinal fluid. This also includes experimentally separated fractions of all of the preceding. The terms "biological sample" and "biological matrix" also include materials, solutions, or mixtures containing homogenized solid material, such as from a stool sample, a tissue sample, or a tissue biopsy, for example. The terms "biological sample" and "biological matrix" also include materials, solutions, or mixtures derived from a cell line, tissue culture, cell culture, bacterial culture, viral culture or cell free biological system (e.g. IVTT).

Level: As used herein, "target protein level," "analyte level" and "level" refer to a measurement that is made using any analytical method for detecting the analyte (such as a target protein) in a biological sample and that indicates the presence, absence, absolute amount or concentration, relative amount or concentration, titer, level, expression level, ratio of measured levels, or the like, of, for, or corresponding to the analyte in the biological sample. The exact nature of the "level" depends on the specific design and components of the particular analytical method employed to detect the analyte.

C-5 Modified Pyrimidine: As used herein, the term "C-5 modified pyrimidine" refers to a pyrimidine with a modification at the C-5 position. Examples of a C-5 modified pyrimidine include those described in U.S. Pat. Nos. 5,719,273; 5,945,527; 9,163,056; and Dellafiore et al., 2016, *Front. Chem.*, 4:18. Examples of a C-5 modification include substitution of deoxyuridine at the C-5 position with a substituent independently selected from: benzylcarboxyamide (alternatively benzylaminocarbonyl) (Bn), naphthylmethylcarboxyamide (alternatively naphthylmethylaminocarbonyl) (Nap), tryptaminocarboxyamide (alternatively tryptaminocarbonyl) (Trp), phenethylcarboxyamide (alternatively phenethylamino carbonyl) (Pe), thiophenylmethylcarboxyamide (alternatively thiophenylmethylaminocarbonyl) (Th) and isobutylcarboxyamide (alternatively isobutylaminocarbonyl) (iBu) as illustrated immediately below.

Chemical modifications of a C-5 modified pyrimidine can also be combined, singly or in any combination, with 2'-position sugar modifications, modifications at exocyclic amines, and substitution of 4-thiouridine and the like.

Representative C-5 modified pyrimidines include: 5-(N-benzylcarboxyamide)-2'-deoxyuridine (BndU), 5-(N-benzylcarboxyamide)-2'-O-methyluridine, 5-(N-benzylcarboxyamide)-2'-fluorouridine, 5-(N-isobutylcarboxyamide)-2'-deoxyuridine (iBudU), 5-(N-isobutylcarboxyamide)-2'-O-methyluridine, 5-(N-phenethylcarboxyamide)-2'-deoxyuridine (PedU), 5-(N-thiophenylmethylcarboxyamide)-2'-deoxyuridine (ThdU), 5-(N-isobutylcarboxyamide)-2'-fluorouridine, 5-(N-tryptaminocarboxyamide)-2'-deoxyuridine (TrpdU), 5-(N-tryptaminocarboxyamide)-2'-O-methyluridine, 5-(N-tryptaminocarboxyamide)-2'-fluorouridine, 5-(N-[1-(3-trimethylamonium) propyl]carboxyamide)-2'-deoxyuridine chloride, 5-(N-naphthylmethylcarboxyamide)-2'-deoxyuridine (NapdU), 5-(N-naphthylmethylcarboxyamide)-2'-O-methyluridine, 5-(N-naphthylmethylcarboxyamide)-2'-fluorouridine or 5-(N-[1-(2,3-dihydroxypropyl)]carboxyamide)-2'-deoxyuridine).

Nucleotides can be modified either before or after synthesis of an oligonucleotide. A sequence of nucleotides in an oligonucleotide may be interrupted by one or more non-nucleotide components. A modified oligonucleotide may be further modified after polymerization, such as, for example, by conjugation with any suitable labeling component.

As used herein, the term "at least one pyrimidine," when referring to modifications of a nucleic acid, refers to one, several, or all pyrimidines in the nucleic acid, indicating that any or all occurrences of any or all of C, T, or U in a nucleic acid may be modified or not.

Capture Reagent: As used herein, a "capture agent" or "capture reagent" refers to a molecule that is capable of binding specifically to an analyte, such as a biomarker, protein and/or peptide. A "target protein capture reagent" refers to a molecule that is capable of binding specifically to a target protein. Nonlimiting exemplary capture reagents include aptamers, antibodies, adnectins, ankyrins, other antibody mimetics and other protein scaffolds, autoantibodies, chimeras, small molecules, nucleic acids, lectins, ligand-binding receptors, imprinted polymers, avimers, peptidomimetics, hormone receptors, cytokine receptors, synthetic receptors, and modifications and fragments of any of the aforementioned capture reagents. In some embodiments, a capture reagent is selected from an aptamer and an antibody.

Control Level: A "control level" of a target molecule refers to the level of the target molecule in the same sample type from an individual that does not have the disease or condition, or from an individual that is not suspected or at risk of having the disease or condition, or from an individual that has a non-progressive form of the disease or condition. Further, a "control level" may refer to a reference based on the average or what is considered within normal or healthy parameters. A "control level" may also refer to a reference level taken at a previous time and that is used to compare to a later measured or detected level of a target. For example, the level of a target may be detected at time point A, and then detected at time point B, where time point B is after time point A. In a more specific example, time point A may be considered time zero (0) or day zero (0) and time point B may be minutes (e.g., 10, 20, 30, 40, 50, 60 minutes after time point A), hours (e.g, 1, 2, 3, 4, 5, 6, 7, 8, 9, 10, 11, 12, 13, 14, 15, 16, 17, 18, 19, 20, 21, 22, 23 or 24 hours after time point A), days (e.g, 1, 2, 3, 4, 5, 6 or 7 days after time point A), weeks (e.g., 1, 2, 3 or 4 weeks after time point A), months (e.g., 1, 2, 3, 4, 5, 6, 7, 8, 9, 10, 11 or 12 months after time point A) and even years (e.g., 1, 2, 3, 4, 5, 6, 7, 8, 9, 10, 11, 12, 13, 14, 15, 20, 25, 30, 35, 40, 45, 50, 55 or 60 years after time point A) after time point A. A "control level" of a target molecule need not be determined each time the present methods are carried out, and may be a previously determined level that is used as a reference or threshold to determine whether the level in a particular sample is higher or lower than a normal level.

Correspondence correlation: "Correspondence correlation" or "concordance correlation coefficient" measures the agreement between two continuous variables X and Y (e.g., predicted, estimated or determined, and actual). The "correspondence correlation" evaluates the degree to which pairs fall on the 45° line, and contains measurements of accuracy and precision (or the "Lin's Condordance"). Additional information may be found in Lin, Biometrics, Vol. 45, No. 1 (March, 1989), 255-268, which is hereby incorporated by reference. Other methods for determining correlation that may be used herein includes, but are not limited to, Pearson correlation coefficient, the paired t-test, least squares analysis of slope (=1) and intercept (=0), the coefficient of variation and the intraclass correlation coefficient. In certain embodiments, the correspondence correlation is determined by the method selected from Lin's Concordance, Pearson correlation coefficient, the paired t-test, least squares analysis of slope (=1) and intercept (=0), the coefficient of variation and the intraclass correlation coefficient.

Detecting: As used herein, "detecting" or "determining" with respect to an analyte level includes the use of both the instrument used to observe and record a signal corresponding to a analyte level and the material/s required to generate that signal. In various embodiments, the level is detected using any suitable method, including fluorescence, chemiluminescence, surface plasmon resonance, surface acoustic waves, mass spectrometry, infrared spectroscopy, Raman spectroscopy, atomic force microscopy, scanning tunneling microscopy, electrochemical detection methods, nuclear magnetic resonance, quantum dots, and the like.

Diagnose: "Diagnose", "diagnosing", "diagnosis", and variations thereof refer to the detection, determination, or recognition of a health status or condition of an individual on the basis of one or more signs, symptoms, data, or other information pertaining to that individual. The health status of an individual can be diagnosed as healthy/normal (i.e., a diagnosis of the absence of a disease or condition) or diagnosed as ill/abnormal (i.e., a diagnosis of the presence, or an assessment of the characteristics, of a disease or condition). The terms "diagnose", "diagnosing", "diagnosis", etc., encompass, with respect to a particular disease or condition, the initial detection of the disease; the characterization or classification of the disease; the detection of the progression, remission, or recurrence of the disease; and the detection of disease response after the administration of a treatment or therapy to the individual.

Dilution: "Dilution", "dilution series" and variations thereof encompass several different types of dilutions, including, but not limited to, step dilutions, serial dilutions and combinations thereof. By way of example for a step dilution, if the dilution factor is 1000 (1:1000 dilution), the user may first perform a 1:10 dilution (dilution factor of 10) followed by a 1:100 dilution (dilution factor of 100) using 1 part solute from the 1:10 dilution and 99 parts of diluent, thus resulting in a dilution factor of 1000 or 1:1000 dilution of the solute. A serial dilution includes a succession of step dilutions, each having the same dilution factor, where the diluted material from the previous step is used to make the subsequent dilution. By way of example for a serial dilution, to make a 5-point 1:2 serial dilution, entails using 1 part solute and combining with 1 part diluent to make the first dilution ($1^{st}$ point of the 5-point) in the dilution series, followed by 1 part solute from the first dilution and combining with 1 part diluent to make the second dilution ($2^{nd}$ point of the 5-point) of the serial dilution series, so on and so forth until you reach the fifth successive serial dilution.

Dilution Factor: "Dilution factor" refers to the ratio of the parts of solute to parts of diluent. For example a dilution factor of 2 means a 1:2 dilution where there are 1 part solute and 1 part diluent for a total of 2 parts; and a dilution factor of 10 means a 1:10 dilution where there are 1 part solute and 9 parts diluent for a total of 10 parts.

Evaluate: "Evaluate", "evaluating", "evaluation", and variations thereof encompass both "diagnose" and "prognose" and encompass determinations or predictions about the future course of a disease or condition in an individual has the disease or condition, as well as determinations and predictions about eh likelihood that a disease or condition will occur in an individual who has not previously been diagnosed with the disease or condition, as well as determinations or predictions regarding the likelihood that a disease or condition will recur in an individual who is in remission or is believed to have been cured of the disease. The term "evaluate" also encompasses assessing an individual's response to a therapy, such as, for example, predicting whether an individual is likely to respond favorably to a therapeutic agent or is unlikely to respond to a therapeutic agent (or will experience toxic or other undesirable side effects, for example), selecting a therapeutic agent for administration to an individual, or monitoring or determining an individual's response to a therapy that has been administered, or is being administered, to the individual.

Individual: As used herein, "individual" and "subject" are used interchangeably to refer to a test subject or patient. The individual can be a mammal or a non-mammal. In various embodiments, the individual is a mammal. A mammalian individual can be a human or non-human. In various embodiments, the individual is a human. A healthy or normal individual is an individual in which the disease or condition of interest is not detectable by conventional diagnostic methods.

Linear Regression: The term "linear regression", as used herein, refers to an approach for modeling the relationship between a scalar dependent variable y and one or more explanatory variables denoted x. The case of one explanatory variable is called simple linear regression. For more than one explanatory variable, it is called multiple linear regression. In general, linear regression may be used to fit a predictive model to an observed data set of y and x values. After developing such a model, if additional value of x is then given without its accompanying value of y, the fitted model can be used to make a prediction of the value of y.

Marker: As used herein, "marker" and "biomarker" are used interchangeably to refer to a target molecule (or analyte) that indicates or is a sign of a normal or abnormal process in an individual or of a disease or other condition in an individual. More specifically, a "marker" or "biomarker" is an anatomic, physiologic, biochemical, or molecular parameter associated with the presence of a specific physiological state or process, whether normal or abnormal, and, if abnormal, whether chronic or acute. Biomarkers are detectable and measurable by a variety of methods including laboratory assays and medical imaging. In some embodiments, a biomarker is a target protein.

Modified: As used herein, the terms "modify", "modified", "modification", and any variations thereof, when used in reference to an oligonucleotide, means that at least one of the four constituent nucleotide bases (i.e., A, G, T/U, and C) of the oligonucleotide is an analog or ester of a naturally occurring nucleotide. In some embodiments, the modified nucleotide confers nuclease resistance to the oligonucleotide. In some embodiments, the modified nucleotides lead to predominantly hydrophobic interactions of aptamers with protein targets resulting in high binding efficiency and stable co-crystal complexes. A pyrimidine with a substitution at the C-5 position is an example of a modified nucleotide. Modifications can include backbone modifications, methylations, unusual base-pairing combinations such as the isobases isocytidine and isoguanidine, and the like. Modifications can also include 3' and 5' modifications, such as capping. Other modifications can include substitution of one or more of the naturally occurring nucleotides with an analog, internucleotide modifications such as, for example, those with uncharged linkages (e.g., methyl phosphonates, phosphotriesters, phosphoamidates, carbamates, etc.) and those with charged linkages (e.g., phosphorothioates, phosphorodithioates, etc.), those with intercalators (e.g., acridine, psoralen, etc.), those containing chelators (e.g., metals, radioactive metals, boron, oxidative metals, etc.), those containing alkylators, and those with modified linkages (e.g., alpha anomeric nucleic acids, etc.). Further, any of the hydroxyl groups ordinarily present on the sugar of a nucleotide may be replaced by a phosphonate group or a phosphate group; protected by standard protecting groups; or activated to prepare additional linkages to additional nucleotides or to a solid support. The 5' and 3' terminal OH groups can be phosphorylated or substituted with amines, organic capping group moieties of from about 1 to about 20 carbon atoms, polyethylene glycol (PEG) polymers, in some embodiments, ranging from about 10 to about 80 kDa, PEG polymers, in some embodiments, ranging from about 20 to about 60 kDa, or other hydrophilic or hydrophobic biological or synthetic polymers. In one embodiment, modifications are of the C-5 position of pyrimidines. These modifications can be produced through an amide linkage directly at the C-5 position or by other types of linkages.

Polynucleotides can also contain analogous forms of ribose or deoxyribose sugars that are generally known in the art, including 2'-O-methyl-, 2'-O-allyl, 2'-fluoro- or 2'-azido-ribose, carbocyclic sugar analogs, α-anomeric sugars, epimeric sugars such as arabinose, xyloses or lyxoses, pyranose sugars, furanose sugars, sedoheptuloses, acyclic analogs and abasic nucleoside analogs such as methyl riboside. As noted above, one or more phosphodiester linkages may be replaced by alternative linking groups. These alternative linking groups include embodiments wherein phosphate is replaced by P(O)S ("thioate"), P(S)S ("dithioate"), (O)NR$_2$ ("amidate"), P(O)R, P(O)OR', CO or CH$_2$ ("formacetal"), in which each R or R' is independently H or substituted or unsubstituted alkyl (1-20 C) optionally containing an ether (—O—) linkage, aryl, alkenyl, cycloalky, cycloalkenyl or araldyl. Not all linkages in a polynucleotide need be identical. Substitution of analogous forms of sugars, purines, and pyrimidines can be advantageous in designing a final product, as can alternative backbone structures like a polyamide backbone, for example.

Nucleic acid: As used herein, "nucleic acid," "oligonucleotide," and "polynucleotide" are used interchangeably to refer to a polymer of nucleotides and include DNA, RNA, DNA/RNA hybrids and modifications of these kinds of nucleic acids, oligonucleotides and polynucleotides, wherein the attachment of various entities or moieties to the nucleotide units at any position are included. The terms "polynucleotide," "oligonucleotide," and "nucleic acid" include double- or single-stranded molecules as well as triple-helical molecules. Nucleic acid, oligonucleotide, and polynucleotide are broader terms than the term aptamer and, thus, the terms nucleic acid, oligonucleotide, and polynucleotide include polymers of nucleotides that are aptamers but the terms nucleic acid, oligonucleotide, and polynucleotide are not limited to aptamers.

Ordinary least squares: "Ordinary least squares" or "OLS" or "linear least squares", as used herein, refers to a method for estimating the unknown parameters in a linear regression model. This method minimizes the sum of squared vertical distances between the observed responses in the dataset and the responses predicted by the linear approximation. The resulting estimator can be expressed by a simple formula, especially in the case of a single regressor on the right-hand side.

Prognose: "Prognose", "prognosing", "prognosis", and variations thereof refer to the prediction of a future course of a disease or condition in an individual who has the disease or condition (e.g., predicting patient survival), and such terms encompass the evaluation of disease response during and/or after the administration of a treatment or therapy to the individual.

SELEX: The terms "SELEX" and "SELEX process" are used interchangeably herein to refer generally to a combination of (1) the selection of aptamers that interact with a target molecule in a desirable manner, for example binding with high affinity to a protein, with (2) the amplification of those selected nucleic acids. The SELEX process can be used to identify aptamers with high affinity to a specific analyte, such as a target protein.

Sequence Identity: Sequence identity, as used herein, in the context of two or more nucleic acid sequences is a function of the number of identical nucleotide positions shared by the sequences (i.e., % identity=number of identical positions/total number of positions in the reference sequence×100), taking into account the number of gaps, and the length of each gap that needs to be introduced to optimize alignment of two or more sequences. The comparison of sequences and determination of percent identity between two or more sequences can be accomplished using a mathematical algorithm, such as BLAST and Gapped BLAST programs at their default parameters (e.g., Altschul et al., *J. Mol. Biol.* 215:403, 1990; see also BLASTN at www.ncbi.nlm.nih.gov/BLAST). For sequence comparisons, typically one sequence acts as a reference sequence to which test sequences are compared. When using a sequence comparison algorithm, test and reference sequences are input into a computer, subsequence coordinates are designated if necessary, and sequence algorithm program parameters are designated. The sequence comparison algorithm then calculates the percent sequence identity for the test sequence(s) relative to the reference sequence, based on the designated program parameters. Optimal alignment of sequences for comparison can be conducted, e.g., by the local homology algorithm of Smith and Waterman, Adv. Appl. Math., 2:482, 1981, by the homology alignment algorithm of Needleman and Wunsch, J. Mol. Biol., 48:443, 1970, by the search for similarity method of Pearson and Lipman, Proc. Nat'l. Acad. Sci. USA 85:2444, 1988, by computerized implementations of these algorithms (GAP, BESTFIT, FASTA, and TFASTA in the Wisconsin Genetics Software Package, Genetics Computer Group, 575 Science Dr., Madison, Wis.), or by visual inspection (see generally, Ausubel, F. M. et al., Current Protocols in Molecular Biology, pub. by Greene Publishing Assoc. and Wiley-Interscience (1987)). As used herein, when describing the percent identity of a nucleic acid, such as an aptamer, the sequence of which is at least, for example, about 95% identical to a reference nucleotide sequence, it is intended that the nucleic acid sequence is identical to the reference sequence except that the nucleic acid sequence may include up to five point mutations per each 100 nucleotides of the reference nucleic acid sequence. In other words, to obtain a desired nucleic acid sequence, the sequence of which is at least about 95% identical to a reference nucleic acid sequence, up to 5% of the nucleotides in the reference sequence may be deleted or substituted with another nucleotide, or some number of nucleotides up to 5% of the total number of nucleotides in the reference sequence may be inserted into the reference sequence (referred to herein as an insertion). These mutations of the reference sequence to generate the desired sequence may occur at the 5' or 3' terminal positions of the reference nucleotide sequence or anywhere between those terminal positions, interspersed either individually among nucleotides in the reference sequence or in one or more contiguous groups within the reference sequence.

SOMAmer: The term SOMAmer or SOMAmer reagent, as used herein, refers to an aptamer having improved off-rate characteristics. SOMAmer reagents are alternatively referred to as Slow Off-Rate Modified Aptamers, and may be selected via the improved SELEX methods described in U.S. Publication No. 20090004667, entitled "Method for Generating Aptamers with Improved Off-Rates", which is incorporated by reference in its entirety. In some embodiments, a slow off-rate aptamer (including an aptamers comprising at least one nucleotide with a hydrophobic modification) has an off-rate (t½) of ≥2 minutes, ≥4 minutes, ≥5 minutes, ≥8 minutes, ≥10 minutes, ≥15 minutes≥30 minutes, ≥60 minutes, ≥90 minutes, ≥120 minutes, ≥150 minutes, ≥180 minutes, ≥210 minutes, or ≥240 minutes.

Substantially Equivalent: The phrase "substantially equivalent", as used herein, denotes a sufficiently high degree of similarity between two numeric values such that one of skill in the art would consider the difference between the two values to be of little or no biological and/or statistical significance within the context of the characteristic measured by the values. More specifically, the difference between the two values (e.g., the difference between the reference value and the regression model reference value) is preferably less than about 25%, or less than about 20%, or less than about 15% or less than about 10% or less than about 5% or less than about 4% or less than about 3% or less than about 2.5% or less than about 2% or less than about 1%.

Target Molecule: "Target", "target molecule", and "analyte" are used interchangeably herein to refer to any molecule of interest that may be present in a sample. The term includes any minor variation of a particular molecule, such as, in the case of a protein, for example, minor variations in amino acid sequence, disulfide bond formation, glycosylation, lipidation, acetylation, phosphorylation, or any other manipulation or modification, such as conjugation with a labeling component, which does not substantially alter the identity of the molecule. A "target molecule", "target", or "analyte" refers to a set of copies of one type or species of molecule or multi-molecular structure. "Target molecules", "targets", and "analytes" refer to more than one type or species of molecule or multi-molecular structure. Exemplary target molecules include proteins, polypeptides, nucleic acids, carbohydrates, lipids, polysaccharides, glycoproteins, hormones, receptors, antigens, antibodies, affybodies, antibody mimics, viruses, pathogens, toxic substances, substrates, metabolites, transition state analogs, cofactors, inhibitors, drugs, dyes, nutrients, growth factors, cells, tissues, and any fragment or portion of any of the foregoing. In some embodiments, a target molecule is a protein, in which case the target molecule may be referred to as a "target protein."

The foregoing and other objects, features, and advantages of the invention will become more apparent from the following detailed description, which proceeds with reference to the accompanying figures.

Although methods and materials similar or equivalent to those described herein can be used in the practice or testing of the present disclosure, suitable methods and materials are described below. In addition, the materials, methods, and examples are illustrative only and not intended to be limiting.

Detection and Determination of Analytes and Analyte Levels

An analyte level for the analytes described herein can be detected using any of a variety of known analytical methods. In one embodiment, an analyte level is detected using a capture reagent. In various embodiments, the capture reagent can be exposed to the analyte in solution or can be exposed to the analyte while the capture reagent is immobilized on a solid support. In some embodiments, the capture reagent contains a feature that is reactive with a secondary feature on a solid support. In these embodiments, the capture reagent can be exposed to the analyte in solution, and then the feature on the capture reagent can be used in conjunction with the secondary feature on the solid support to immobilize the analyte on the solid support. The capture reagent is selected based on the type of analysis to be conducted. Capture reagents include, but are not limited to, aptamers, antibodies, adnectins, ankyrins, other antibody mimetics and other protein scaffolds, chimeras, small molecules, F(ab')$_2$ fragments, single chain antibody fragments, Fv fragments, single chain Fv fragments, nucleic acids, lectins, ligand-binding receptors, affybodies, nanobodies, imprinted polymers, avimers, peptidomimetics, hormone receptors, cytokine receptors, and synthetic receptors, including modifications and fragments of any of these.

In some embodiments, an analyte level is detected using an analyte/capture reagent complex.

In some embodiments, the analyte level is derived from the analyte/capture reagent complex and is detected indirectly, such as, for example, as a result of a reaction that is subsequent to the analyte/capture reagent interaction, but is dependent on the formation of the analyte/capture reagent complex.

In some embodiments, the analyte level is detected directly from the analyte in a biological sample.

In some embodiments, analytes are detected using a multiplexed format that allows for the simultaneous detection of two or more analytes in a biological sample. In some embodiments of the multiplexed format, capture reagents are immobilized, directly or indirectly, covalently or non-covalently, in discrete locations on a solid support. In some embodiments, a multiplexed format uses discrete solid supports where each solid support has a unique capture reagent associated with that solid support, such as, for example, quantum dots. In some embodiments, an individual device is used for the detection of each one of multiple analytes to be detected in a biological sample. Individual devices can be configured to permit each analyte in the biological sample to be processed simultaneously. For example, a microtiter plate can be used such that each well in the plate is used to analyze one or more of multiple analytes to be detected in a biological sample.

In one or more of the embodiments described herein, a fluorescent tag can be used to label a component of the analyte/capture reagent complex to enable the detection of the analyte level. In various embodiments, the fluorescent label can be conjugated to a capture reagent specific to any of the analytes described herein using known techniques, and the fluorescent label can then be used to detect the corresponding analyte level. Suitable fluorescent labels include rare earth chelates, fluorescein and its derivatives, rhodamine and its derivatives, dansyl, allophycocyanin, PBXL-3, Qdot 605, Lissamine, phycoerythrin, Texas Red, and other such compounds.

In some embodiments, the fluorescent label is a fluorescent dye molecule. In some embodiments, the fluorescent dye molecule includes at least one substituted indolium ring system in which the substituent on the 3-carbon of the indolium ring contains a chemically reactive group or a conjugated substance. In some embodiments, the dye molecule includes an AlexaFluor molecule, such as, for example, AlexaFluor 488, AlexaFluor 532, AlexaFluor 647, AlexaFluor 680, or AlexaFluor 700. In some embodiments, the dye molecule includes a first type and a second type of dye molecule, such as, e.g., two different AlexaFluor molecules. In some embodiments, the dye molecule includes a first type and a second type of dye molecule, and the two dye molecules have different emission spectra.

Fluorescence can be measured with a variety of instrumentation compatible with a wide range of assay formats. For example, spectrofluorimeters have been designed to analyze microtiter plates, microscope slides, printed arrays, cuvettes, etc. See Principles of Fluorescence Spectroscopy, by J. R. Lakowicz, Springer Science+Business Media, Inc., 2004. See Bioluminescence & Chemiluminescence: Progress & Current Applications; Philip E. Stanley and Larry J. Kricka editors, World Scientific Publishing Company, January 2002.

In one or more embodiments, a chemiluminescence tag can optionally be used to label a component of the analyte/capture complex to enable the detection of an analyte level. Suitable chemiluminescent materials include any of oxalyl chloride, Rodamin 6G, $Ru(bipy)_3^{2+}$, TMAE (tetrakis(dimethylamino)ethylene), Pyrogallol (1,2,3-trihydroxibenzene), Lucigenin, peroxyoxalates, Aryl oxalates, Acridinium esters, dioxetanes, and others.

In some embodiments, the detection method includes an enzyme/substrate combination that generates a detectable signal that corresponds to the analyte level. Generally, the enzyme catalyzes a chemical alteration of the chromogenic substrate which can be measured using various techniques, including spectrophotometry, fluorescence, and chemiluminescence. Suitable enzymes include, for example, luciferases, luciferin, malate dehydrogenase, urease, horseradish peroxidase (HRPO), alkaline phosphatase, beta-galactosidase, glucoamylase, lysozyme, glucose oxidase, galactose oxidase, and glucose-6-phosphate dehydrogenase, uricase, xanthine oxidase, lactoperoxidase, microperoxidase, and the like.

In some embodiments, the detection method can be a combination of fluorescence, chemiluminescence, radionuclide and/or enzyme/substrate combinations that generate a measurable signal. In some embodiments, multimodal signaling could have unique and advantageous characteristics in analyte assay formats.

In some embodiments, the analyte levels for the analytes described herein can be detected using any analytical methods including, singleplex aptamer assays, multiplexed aptamer assays, singleplex or multiplexed immunoassays, mRNA expression profiling, miRNA expression profiling, mass spectrometric analysis, histological/cytological methods, etc. and as discussed below.

Determination of Analyte Levels Using Aptamer-Based Assays

Assays directed to the detection and quantification of physiologically significant molecules in biological samples and other samples are important tools in scientific research and in the health care field. One class of such assays involves the use of a microarray that includes one or more aptamers immobilized on a solid support. The aptamers are each capable of binding to a target molecule in a highly specific manner and with very high affinity. See, e.g., U.S. Pat. No. 5,475,096 entitled "Nucleic Acid Ligands"; see also, e.g., U.S. Pat. Nos. 6,242,246, 6,458,543, and 6,503,715, each of which is entitled "Nucleic Acid Ligand Diagnostic Biochip". Once the microarray is contacted with a sample, the aptamers bind to their respective target molecules present in the sample and thereby enable a determination of a analyte level corresponding to a analyte.

In one aspect, the aptamer may include up to about 100 nucleotides, up to about 95 nucleotides, up to about 90 nucleotides, up to about 85 nucleotides, up to about 80 nucleotides, up to about 75 nucleotides, up to about 70 nucleotides, up to about 65 nucleotides, up to about 60 nucleotides, up to about 55 nucleotides, up to about 50 nucleotides, up to about 45 nucleotides, up to about 40 nucleotides, up to about 35 nucleotides, up to about 30 nucleotides, up to about 25 nucleotides, and up to about 20 nucleotides. In a related aspect, the aptamer may be from about 25 to about 100 nucleotides in length (or from about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 nucleotides in length) or from about 25 to 50 nucleotides in length (or from about 25, 26, 27, 28, 29, 30, 31, 32, 33, 34, 35, 36, 37, 38, 39, 40, 41, 42, 43, 44, 45, 46, 47, 48, 49 or 50 nucleotides in length).

An aptamer can be identified using any known method, including the SELEX process. Once identified, an aptamer can be prepared or synthesized in accordance with any known method, including chemical synthetic methods and enzymatic synthetic methods. In some embodiments, an aptamer comprises at least one nucleotide with a hydrophobic modification, such as a hydrophobic base modification, allowing for hydrophobic contacts with a target protein. Such hydrophobic contacts, in some embodiments, contribute to greater affinity and/or slower off-rate binding by the aptamer. In some embodiments, an aptamer comprises at least two, at least three, at least four, at least five, at least six, at least seven, at least eight, at least nine, or at least 10 nucleotides with hydrophobic modifications, where each hydrophobic modification may be the same or different from the others. In some embodiments, the hydrophobic base modification is a C-5 modified pyrimidine. Nonlimiting exemplary C-5 modified pyrimidines are described herein and/or are known in the art.

In some assay formats, the aptamers are immobilized on the solid support prior to being contacted with the sample. Under certain circumstances, however, immobilization of the aptamers prior to contact with the sample may not provide an optimal assay. For example, in some instances, pre-immobilization of the aptamers may result in inefficient mixing of the aptamers with the target molecules on the surface of the solid support, perhaps leading to lengthy reaction times and, therefore, extended incubation periods to permit efficient binding of the aptamers to their target molecules. Further, when photoaptamers are employed in the assay and depending upon the material utilized as a solid support, the solid support may tend to scatter or absorb the light used to effect the formation of covalent bonds between the photoaptamers and their target molecules. Moreover, depending upon the method employed, detection of target molecules bound to their aptamers can be subject to imprecision, since the surface of the solid support may also be exposed to and affected by any labeling agents that are used. Finally, immobilization of the aptamers on the solid support generally involves an aptamer-preparation step (i.e., the immobilization) prior to exposure of the aptamers to the sample, and this preparation step may affect the activity or functionality of the aptamers.

Aptamer assays or "aptamer based assay(s)" that permit an aptamer to capture its target in solution and then employ separation steps that are designed to remove specific components of the aptamer-target mixture prior to detection have also been described (see, e.g., U.S. Publication No. 2009/0042206, entitled "Multiplexed Analyses of Test Samples"). The described aptamer assay methods enable the detection and quantification of a non-nucleic acid target (e.g., a protein target) in a test sample by detecting and quantifying a nucleic acid (i.e., an aptamer). The described methods create a nucleic acid surrogate (i.e., the aptamer) for detecting and quantifying a non-nucleic acid target, thus allowing the wide variety of nucleic acid technologies, including amplification, to be applied to a broader range of desired targets, including protein targets.

Aptamers can be constructed to facilitate the separation of the assay components from an aptamer analyte complex (or photoaptamer analyte covalent complex) and permit isolation of the aptamer for detection and/or quantification. In one embodiment, these constructs can include a cleavable or releasable element within the aptamer sequence. In other embodiments, additional functionality can be introduced into the aptamer, for example, a labeled or detectable component, a spacer component, or a specific binding tag or immobilization element. For example, the aptamer can include a tag connected to the aptamer via a cleavable moiety, a label, a spacer component separating the label, and the cleavable moiety. In one embodiment, a cleavable element is a photocleavable linker. The photocleavable linker can be attached to a biotin moiety and a spacer section, can include an NHS group for derivatization of amines, and can be used to introduce a biotin group to an aptamer, thereby allowing for the release of the aptamer later in an assay method.

Homogenous assays, which in some embodiments are carried out with all assay components in solution, may not require separation of sample and reagents prior to the detection of signal. These methods are rapid and easy to use.

In some embodiments, a method for signal generation takes advantage of anisotropy signal change due to the interaction of a fluorophore-labeled capture reagent with its specific analyte target. When the labeled capture reacts with its target, the increased molecular weight causes the rotational motion of the fluorophore attached to the complex to become much slower changing the anisotropy value. By monitoring the anisotropy change, binding events may be used to quantitatively measure the analytes in solutions. Other methods include fluorescence polarization assays, molecular beacon methods, time resolved fluorescence quenching, chemiluminescence, fluorescence resonance energy transfer, and the like.

An exemplary solution-based aptamer assay that can be used to detect a analyte level in a biological sample includes the following: (a) preparing a mixture by contacting the biological sample with an aptamer that includes a first tag and has a specific affinity for the analyte, wherein an aptamer affinity complex is formed when the analyte is present in the sample; (b) exposing the mixture to a first solid support including a first capture element, and allowing the first tag to associate with the first capture element; (c) removing any components of the mixture not associated with the first solid support; (d) attaching a second tag to the analyte component of the aptamer affinity complex; (e) releasing the aptamer affinity complex from the first solid support; (f) exposing the released aptamer affinity complex to a second solid support that includes a second capture element and allowing the second tag to associate with the second capture element; (g) removing any non-complexed aptamer from the mixture by partitioning the non-complexed aptamer from the aptamer affinity complex; (h) eluting the aptamer from the solid support; and (i) detecting the analyte by detecting the aptamer component of the aptamer affinity complex. For example, protein concentration or levels in a sample may be expressed as relative fluorescence units (RFU), which may be a product of detecting the aptamer component of the aptamer affinity complex (e.g., aptamer complexed to target protein create the aptamer affinity complex). That is, for an aptamer-based assay, the protein concentration or level correlates with the RFU.

A nonlimiting exemplary method of detecting analytes in a biological sample using aptamers is described in Kraemer et al., *PLoS One* 6(10): e26332.

Determination of Analyte Levels Using Immunoassays

Immunoassay methods are based on the reaction of an antibody to its corresponding target or analyte and can detect the analyte in a sample depending on the specific assay format. To improve specificity and sensitivity of an assay method based on immuno-reactivity, monoclonal antibodies and fragments thereof are often used because of their specific epitope recognition. Polyclonal antibodies have also been successfully used in various immunoassays because of their increased affinity for the target as compared to monoclonal antibodies. Immunoassays have been designed for use with a wide range of biological sample matrices. Immunoassay formats have been designed to provide qualitative, semi-quantitative, and quantitative results.

Quantitative results are generated through the use of a standard curve created with known concentrations of the specific analyte to be detected. The response or signal from an unknown sample is plotted onto the standard curve, and a quantity or level corresponding to the target in the unknown sample is established.

Numerous immunoassay formats have been designed. ELISA or EIA can be quantitative for the detection of an analyte. This method relies on attachment of a label to either the analyte or the antibody and the label component includes, either directly or indirectly, an enzyme. ELISA tests may be formatted for direct, indirect, competitive, or sandwich detection of the analyte. Other methods rely on labels such as, for example, radioisotopes ($I^{125}$) or fluorescence. Additional techniques include, for example, agglutination, nephelometry, turbidimetry, Western blot, immunoprecipitation, immunocytochemistry, immunohistochemistry, flow cytometry, Luminex assay, and others (see ImmunoAssay: A Practical Guide, edited by Brian Law, published by Taylor & Francis, Ltd., 2005 edition).

Exemplary assay formats include enzyme-linked immunosorbent assay (ELISA), radioimmunoassay, fluorescent, chemiluminescence, and fluorescence resonance energy transfer (FRET) or time resolved-FRET (TR-FRET) immunoassays. Examples of procedures for detecting analytes include analyte immunoprecipitation followed by quantitative methods that allow size and peptide level discrimination, such as gel electrophoresis, capillary electrophoresis, planar electrochromatography, and the like.

Methods of detecting and/or for quantifying a detectable label or signal generating material depend on the nature of the label. The products of reactions catalyzed by appropriate enzymes (where the detectable label is an enzyme; see above) can be, without limitation, fluorescent, luminescent, or radioactive or they may absorb visible or ultraviolet light. Examples of detectors suitable for detecting such detectable labels include, without limitation, x-ray film, radioactivity counters, scintillation counters, spectrophotometers, colorimeters, fluorometers, luminometers, and densitometers.

Any of the methods for detection can be performed in any format that allows for any suitable preparation, processing, and analysis of the reactions. This can be, for example, in multi-well assay plates (e.g., 96 wells or 386 wells) or using any suitable array or microarray. Stock solutions for various agents can be made manually or robotically, and all subsequent pipetting, diluting, mixing, distribution, washing, incubating, sample readout, data collection and analysis can be done robotically using commercially available analysis software, robotics, and detection instrumentation capable of detecting a detectable label.

Determination of Analyte Levels Using Gene Expression Profiling

Measuring mRNA in a biological sample may, in some embodiments, be used as a surrogate for detection of the level of the corresponding protein in the biological sample. Thus, in some embodiments, an analyte or analyte panel described herein can be detected by detecting the appropriate RNA.

In some embodiments, mRNA expression levels are measured by reverse transcription quantitative polymerase chain reaction (RT-PCR followed with qPCR). RT-PCR is used to create a cDNA from the mRNA. The cDNA may be used in a qPCR assay to produce fluorescence as the DNA amplification process progresses. By comparison to a standard curve, qPCR can produce an absolute measurement such as number of copies of mRNA per cell.

Northern blots, microarrays, Invader assays, and RT-PCR combined with capillary electrophoresis have all been used to measure expression levels of mRNA in a sample. See Gene Expression Profiling: Methods and Protocols, Richard A. Shimkets, editor, Humana Press, 2004.

Determination of Analyte Levels Using Mass Spectrometry Methods

A variety of configurations of mass spectrometers can be used to detect analyte levels. Several types of mass spectrometers are available or can be produced with various configurations. In general, a mass spectrometer has the following major components: a sample inlet, an ion source, a mass analyzer, a detector, a vacuum system, and instrument-control system, and a data system. Difference in the sample inlet, ion source, and mass analyzer generally define the type of instrument and its capabilities. For example, an inlet can be a capillary-column liquid chromatography source or can be a direct probe or stage such as used in matrix-assisted laser desorption. Common ion sources are, for example, electrospray, including nanospray and microspray or matrix-assisted laser desorption. Common mass analyzers include a quadrupole mass filter, ion trap mass analyzer and time-of-flight mass analyzer. Additional mass spectrometry methods are well known in the art (see Burlingame et al. Anal. Chem. 70:647 R-716R (1998); Kinter and Sherman, New York (2000)).

Protein analytes and analyte levels can be detected and measured by any of the following: electrospray ionization mass spectrometry (ESI-MS), ESI-MS/MS, ESI-MS/(MS)n, matrix-assisted laser desorption ionization time-of-flight mass spectrometry (MALDI-TOF-MS), surface-enhanced laser desorption/ionization time-of-flight mass spectrometry (SELDI-TOF-MS), desorption/ionization on silicon (DIOS), secondary ion mass spectrometry (SIMS), quadrupole time-of-flight (Q-TOF), tandem time-of-flight (TOF/TOF) technology, called ultraflex III TOF/TOF, atmospheric pressure chemical ionization mass spectrometry (APCI-MS), APCI-MS/MS, APCI-(MS)$^N$, atmospheric pressure photoionization mass spectrometry (APPI-MS), APPI-MS/MS, and APPI-(MS)$^N$, quadrupole mass spectrometry, Fourier transform mass spectrometry (FTMS), quantitative mass spectrometry, and ion trap mass spectrometry.

Sample preparation strategies are used to label and enrich samples before mass spectroscopic characterization of protein analytes and determination of analyte levels. Labeling methods include but are not limited to isobaric tag for relative and absolute quantitation (iTRAQ) and stable isotope labeling with amino acids in cell culture (SILAC). Capture reagents used to selectively enrich samples for candidate analyte proteins prior to mass spectroscopic analysis include but are not limited to aptamers, antibodies, nucleic acid probes, chimeras, small molecules, an F(ab')$_2$ fragment, a single chain antibody fragment, an Fv fragment, a single chain Fv fragment, a nucleic acid, a lectin, a ligand-binding receptor, affybodies, nanobodies, ankyrins, domain antibodies, alternative antibody scaffolds (e.g. diabodies etc) imprinted polymers, avimers, peptidomimetics, peptoids, peptide nucleic acids, threose nucleic acid, a hormone receptor, a cytokine receptor, and synthetic receptors, and modifications and fragments of these.

Kits

Any combination of the analytes described herein can be detected using a suitable kit, such as for use in performing the methods disclosed herein. Furthermore, any kit can contain one or more detectable labels as described herein, such as a fluorescent moiety, etc.

Methods of Normalizing Analyte Measurements in Biological Matrices

Methods of normalizing analyte measurements in biological matrices are provided herein.

In certain embodiments, methods of developing composite dilution models are provided. Composite dilution models may be used to determine the relative dilution of one or more biological samples, such as urine. See, e.g., FIG. 10. The relative dilution may then be used to normalize multiple samples such that differences in sample concentration (such as may occur through differences in subject hydration level) may be minimized, and thus differences in analyte levels due to factors other than sample concentration may be detected. Such factors other than sample concentration that may affect analyte levels include, but are not limited to, increases and decreases in analyte expression, changes in analyte stability, changes in the rate or amount of analyte secreted, etc. Such differences in analyte levels may, in some embodiments, be indicative of a disease or condition or the likelihood of developing a disease or condition.

Figure 18A:
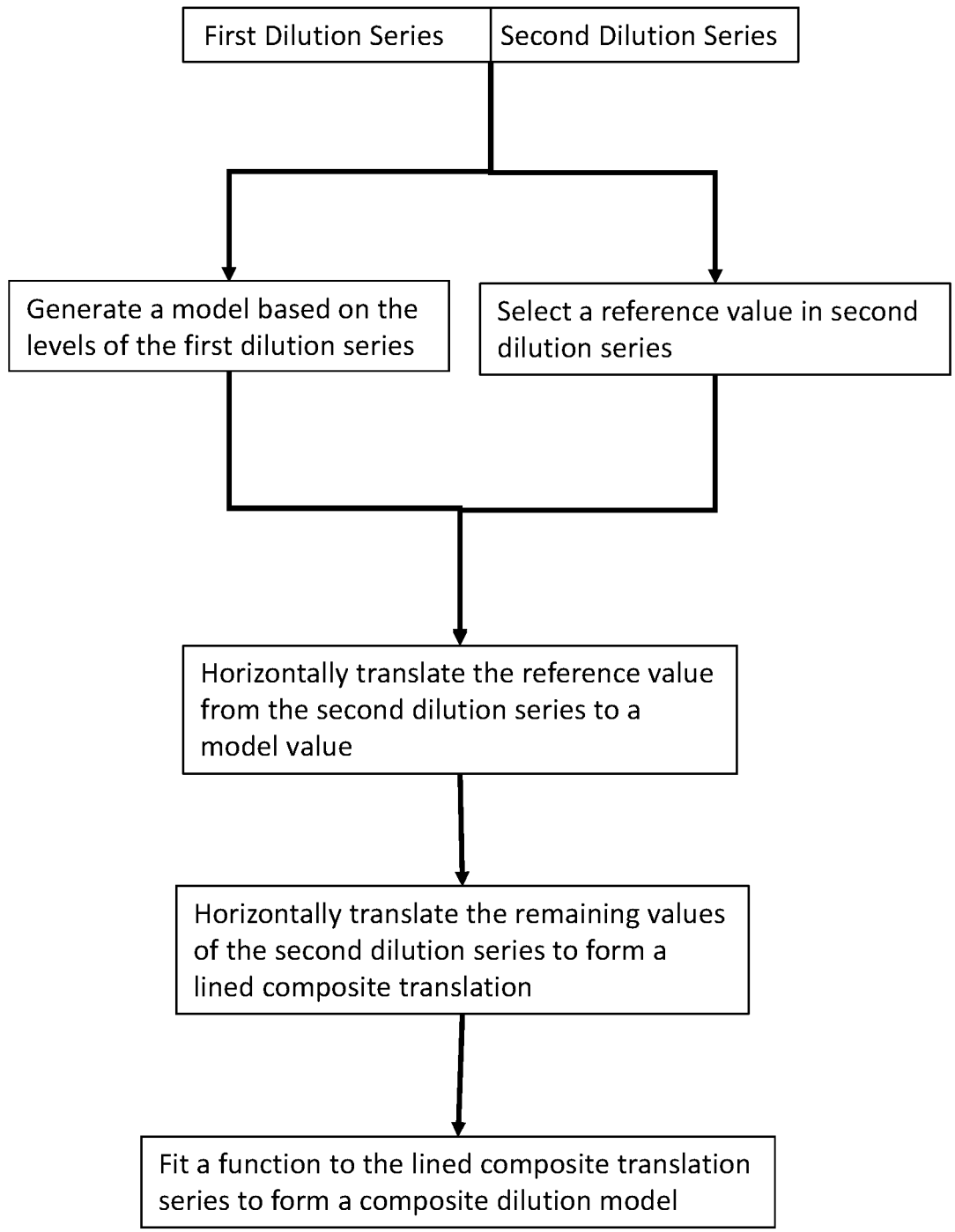
FIGS. 18A and 18B show a flow diagram (A) and graphs (B) demonstrating a first exemplary method of forming a composite dilution model.
Figure 18B:
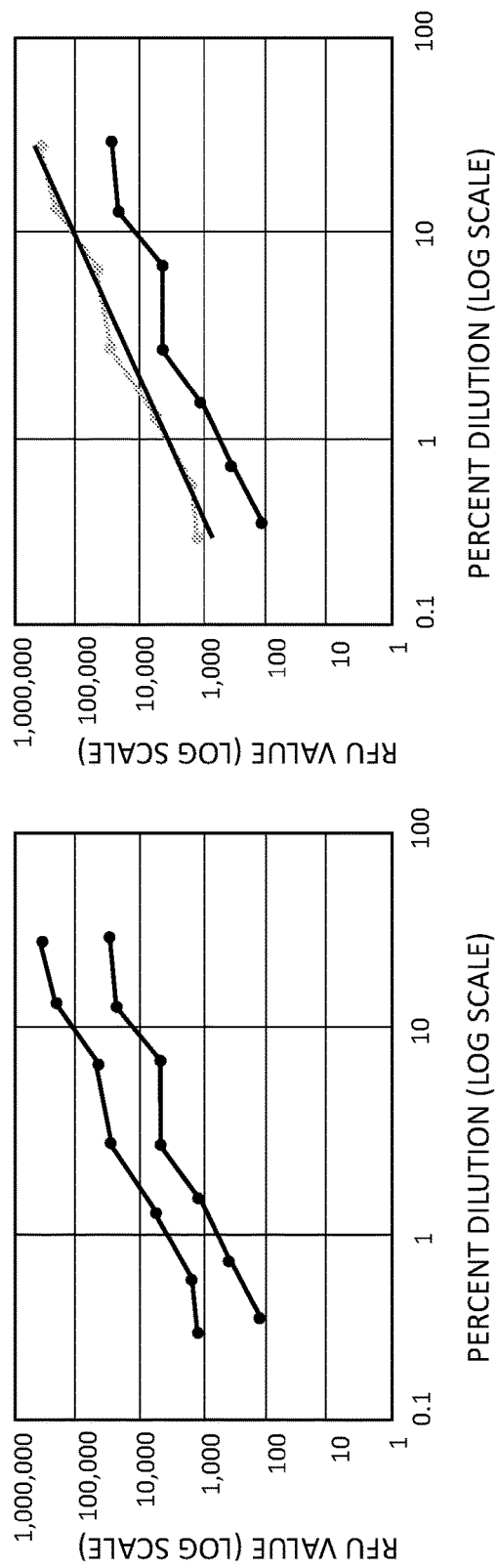
Figure 18B:
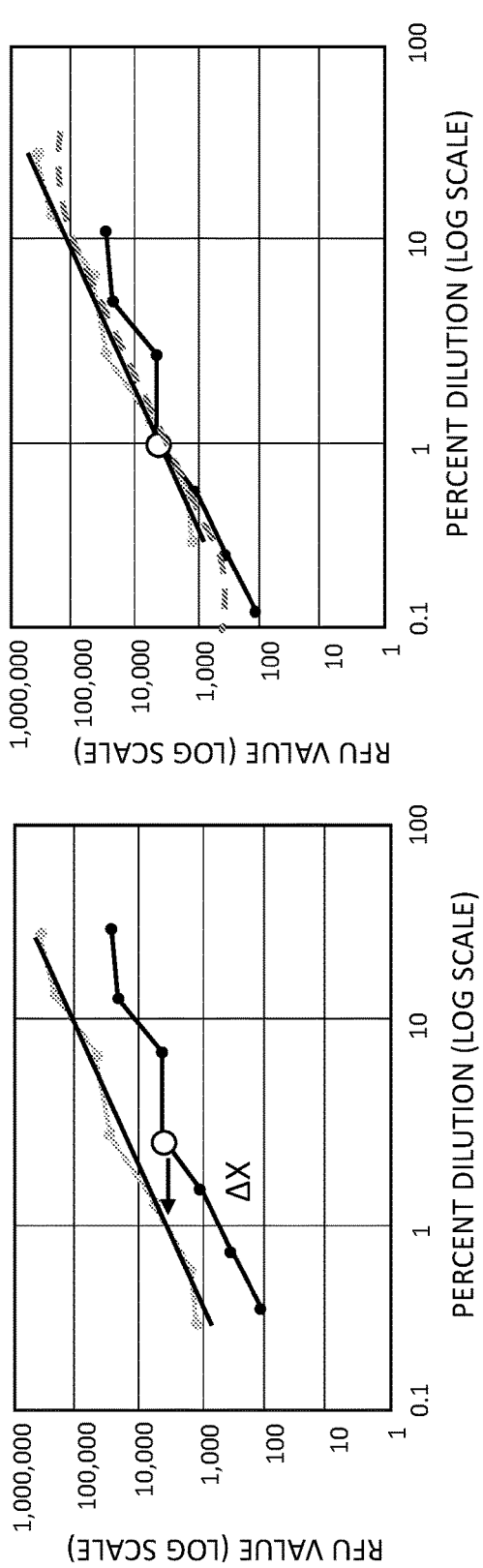

In certain embodiments, a composite dilution model is developed by the exemplary method shown in FIGS. 18A and 18B. Levels of an analyte are measured in a dilution series from a first biological sample and in a dilution series from a second biological sample. The first and second biological samples may be different time points from the same individual, or biological samples from different individuals. The dilution series comprises levels of the analyte at various dilutions of the sample. A model is generated based on the first dilution series. A reference value in the second dilution series is selected. In some embodiments, the selected reference value in the second dilution series is near the midpoint of the second dilution series, for example, in a portion of the series that appears to be substantially linear. The reference value in the second dilution series is then translated by an amount, $\Delta X$, to a point on the model. The remaining points (i.e., levels of the analyte at various dilutions) of the second dilution series are translated by the same amount, $\Delta X$, to form a lined composite translation. A composite dilution model is generated by fitting a function to the lined composite translation series. This composite dilution model can be used to determine the relative dilution of the biological test sample from the subject.

Figure 19A:
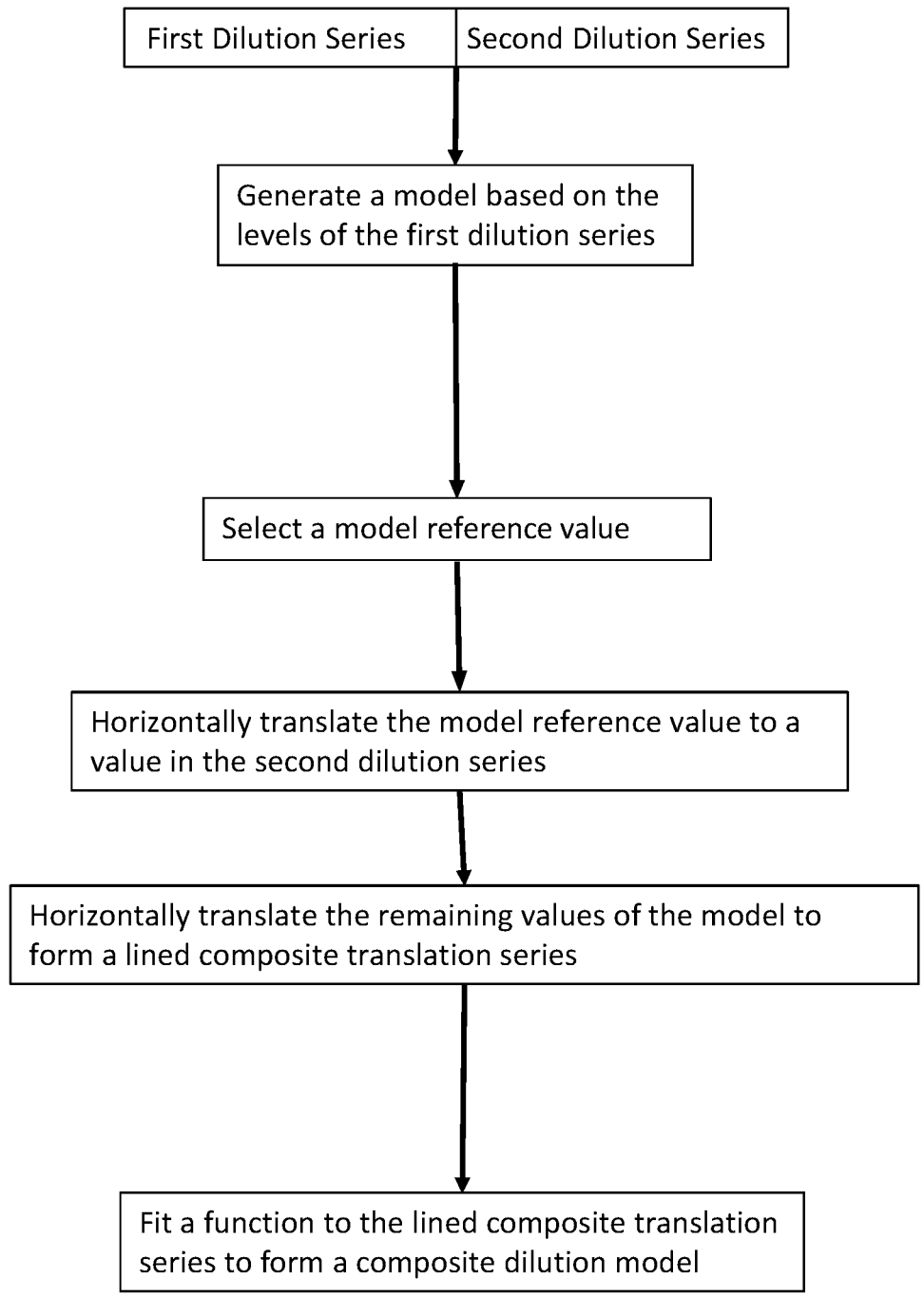
FIGS. 19A and 19B show a flow diagram (A) and graphs (B) demonstrating a second exemplary method of forming a composite dilution model.
Figure 19B:
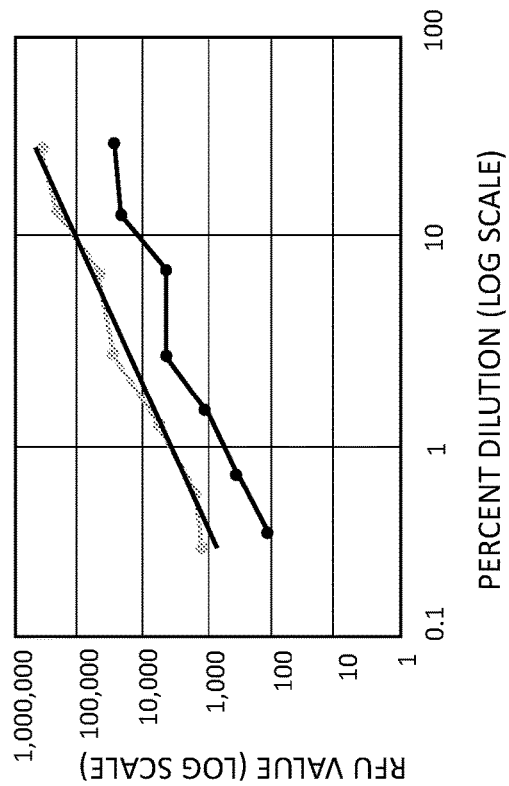
Figure 19B:
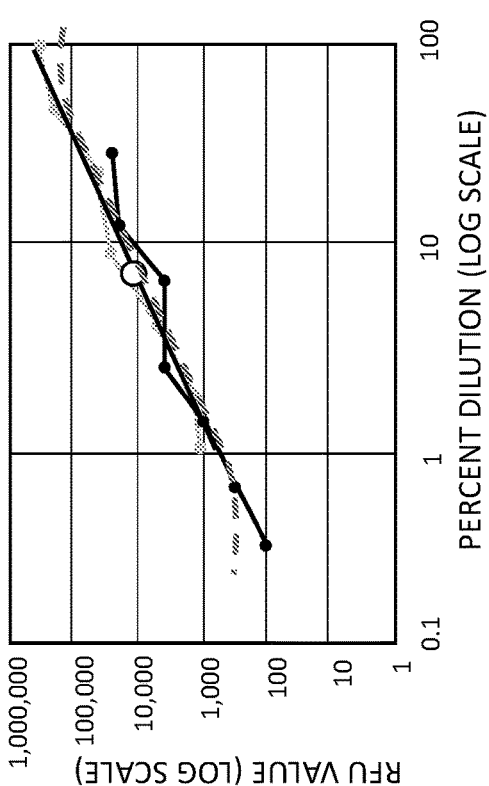
Figure 19B:
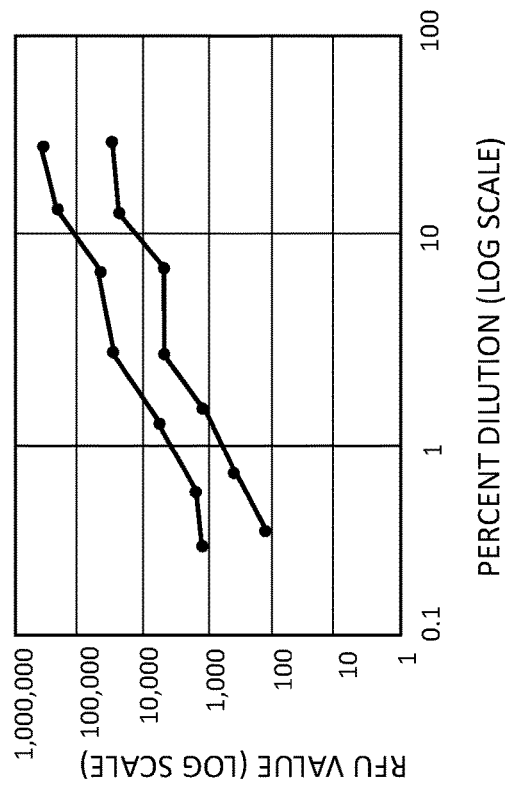
Figure 19B:
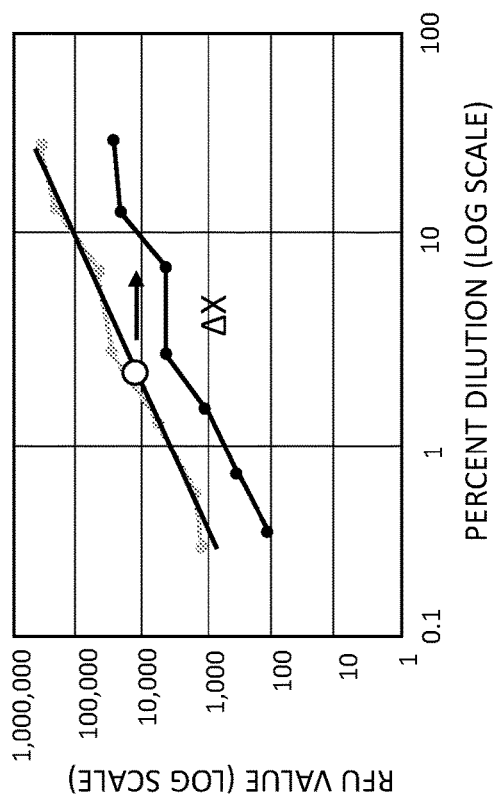

In certain embodiments, a composite dilution model is developed by the exemplary method shown in FIGS. 19A and 19B. Levels of an analyte are measured in a dilution series from a first biological sample and in a dilution series from a second biological sample. The first and second biological samples may be different time points from the same individual, or biological samples from different individuals. The dilution series comprises levels of the analyte at various dilutions of the sample. A model is generated based on the first dilution series. A reference value in the model is selected. In some embodiments, the model reference value is an analyte level at a specific dilution of the model. The reference value in the model is then translated by an amount, $\Delta X$, to a point in the second dilution series. The remaining values of the model are translated by the same amount, $\Delta X$, to form a lined composite translation series. A composite dilution model is generated by fitting a function to the lined composite translation series. This composite dilution model can be used to determine the relative dilution of the biological test sample from the subject.

Figure 20A:
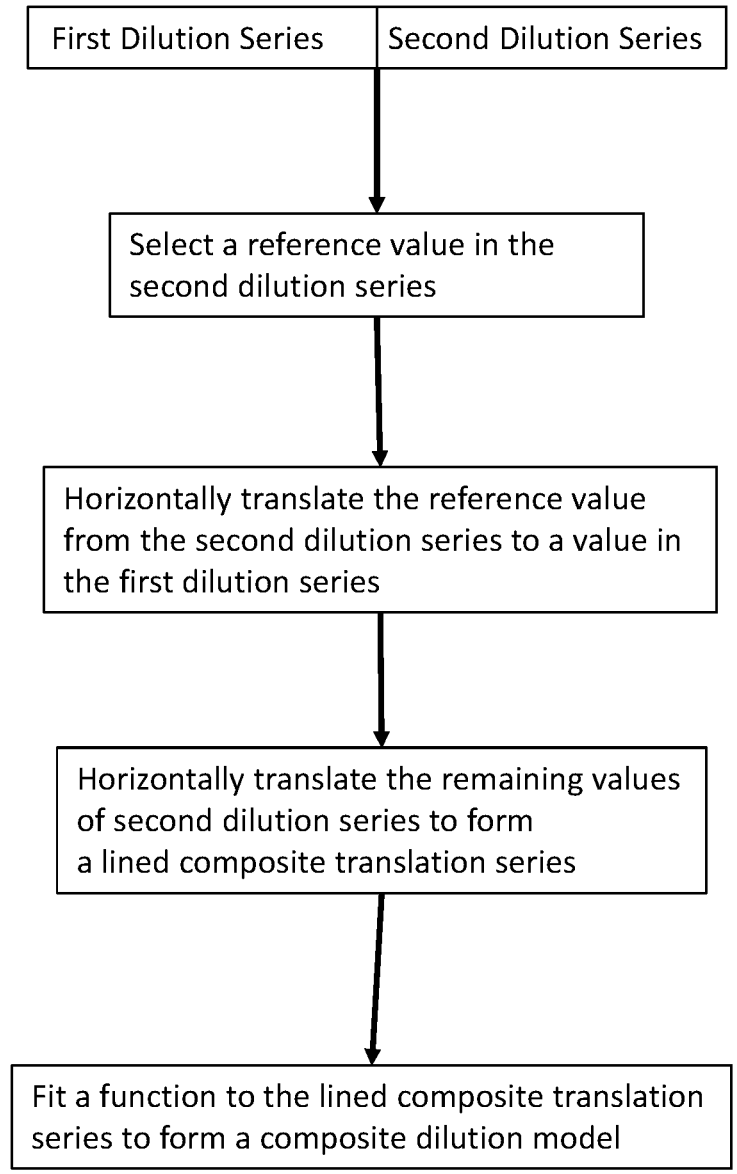
FIGS. 20A and 20B show a flow diagram (A) and graphs (B) demonstrating a third exemplary method of forming a composite dilution model.
Figure 20B:
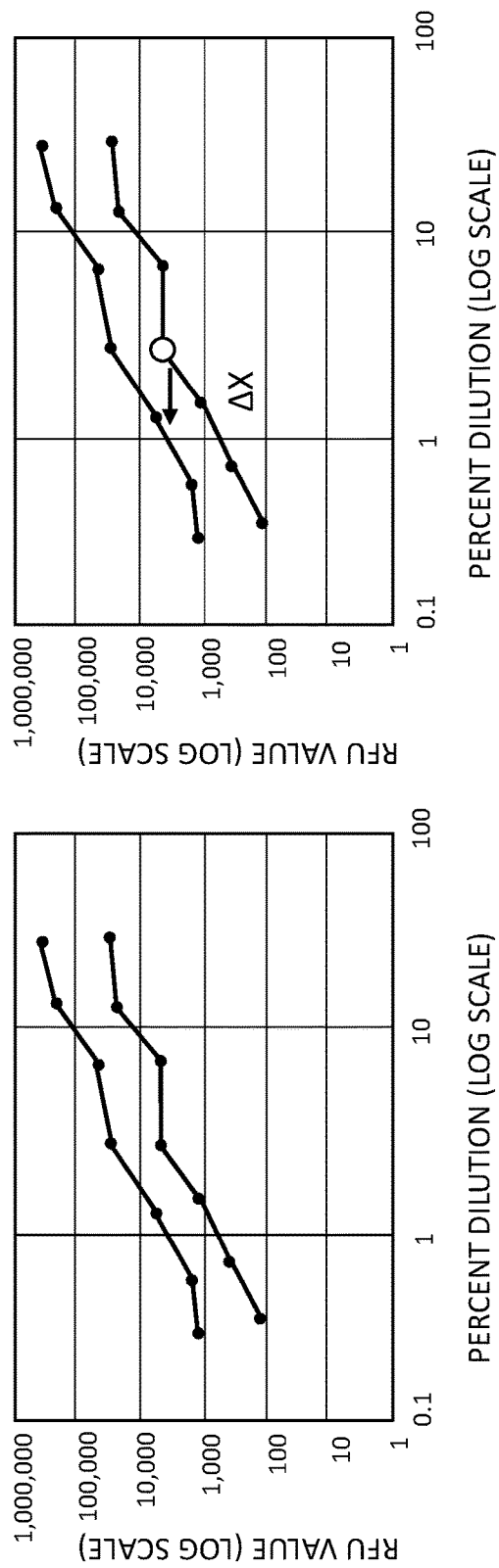
Figure 20B:
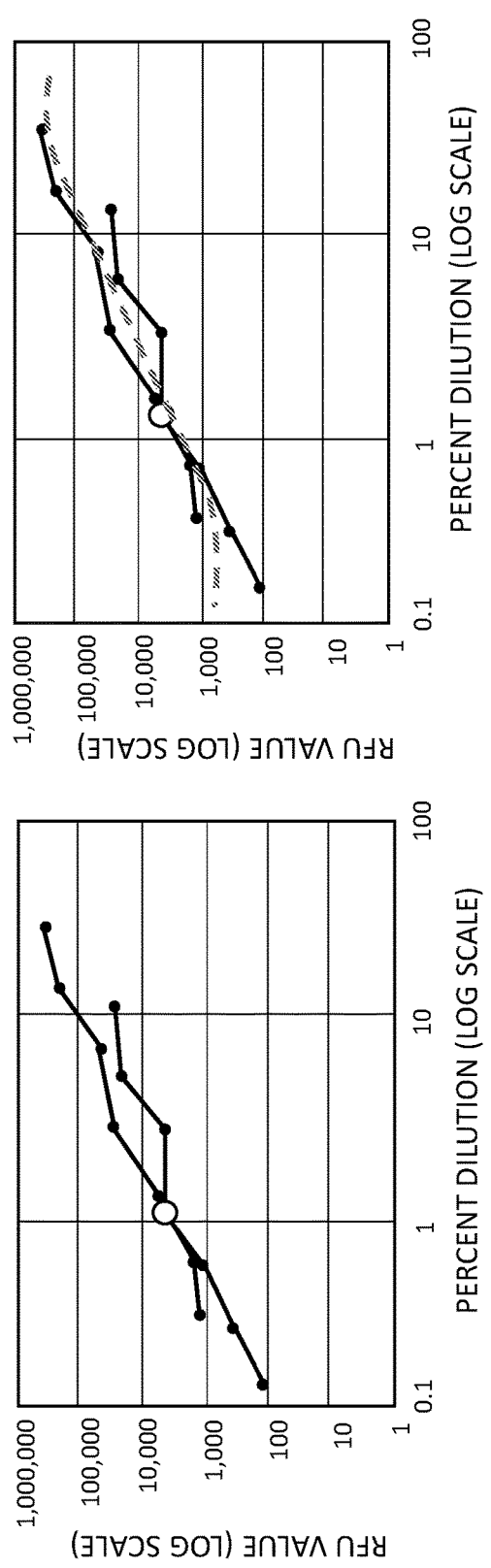

In certain embodiments, a composite dilution model is developed by the exemplary method shown in FIGS. 20A and 20B. Levels of an analyte are measured in a dilution series from a first biological sample and in a dilution series from a second biological sample. The first and second biological samples may be different time points from the same individual, or biological samples from different individuals. The dilution series comprises levels of the analyte at various dilutions of the sample. A reference value in the second dilution series is selected. In some embodiments, the selected reference value in the second dilution series is near the midpoint of the second dilution series, for example, in a portion of the series that appears to be substantially linear. The reference value in the second dilution series is then translated by an amount, $\Delta X$, to a value in the first dilution series. The remaining points (i.e., levels of the analyte at various dilutions) of the second dilution series are translated by the same amount, $\Delta X$, to form a lined composite translation series. A composite dilution model is generated by fitting a function to the lined composite translation series. This composite dilution model can be used to determine the relative dilution of the biological test sample from the subject.

Figure 21A:
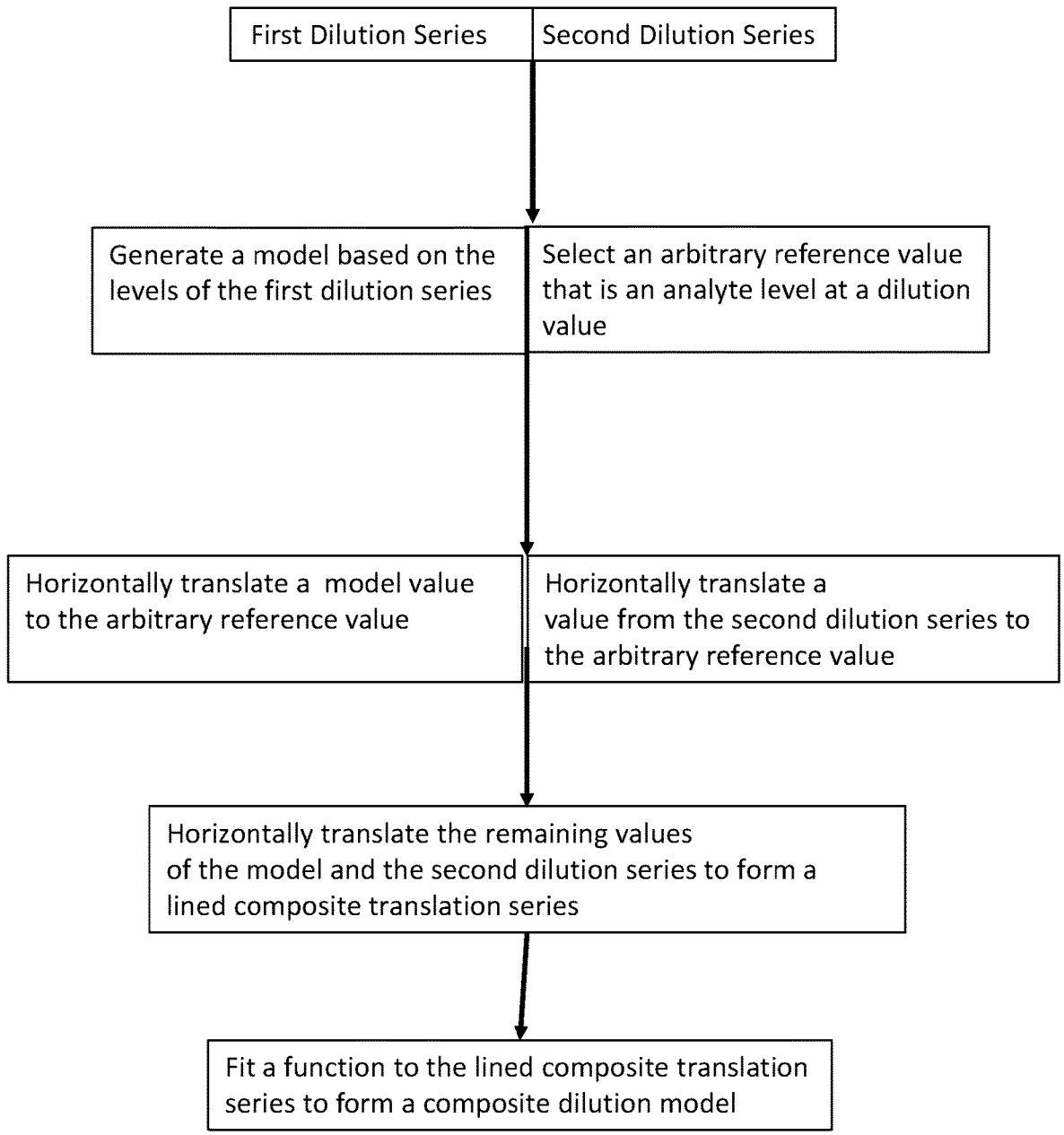
FIGS. 21A and 21B show a flow diagram (A) and graphs (B) demonstrating a fourth exemplary method of forming a composite dilution model.
Figure 21B:
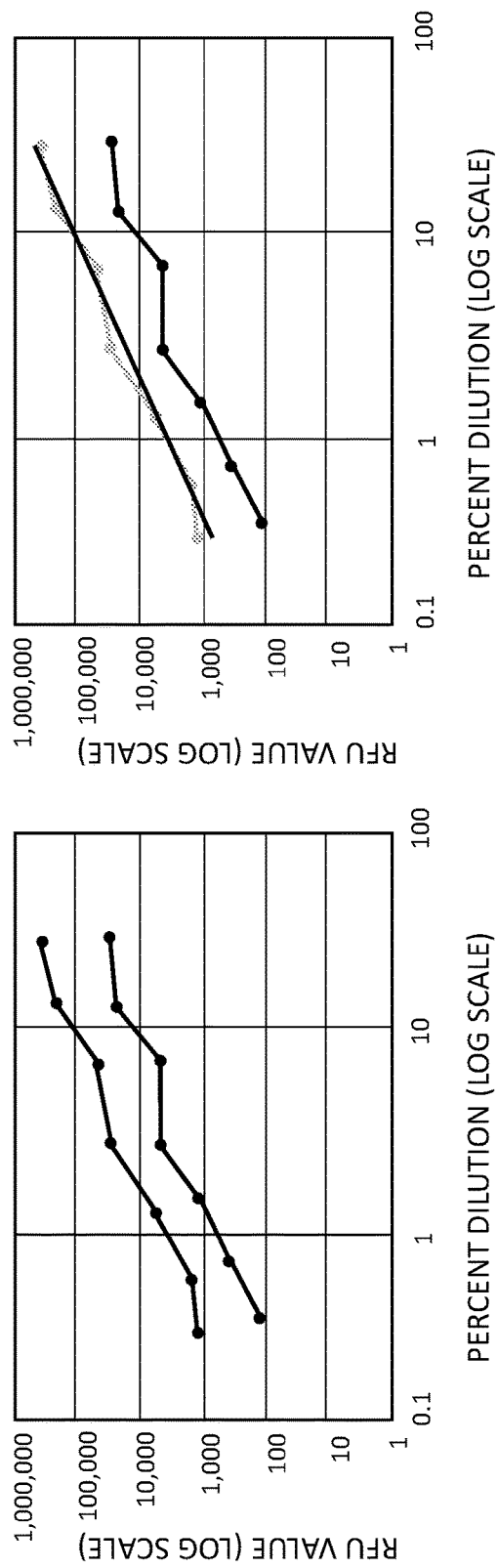
Figure 21B:
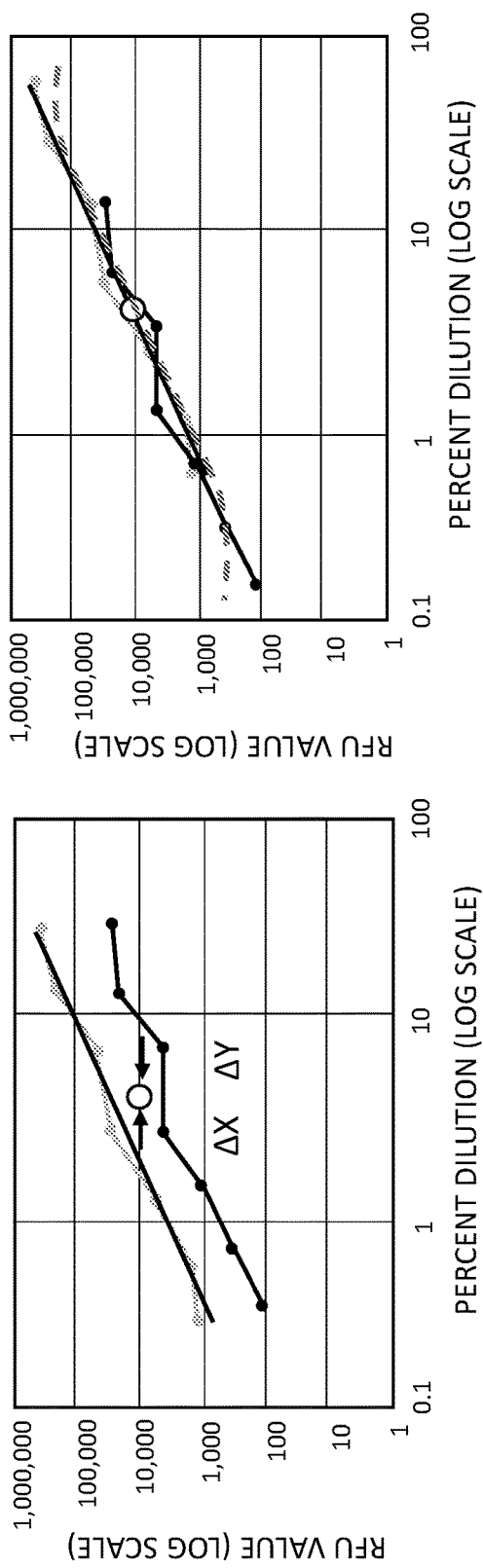

In certain embodiments, a composite dilution model is developed by the exemplary method shown in FIGS. 21A and 21B. Levels of an analyte are measured in a dilution series from a first biological sample and in a dilution series from a second biological sample. The first and second biological samples may be different time points from the same individual, or biological samples from different individuals. A model is generated based on the first dilution series. An arbitrary reference value that is an analyte level at a dilution value is selected. In some embodiments, the arbitrary reference value is an analyte level at a specific dilution not found in the second dilution series or the model. A point on the mathematic model is then translated by an amount, $\Delta X$, to the arbitrary reference value and a point on the second dilution series is translated by an amount, $\Delta Y$, to the arbitrary reference value. The remaining points (i.e., levels of the analyte at various dilutions) of the second dilution series are translated by the same amount, $\Delta Y$, and the remaining values of the model are translated by the same amount, $\Delta X$, to form a lined composite translation. A composite dilution model is generated by fitting a function to the lined composite translation series. This composite dilution model can be used to determine the relative dilution of the biological test sample from the subject.

Figure 22A:
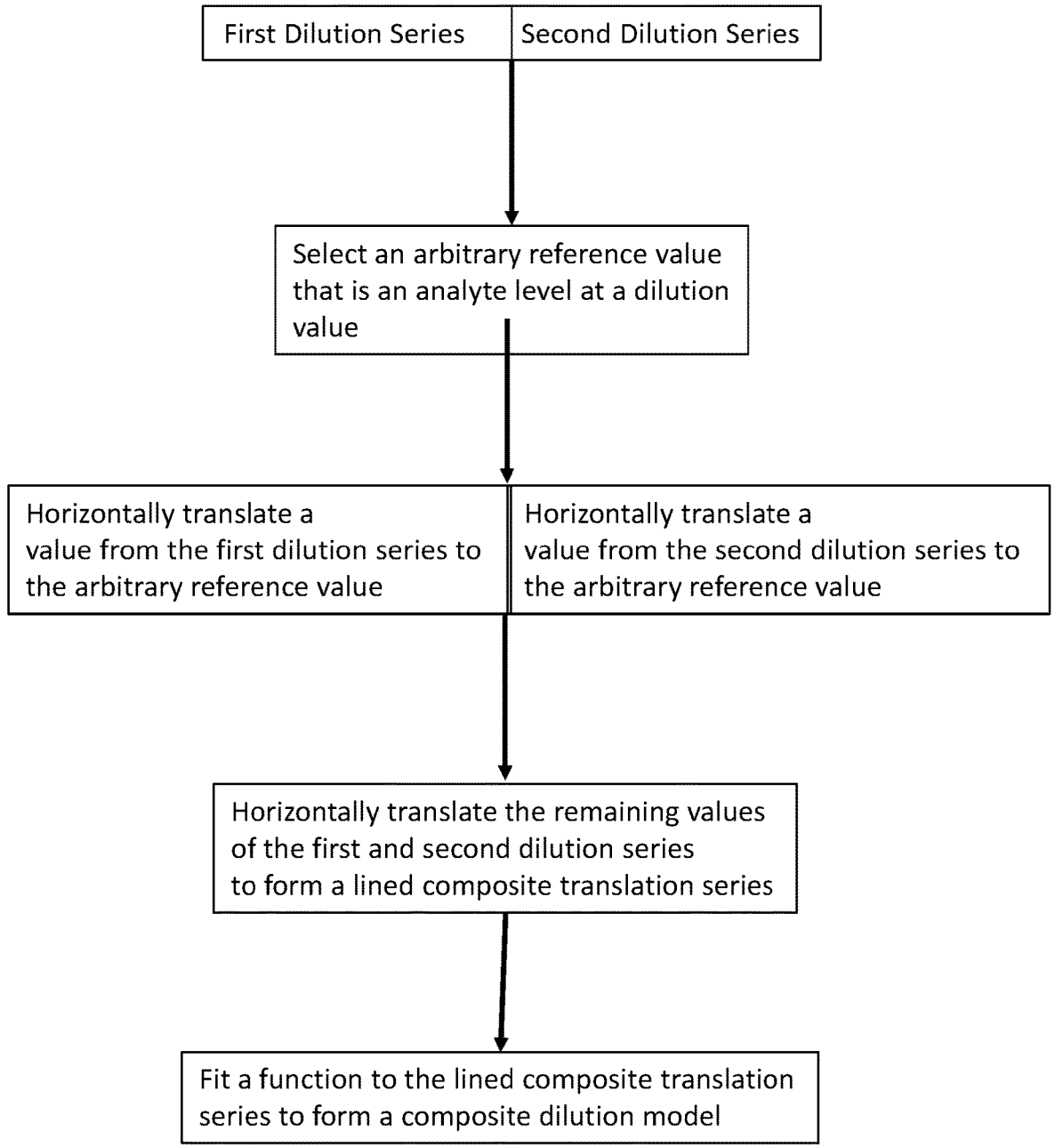
FIGS. 22A and 22B show a flow diagram (A) and graphs (B) demonstrating a fifth exemplary method of forming a composite dilution model.
Figure 22B:
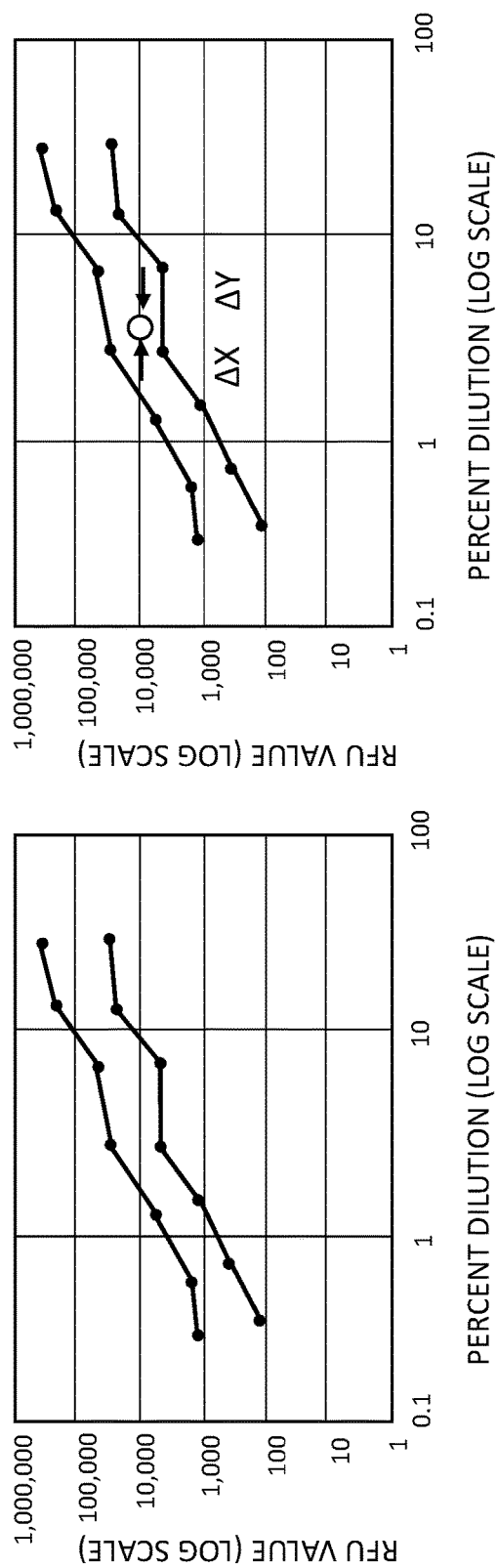
Figure 22B:
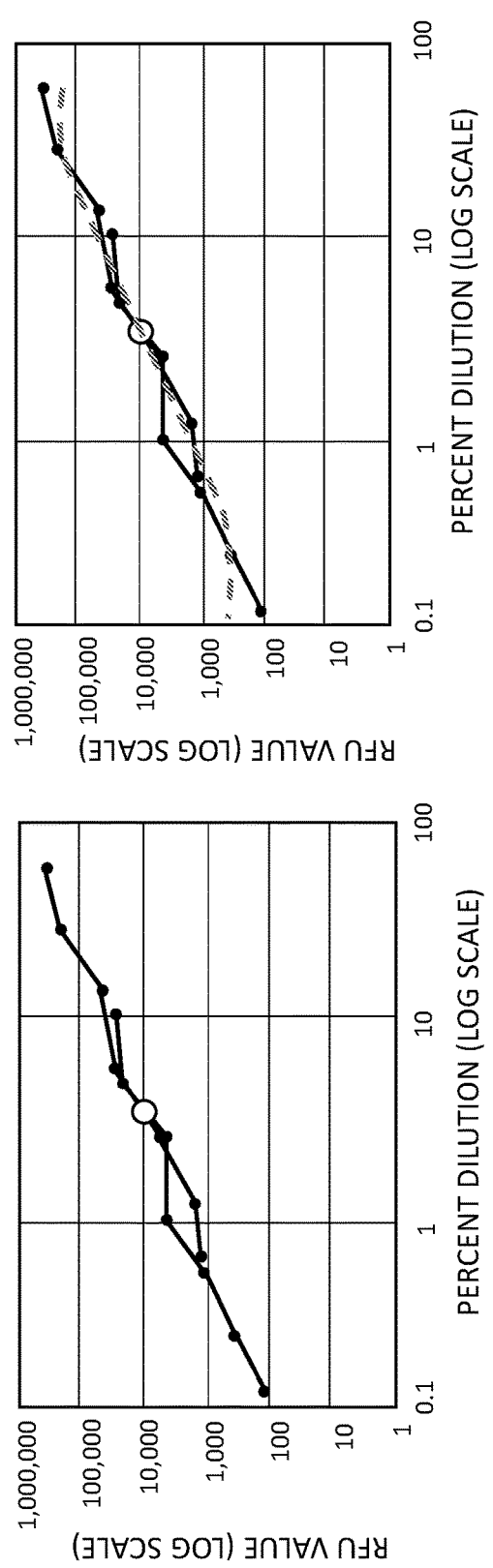

In certain embodiments, a composite dilution model is developed by the exemplary method shown in FIG. 22A. Levels of an analyte are measured in a dilution series from a first biological sample and in a dilution series from a second biological sample. The first and second biological samples may be different time points from the same individual, or biological samples from different individuals. The dilution series show levels of the analyte at various dilutions of the sample. An arbitrary reference value that is an analyte level at a dilution value is selected. In some embodiments, the arbitrary reference value is an analyte level at a specific dilution not found in the first dilution series or the second dilution series. A point on the first dilution series is then translated by an amount, $\Delta X$, to the arbitrary reference value and a point on the second dilution series is translated by an amount, $\Delta Y$, to the arbitrary reference value. The remaining points (i.e., levels of the analyte at various dilutions) of the first dilution series are translated by the same amount, $\Delta X$, and the remaining points (i.e., levels of the analyte at various dilutions) of the second dilution series are translated by the same amount, $\Delta Y$, to form a lined composite translation. A composite dilution model is generated by fitting a function to the lined composite translation series. This composite dilution model can be used to determine the relative dilution of the biological test sample from the subject.

Figure 23A:
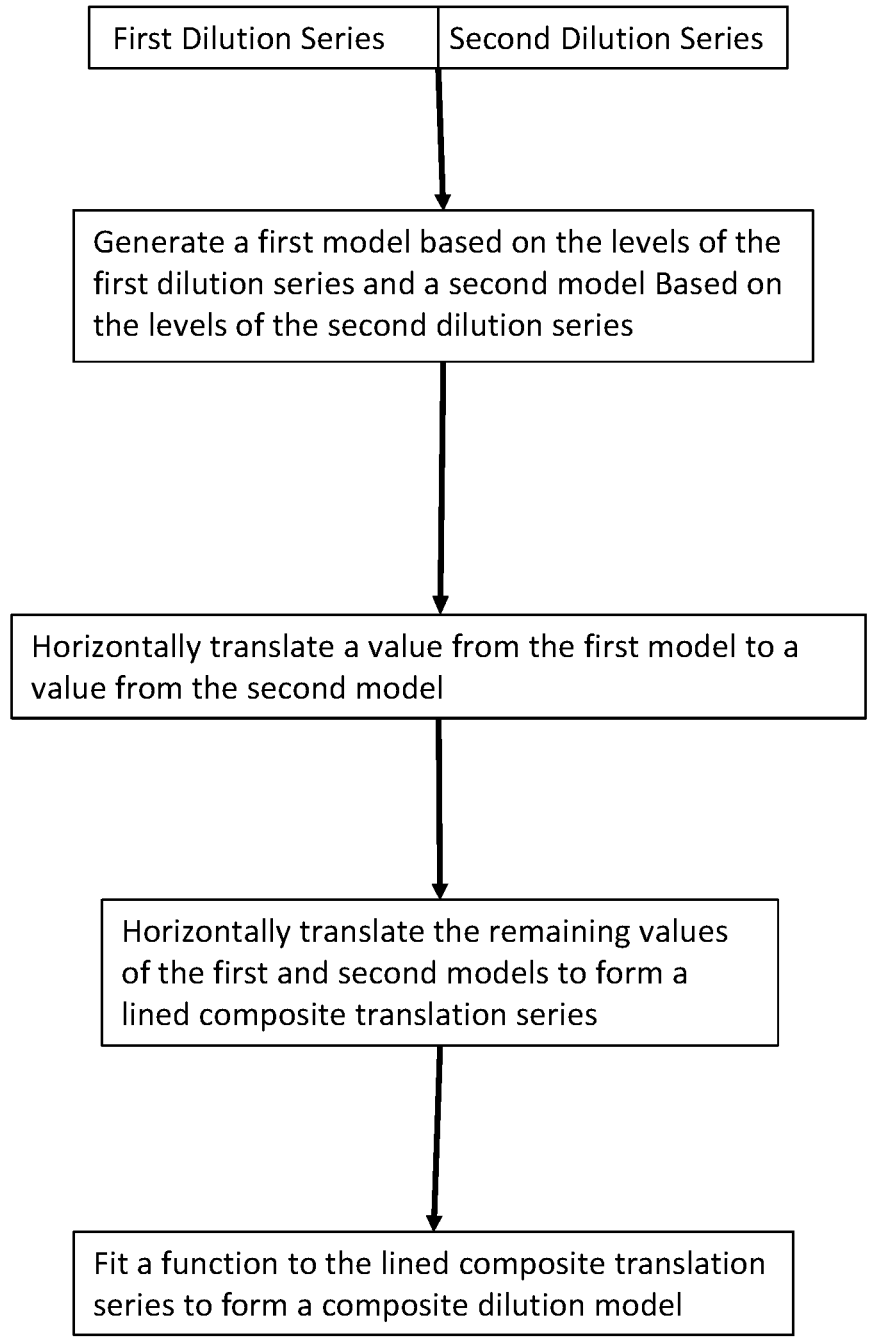
FIGS. 23A and 23B show a flow diagram (A) and graphs (B) demonstrating a sixth exemplary method of forming a composite dilution model.
Figure 23B:
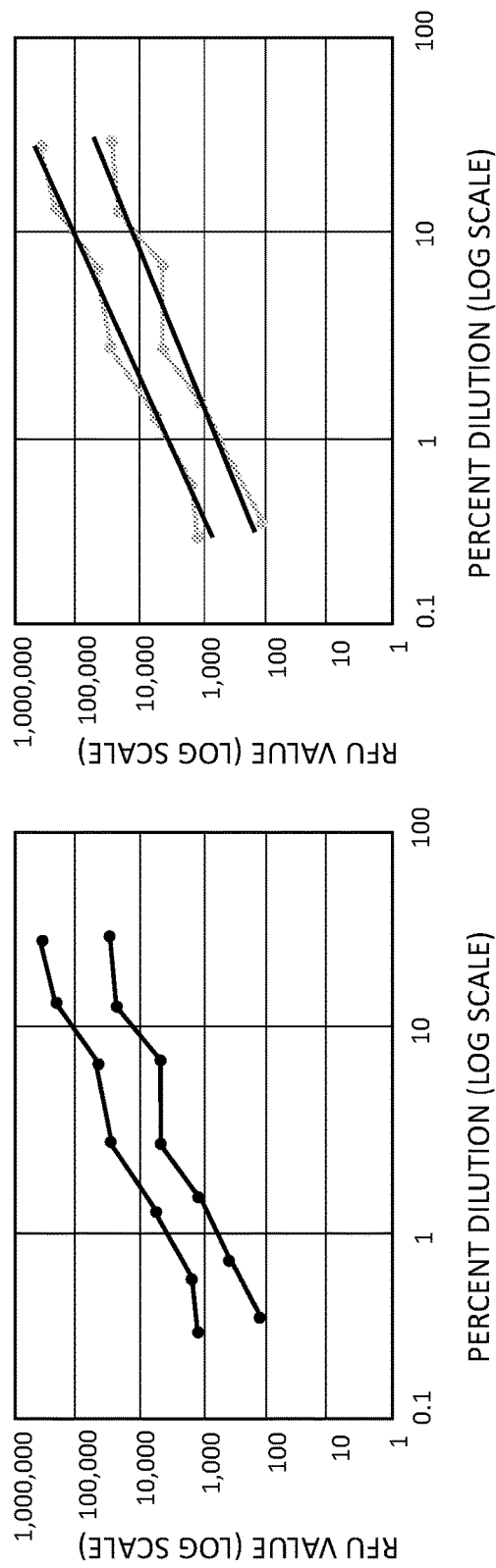
Figure 23B:
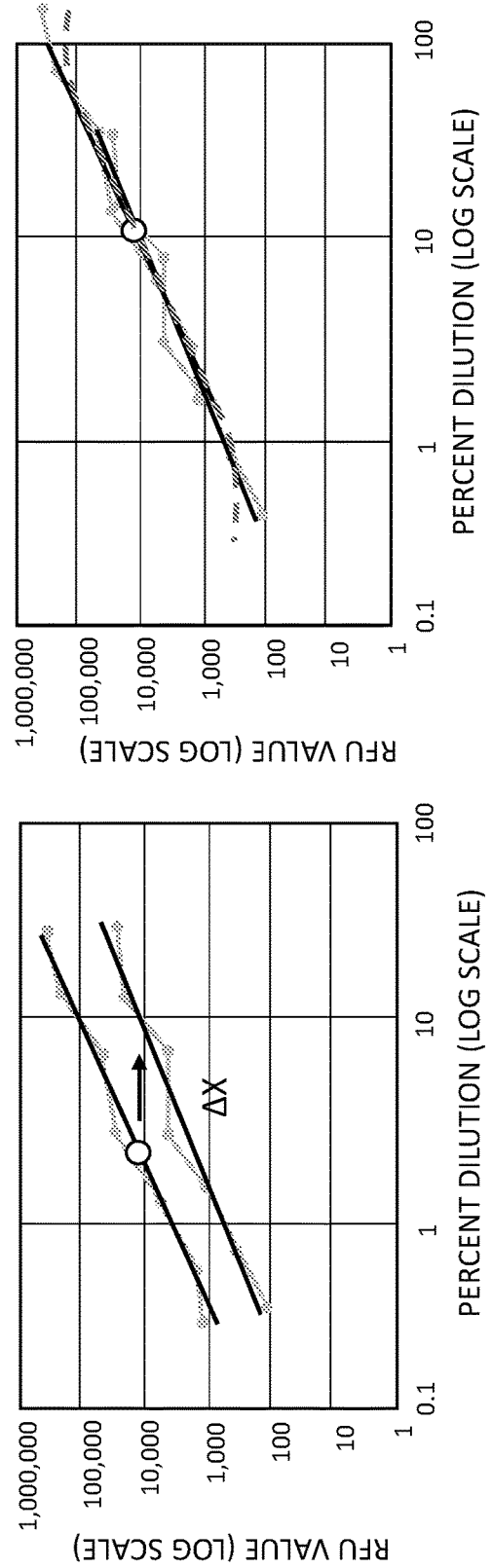

In certain embodiments, a composite dilution model is developed by the exemplary method shown in FIGS. 23A and 23B. Levels of an analyte are measured in a dilution series from a first biological sample and in a dilution series from a second biological sample. The first and second biological samples may be different time points from the same individual, or biological samples from different individuals. The dilution series show levels of the analyte at various dilutions of the sample. A first model is generated based on the levels of the analyte of the first dilution series, and a second model is generated based on the levels of the analyte of the second dilution series. A value from the first model is then translated by an amount, $\Delta X$, to a value in the second model. The remaining values of the first model are then translated by the same amount, $\Delta X$, to form a lined composite translation. A composite dilution model is generated by fitting a function to the lined composite translation series. This composite dilution model can be used to determine the relative dilution of the biological test sample from the subject.

Figure 24A:
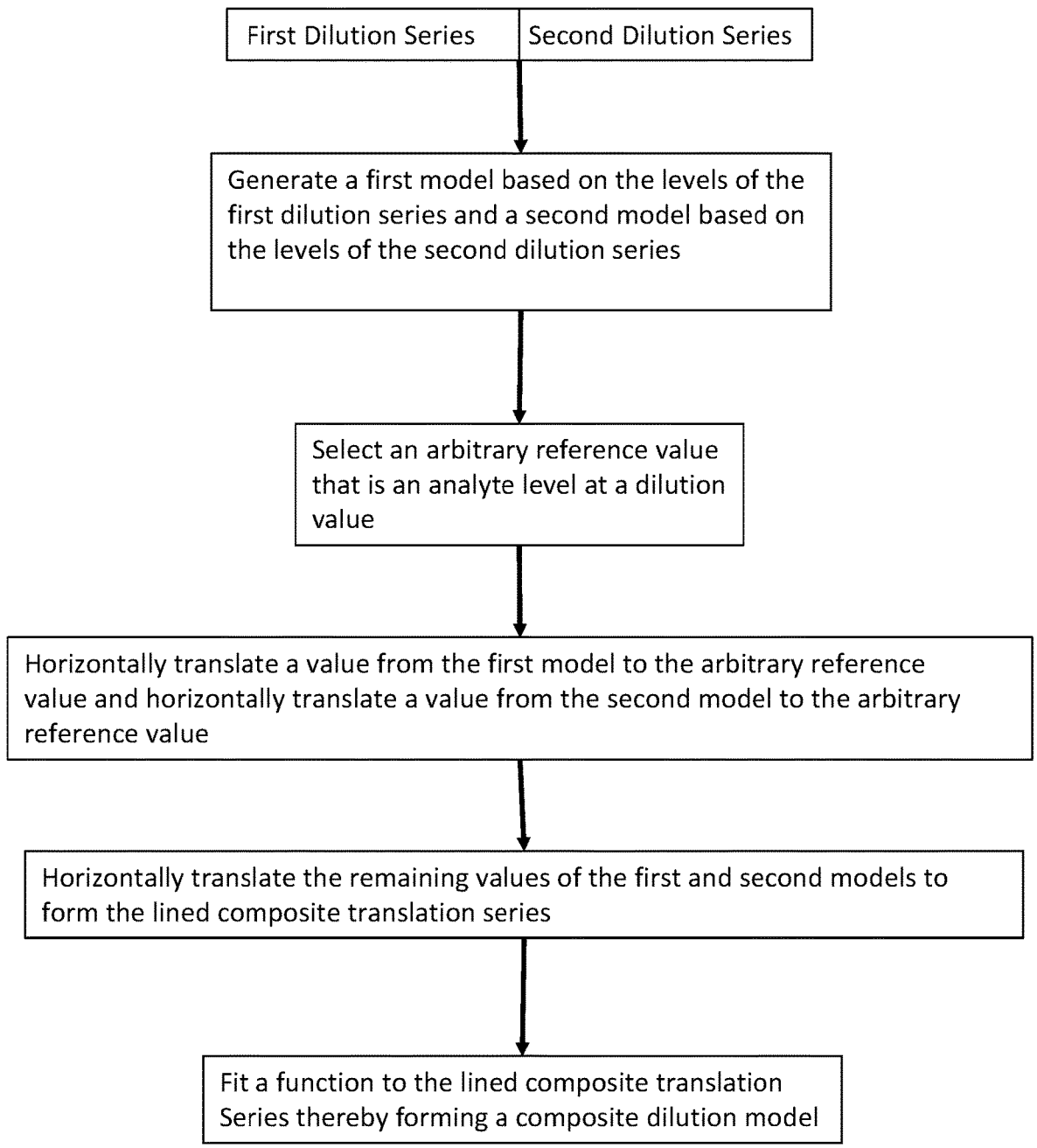
FIGS. 24A and 24B show a flow diagram (A) and graphs (B) demonstrating a seventh exemplary method of forming a composite dilution model.
Figure 24B:
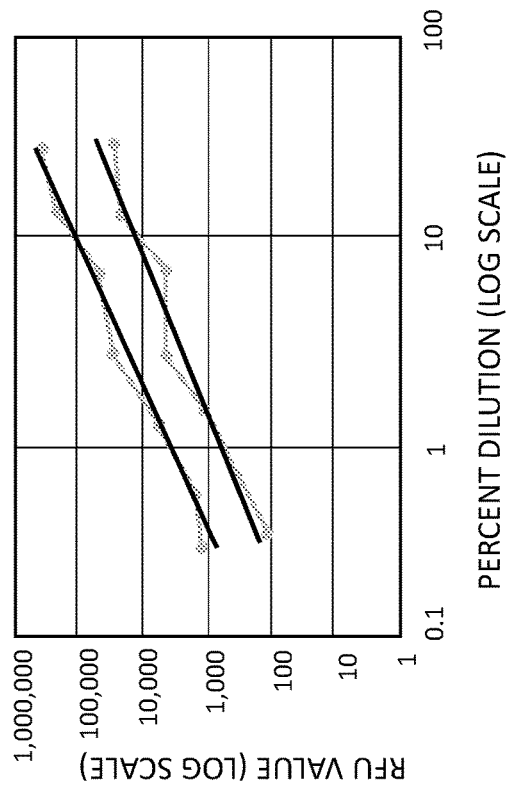
Figure 24B:
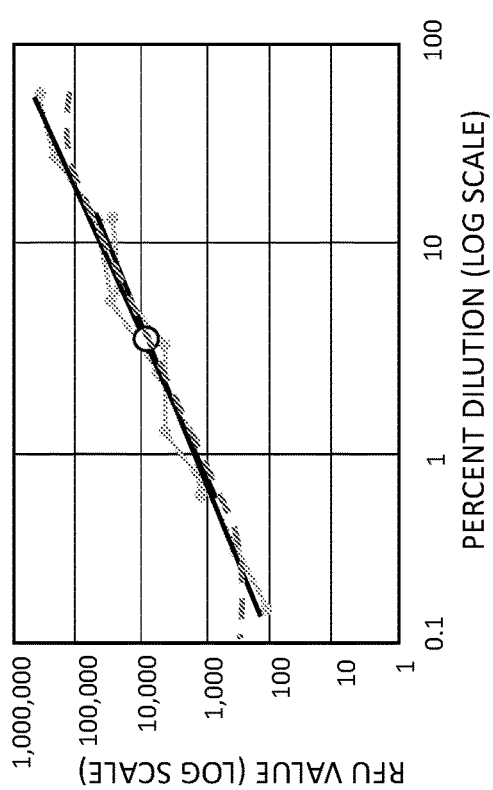
Figure 24B:
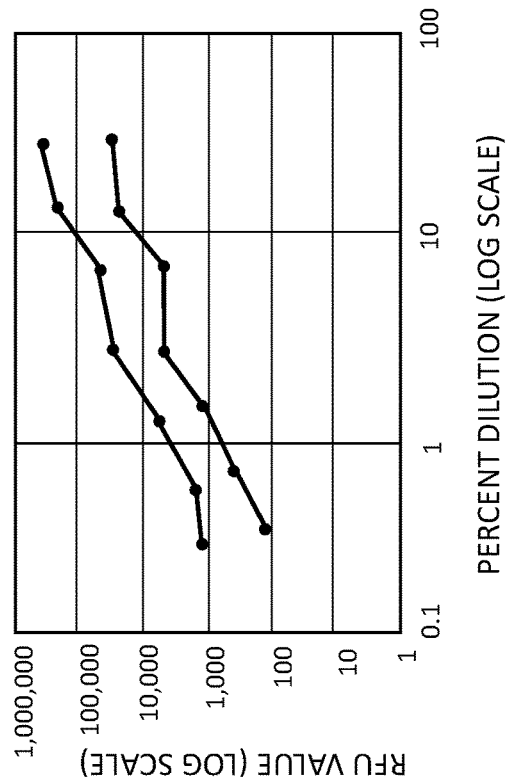
Figure 24B:
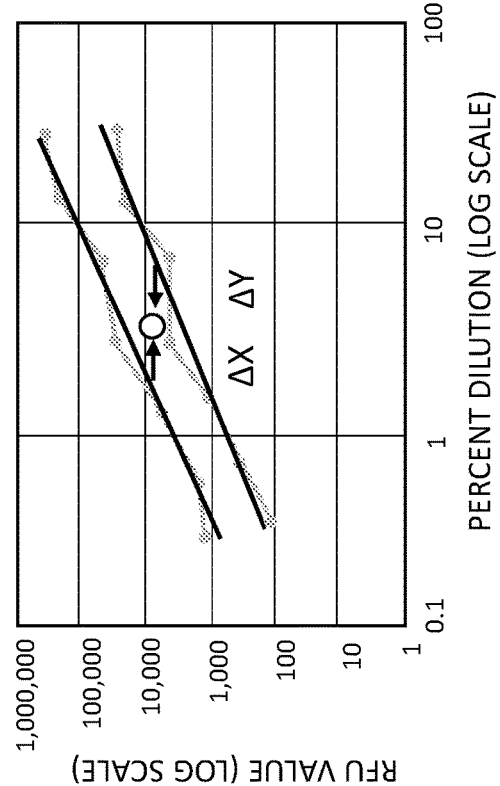

In certain embodiments, a composite dilution model is developed by the exemplary method shown in FIGS. 24A and 24B. Levels of an analyte are measured in a dilution series from a first biological sample and in a dilution series from a second biological sample. The first and second biological samples may be different time points from the same individual, or biological samples from different individuals. The dilution series show levels of the analyte at various dilutions of the sample. A first model is generated based on the levels of the analyte of the first dilution series, and a second model is generated based on the levels of the analyte of the second dilution series. An arbitrary reference value that is an analyte level at a dilution value is selected. In some embodiments, the arbitrary reference value is an analyte level at a specific dilution not found in the first dilution series or the second dilution series. A point on the first model is then translated by an amount, $\Delta X$, to the arbitrary reference value and a point on the second model is translated by an amount, $\Delta Y$, to the arbitrary reference value. The remaining values of the first model are translated by the same amount, $\Delta X$, and the remaining values of the second model are translated by the same amount, $\Delta Y$, to form a lined composite translation. A composite dilution model is generated by fitting a function to the lined composite translation series. This composite dilution model can be used to determine the relative dilution of the biological test sample from the subject.

Any suitable model may be used in the methods described herein, including the models generated from the levels of the analytes in the first and/or second dilutions series, and the models used to generate the composite dilutions model. Exemplary models that may be used in the methods include, but are not limited to, linear regression models, LOESS curve fitting models, non-linear regression models, spline fit models, mixed effects regression models, fixed effects regression models, generalized linear models, matrix decomposition models, and/or four parameter logistic regression (4PL) models, and the like. The models generated from the levels of the analyte in the first and/or second dilution series may be the same or different. Similarly, the model used to generate the composite dilution model may be the same or different from one or more of the models generated from the levels of the analytes. One of ordinary skill in the art can select suitable models according to the particular application, and many such models are known in the art.

In some embodiments, following development of the composite dilution model, or using a composite dilution model previously developed, the relative dilution of a biological test sample may be determined. In some such embodiments, the level of at least one analyte from the biological test sample is horizontally translated to the composite dilution model developed for the at least one analyte. The relative dilution of the biological test sample may thereby be determined. In some embodiments, composite dilution models may be developed using a set of analytes, such as, for example, at least 10, 20, 30, 40, 50, 60, 70, 80, 90, 100, 120, 140, 160, 180, or 200 analytes. The relative dilution of a biological test sample is then determined for a subset of, or each of the analytes. The relative dilution of the biological test sample is then determined, in some embodiments, using the average, mean, median, or the like, of the relative dilutions based on each of the analytes. In some embodiments, analytes are selected that are not expected to vary in level between individuals, such as, for example, between individuals with and without a disease or condition.

Computer Devices, Methods and Software

In one aspect, the system further comprises one or more devices for providing input data to one or more processors. The system further comprises a memory for storing a data set of ranked data elements.

In another aspect, the device for providing input data comprises a detector for detecting a characteristic of the data element, e.g., such as a mass spectrometer or gene chip reader.

The system additionally may comprise a database management system. User requests or queries can be formatted in an appropriate language understood by the database management system that processes the query to extract the relevant information from the database of training sets.

The system may be connectable to a network to which a network server and one or more clients are connected. The network may be a local area network (LAN) or a wide area network (WAN), as is known in the art. Preferably, the server includes the hardware necessary for running computer program products (e.g., software) to access database data for processing user requests.

The system may include an operating system (e.g., UNIX® or Linux) for executing instructions from a database management system. In one aspect, the operating system can operate on a global communications network, such as the internet, and utilize a global communications network server to connect to such a network.

The system may include one or more devices that comprise a graphical display interface comprising interface elements such as buttons, pull down menus, scroll bars, fields for entering text, and the like as are routinely found in graphical user interfaces known in the art. Requests entered on a user interface can be transmitted to an application program in the system for formatting to search for relevant information in one or more of the system databases. Requests or queries entered by a user may be constructed in any suitable database language.

The graphical user interface may be generated by a graphical user interface code as part of the operating system and can be used to input data and/or to display inputted data. The result of processed data can be displayed in the interface, printed on a printer in communication with the system, saved in a memory device, and/or transmitted over the network or can be provided in the form of the computer readable medium.

The system can be in communication with an input device for providing data regarding data elements to the system (e.g., expression values). In one aspect, the input device can include a gene expression profiling system including, e.g., a mass spectrometer, gene chip or array reader, and the like.

The computer system may be a stand-alone system or part of a network of computers including a server and one or more databases.

Some embodiments described herein can be implemented so as to include a computer program product. A computer program product may include a computer readable medium having computer readable program code embodied in the medium for causing an application program to execute on a computer with a database.

As used herein, a "computer program product" refers to an organized set of instructions in the form of natural or programming language statements that are contained on a physical media of any nature (e.g., written, electronic, magnetic, optical or otherwise) and that may be used with a computer or other automated data processing system. Such programming language statements, when executed by a computer or data processing system, cause the computer or data processing system to act in accordance with the particular content of the statements. Computer program products include without limitation: programs in source and object code and/or test or data libraries embedded in a computer readable medium. Furthermore, the computer program product that enables a computer system or data processing equipment device to act in pre-selected ways may be provided in a number of forms, including, but not limited to, original source code, assembly code, object code, machine language, encrypted or compressed versions of the foregoing and any and all equivalents.

While various embodiments have been described as methods or apparatuses, it should be understood that embodiments can be implemented through code coupled with a computer, e.g., code resident on a computer or accessible by the computer. For example, software and databases could be utilized to implement many of the methods discussed above. Thus, in addition to embodiments accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments also be considered protected by this patent in their program code means as well.

Furthermore, the embodiments may be embodied as code stored in a computer-readable memory of virtually any kind including, without limitation, RAM, ROM, magnetic media, optical media, or magneto-optical media. Even more generally, the embodiments could be implemented in software, or in hardware, or any combination thereof including, but not limited to, software running on a general purpose processor, microcode, programmable logic arrays (PLAs), or application-specific integrated circuits (ASICs).

It is also envisioned that embodiments could be accomplished as computer signals embodied in a carrier wave, as well as signals (e.g., electrical and optical) propagated through a transmission medium. Thus, the various types of information discussed above could be formatted in a structure, such as a data structure, and transmitted as an electrical signal through a transmission medium or stored on a computer readable medium.

Figure 25:
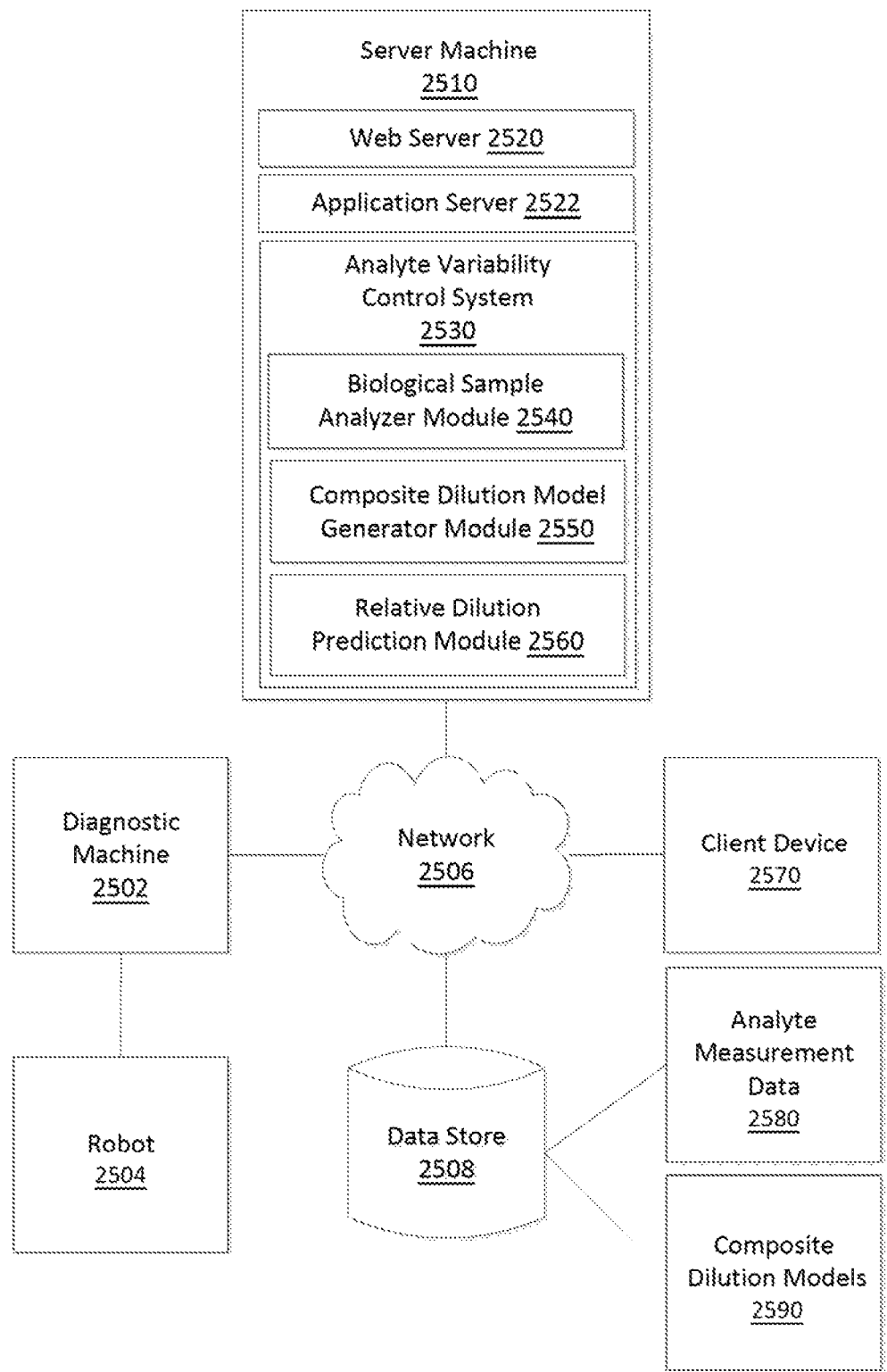
FIG. 25 is a block diagram illustrating an example system architecture, in accordance with various examples of the present disclosure.

FIG. 25 illustrates an example system architecture 2500 in which examples of the present disclosure can be implemented. System architecture 2500 includes diagnostic machine 2502, robot 2504, network 2506, data store 2508, server machine 2510, web server 2520, application server 2522, analyte variability control system 2530, biological sample analyzer module 2540, composite dilution model generator module 2550, relative dilution prediction module 2560, client device 2570, analyte measurement data 2580, and composite dilution models 2590.

Diagnostic machine 2502 is diagnostic equipment that receives and analyzes one or more biological samples. For example, various types of biological samples may include, but are not limited to, urine, blood, plasma, serum, cerebrospinal fluid, or generally any other type of biological fluid. Diagnostic machine 2502 may collect or generate analyte measurement data 2580 based on analyzing a biological sample, and such data may be stored or transferred to one or more other internal or external machines for processing, analysis, or use. Further, diagnostic machine 2502 generally may refer to one or more pieces of diagnostic equipment involved in processing biological samples such Affymetrix® or Illumina® microarray machines.

In an example, robot 2504 drives, handles, and/or delivers biological samples within diagnostic machine 2502 or amongst a plurality of diagnostic machines 2502 as part of processing biological samples. For example, robot 2504 generally may include, but is not limited to a TECAN® robot 2502 or any other robotic machines that provide automated or semi-automated processing of biological samples in a lab environment.

In an example, diagnostic machine 2502 communicates with one or more data store(s) 2508 and one or more server machine(s) 2510 via one or more network(s) 2506. Network 2506 generally may be a public network (e.g., the Internet), a private network (e.g., a local area network (LAN) or wide area network (WAN)), or a combination thereof. In an example, network 2506 may include the Internet and/or one or more intranets, landline networks, wireless networks, and/or other appropriate types of communication networks. In one example, network 2506 may comprise a wireless telecommunications network (e.g., cellular phone network) adapted to communicate with other communication networks, such as the Internet.

Data store 2508 is persistent storage that is capable of storing various types of data, such as alphanumeric text, audio, video and/or image content. In some examples data store 2508 may be a network-attached file server, while in other examples data store 2508 might be some other type of persistent storage such as an object-oriented database, a relational database, and so forth.

In an example, diagnostic machine 2502 may store and access various types of data including analyte measurement data 2580 over network 2506. Diagnostic machine 2502 also may store and access such data on one or more local data store(s) 2508 associated with diagnostic machine 2502 (not shown) and/or one or more data store(s) 2508 local to server machine 2510 or one or more other computing systems (not shown). In an example, analyte measurement data 2580 may include, but is not limited to relative fluorescence unit measurements for each of a plurality of analytes or proteins associated with one or more biological samples.

Data store 2508 also may receive, store, and provide composite dilution models 2590 for use in controlling inter-sample analyte variability in complex biological matrices. Composite dilution models 2590 may be generated from analyte measurement data 2580 or may be directly or indirectly provided from another source. Further, composite dilution models 2590 may be used to determine a predictive relative dilution for a biological sample type, which then may be used to adjust the relative dilution or other aspects of any one or more different, additional, or newly received biological samples.

Server machine 2510 generally may be specialized diagnostic hardware, a rackmount server, a personal computer, a portable digital assistant, a mobile phone, a laptop computer, a tablet computer, a netbook, a desktop computer, or any combination thereof. Server machine 2510 may include web server 2520, application server 2522, and script detection system 2530. In some examples, each of web server 2520, application server 2522 and/or script detection system 2530 may run on one or more different server machine(s) 2510.

Web server 2520 may serve text, audio, video, and image content from server machine 2510 and/or data store 2508 to one or more client device(s) 2570. Web server 2520 also may provide web-based application services and business logic to client device(s) 2570. Client device(s) 2570 may locate, access, and consume various forms of content and services from web server 2520 using applications, such as a web browser. Web server 2520 also may receive text such as existing and new analyte measurement data 2580, audio, video and image content from client device(s) 2570 that is saved in one or more data store(s) 2508 for purposes that may include analyzing, transforming, processing, persisting, and distributing such content.

In an example, web server 2520 is coupled to one or more applications server(s) 2522 that provide applications and services to client device(s) 2570 directly or with the assistance of web server 2520. For example, web server 2520 may provide client device(s) 2570 with access to one or more specialized software applications in the field of biotechnology. Such functionality also may be provided, for example, as one or more different web applications, stand-alone applications, computer systems, plugins, web browser extensions, and application programming interfaces (APIs). In some examples, plugins and extensions may be referred to, individually or collectively, as add-ons.

Client device 2570 may be a personal computer (PC), laptop, a mobile phone, a tablet computer, or generally any other computing device. Client device 2570 may run an operating system (OS) that manages hardware and software of the client device 2570. A browser (not shown) may run on client device 2570. The browser may be a web browser that can access services and/or content provided by server machine 2510, web server 2520, application server 2522, data store 2508, etc. In addition, other types of computer programs and computer scripts also may run on client device 2570. For example, client device 2570 may use applications (i.e., "apps") to access such content or communicate with server machine 2510 without visiting or otherwise utilizing web pages.

In an example, functions and features of server machine 2510 also may be performed by client device 2570, in whole or in part. In addition, the functionality attributed to a particular component may be performed by different or multiple components operating together. Server machine 2510 also may be accessed as a service provided to other systems or devices via application programming interfaces, and thus is not limited to use in websites.

Server machine 2510 also includes analyte variability control system 2530. Analyte variability control system 2530 generally refers to specialized computer hardware and/or software for controlling inter-sample analyte variability in complex biological matrices. For example, analyte variability control system 2530 may receive and analyze biological samples associated with different subjects, generate composite dilution models 2590 for each of a plurality of analytes in the biological samples, determine a relative dilution prediction model for the biological sample type of the biological samples based on a plurality of the generated composite dilution models 2590, receive and analyze new biological samples of the biological sample type, and adjust one or more aspects of the newly received biological samples based on the determined relative dilution prediction model for the biological sample type.

Examples of services provided by analyte variability control system 2530 are further described in the present disclosure, including "Example 1: Generation of Empirical Matrix-Specific Standard Curves", "Example 2: Application of Empirical Matrix-Specific Standard Curves", "Example 3: Pilot Study Design to Characterize and Normalize the Variation in Analyte Signal Due to Hydration Status of a Human Subject", the figures associated with the present disclosure, and in the following paragraphs.

In an example, analyte variability control system 2530 includes biological sample analyzer module 2540, composite dilution model generator module 2550, and relative dilution prediction module 2560. In other examples, functionality associated with biological sample analyzer module 2540, composite dilution model generator module 2550, and relative dilution prediction module 2560 may be combined, divided, and organized in various arrangements.

In an example, biological sample analyzer module 2540 generally may receive and analyze analyte measurement data 2580 associated with biological samples from different subjects. Composite dilution model generator module 2550 generally may perform one or more steps to generate a composite dilution model 2590 for each analyte in a selected group of analytes from the analyte measurement data 2580. Relative dilution prediction module 2560 generally then may determine a predictive relative dilution for the biological sample type of the biological samples based on the selected composite dilution models 2590 generated from the biological samples. Relative dilution prediction module 2560 generally then may adjust one or more aspects of analyte measurement data 2580 associated with different and/or newly received biological samples based on the predictive relative dilution determined from the selected composite dilution models 2590.

Figure 26:
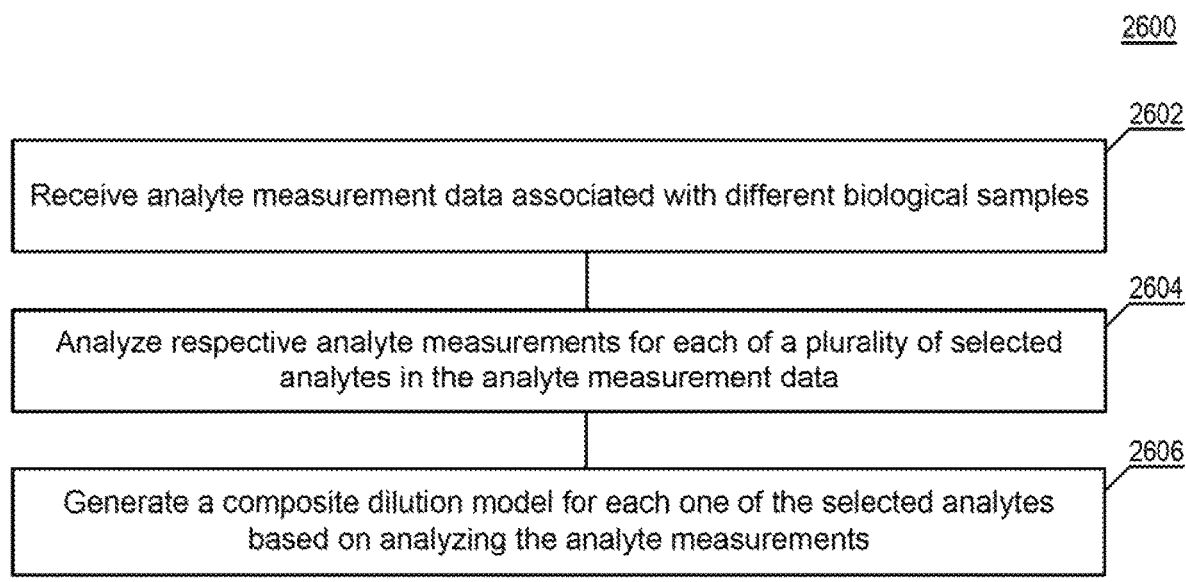
FIG. 26 and FIG. 27 are exemplary flow diagrams illustrating generating a composite dilution model for each of a plurality of analytes present in different biological samples, according to examples of the present disclosure.

FIG. 26 is a flow diagram illustrating generating a composite dilution model for each of a plurality of analytes present in different biological samples, according to examples of the present disclosure. Example method 2600 may be performed by processing logic that may comprise specialized hardware (circuitry, dedicated logic, programmable logic, microcode, etc.), specialized software (such as instructions run on a general purpose computer system, a dedicated machine, or hardware processing devices), firmware, or any combination thereof.

In general, support for example method 2600 is provided throughout the present disclosure including in association with the non-limiting examples, "Example 1: Generation of Empirical Matrix-Specific Standard Curves", "Example 2: Application of Empirical Matrix-Specific Standard Curves", and "Example 3: Pilot Study Design to Characterize and Normalize the Variation in Analyte Signal Due to Hydration Status of a Human Subject" as described above.

Method 2600 begins at block 2602 when analyte variability control system 2530 receives analyte measurement data 2580 associated with different biological samples. In an example, biological sample analyzer module 2540 of analyte variability control system 2530 receives analyte measurement data 2580 from diagnostic machine 2502, data store 2508, server machine 2510, client device 2570, or any of one or more other computer systems or storage devices.

In an example, biological sample analyzer module 2540 receives analyte measurement data 2580 generated from a diagnostic machine 2502. For example, diagnostic machine 2502 may receive biological samples provided from multiple different human subjects. Such biological samples may include urine, blood, plasma, serum, cerebrospinal fluid, or generally any other type of biological fluid.

In an example, diagnostic machine 2502 measures analytes or proteins associated with each of the biological samples from the different subjects to generate analyte measurement data 2580 measured in relative fluorescence units (RFUs) or any other suitable measurement unit(s). Thus, in some examples, analyte measurement data 2580 may include respective relative fluorescence unit measurements for each of a plurality of proteins associated with one or more different biological samples. Such analyte measurement data 2580 may be preserved in data store 2508 or any other persistent storage and later provided to one or more other computer systems, such as server machine 2510.

In an example, biological sample analyzer module 2540 generally may transform, adjust, and/or process analyte measurement data 2580 (e.g., raw RFU data) in any number of steps in preparation for further processing by analyte variability control system 2530. For example, raw or partially processed analyte measurement data 2580 may be cleansed, formatted, normalized, calibrated, or manipulated in any of one or more different steps. In other examples, analyte measurement data 2580 received by biological sample analyzer module may be pre-processed and ready for analysis upon receipt without further pre-processing or manipulation.

At block 2604, analyte variability control system 2530 analyzes respective analyte measurements for each of a plurality of selected analytes in the analyte measurement data. In an example, biological sample analyzer module 2540 of analyte variability control system 2530 analyzes each of a plurality of selected analytes in analyte measurement data 2508. For example, biological sample analyzer module 2540 may analyze each analyte from a subset of available measured analytes from a plurality of different biological samples. In an example, biological sample analyzer module 2540 may analyze analyte measurement data 2580 for each analyte across different biological samples individually or in parallel (e.g., with two or more analytes across the different biological samples being processed at the same time).

In an example, biological sample analyzer module 2540 analyzes each analyte in preparation for generating a composite dilution model 2590 corresponding to each respective analyte. For example, biological sample analyzer module 2540 may analyze an analyte for a plurality of biological samples that have been serially diluted. In one example, biological sample analyzer module 2540 determines the sample with the greatest linear dilution range for an analyte, then fits a weighted linear regression model to the data in the linear dilution range. The associated regression line then may be used as the reference for which other samples are registered.

At block 2606, analyte variability control system 2530 generates a composite dilution model 2590 for each one of the selected analytes based on the analyzing performed at block 2604. In an example, composite dilution model generator module 2550 of analyte variability control system 2530 translates respective analyte measurement data 2508 for an analyte based on a corresponding reference dilution model generated by biological sample analyzer module 2540. In an example, composite dilution model generator module 2550 then fits a 4-parameter logistic function (4PL) to the registered data for the analyte.

In an example, composite dilution model generator module 2550 then generates a corresponding composite dilution model 2590 for the analyte based on the 4PL associated with the analyte. Composite dilution model generator module 2550 further generates composite dilution models 2590 for each remaining analyte in a selected subset of analytes found in analyte measurement data 2508. The composite dilution models 2590 generated for the selected subset of analytes then may be used to adjust aspects of additional, different, or newly received biological samples for controlling inter-sample analyte variability.

Figure 27:
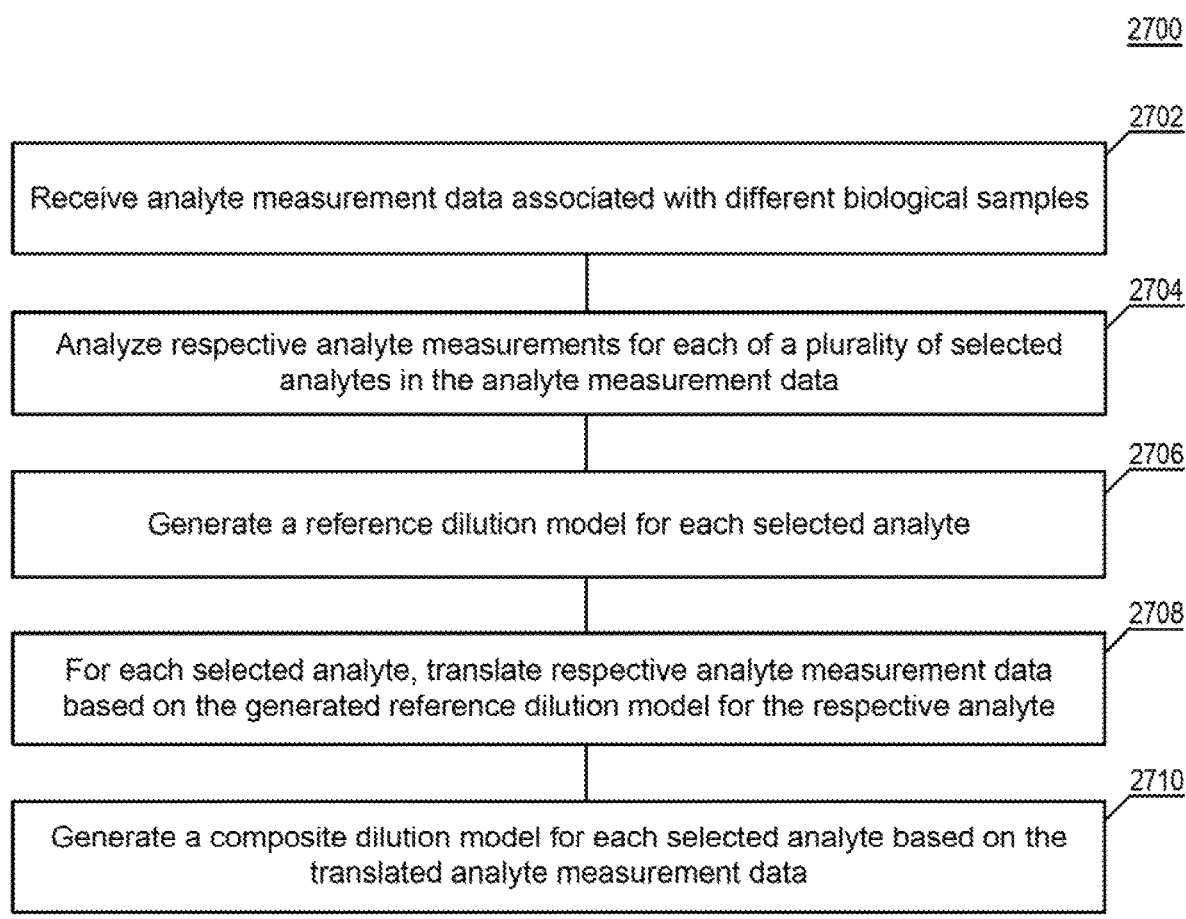

FIG. 27 is a flow diagram illustrating generating a composite dilution model for each of a plurality of analytes present in different biological samples, according to examples of the present disclosure. Example method 2700 may be performed by processing logic that may comprise specialized hardware (circuitry, dedicated logic, programmable logic, microcode, etc.), specialized software (such as instructions run on a general purpose computer system, a dedicated machine, or hardware processing devices), firmware, or any combination thereof.

In general, support for example method 2700 is provided throughout the present disclosure including in association with the non-limiting examples, "Example 1: Generation of Empirical Matrix-Specific Standard Curves", "Example 2: Application of Empirical Matrix-Specific Standard Curves", and "Example 3: Pilot Study Design to Characterize and Normalize the Variation in Analyte Signal Due to Hydration Status of a Human Subject" as described above.

Method 2700 begins at block 2702 when analyte variability control system 2530 receives analyte measurement data 2580 associated with different biological samples of the same biological sample type. In an example, biological sample analyzer module 2540 of analyte variability control system 2530 receives analyte measurement data 2580 from data store 2508. Generally, such analyte measurement data may include relative fluorescence unit (RFU) measurements for each one of multiple different proteins detected in each of a plurality of different biological samples of the same biological sample type that have been collected from different subjects.

At block 2704, analyte variability control system 2530 analyzes respective analyte measurements for each of a plurality of selected analytes in the analyte measurement data 2580. In an example, biological sample analyzer module 2540 of analyte variability control system 2530 analyzes each one of a plurality of selected analytes from analyte measurement data 2508 received at block 2704. For example, a subset of available analytes from analyte measurement data 2508 may be selected for generating corresponding composite dilution models 2590 for use in controlling inter-sample analyte variability in complex biological matrices.

At block 2706, analyte variability control system 2530 generates a reference dilution model for each selected analyte. In an example, biological sample analyzer module 2540 generates a reference dilution model for each selected analyte based on the analyzing performed at block 2704. For example, in one non-limiting example, biological sample analyzer module 2540 may determine which sample from a plurality of samples associated with a respective analyte has the greatest linear dilution range. Biological sample analyzer module 2540 then may fit a weighted linear regression model to the data in the linear dilution range. In addition, biological sample analyzer module 2540 similarly may generate a weighted linear regression model for each of the other selected analytes, which respectively will be used, at least in part, in generating corresponding composite dilution models 2590 associated with each respective selected analyte. Further description and examples are provided in the present disclosure, for example, at least in non-limiting example, "Example 1: Generation of Empirical Matrix-Specific Standard Curves".

At block 2708, analyte variability control system 2530 translates respective analyte measurement data for each selected analyte based on a corresponding reference dilution model generated for each respective analyte. In an example, composite dilution model generator module 2550 of analyte variability control system 2530 translates respective analyte measurement data 2508 for each one of the selected analytes based on a corresponding reference dilution model generated by biological sample analyzer module 2540. Further description and examples are provided in the present disclosure, for example, at least in non-limiting example, "Example 1: Generation of Empirical Matrix-Specific Standard Curves".

At block 2710, analyte variability control system 2530 generates a composite dilution model 2590 for each one of the selected analytes based on the translated analyte measurement data. In an example, composite dilution model generator module 2550 fits a 4-parameter logistic function (4PL) to the translated data for each of the selected analytes. For example, composite dilution model generator module 2550 generates a corresponding composite dilution model 2590 for each one of the selected analytes based on the 4PL. Thus, composite dilution model generator module 2550 generates a collection or series of composite dilution models 2590 comprising a composite solution module for each one of the selected analytes.

Further description and examples describing block 2710 and applying the generated composite dilution models 2590 to other biological samples are described in the present disclosure, for example, at least in non-limiting examples, "Example 1: Generation of Empirical Matrix-Specific Standard Curves" and "Example 2: Application of Empirical Matrix-Specific Standard Curves".

In some examples, composite dilution model generator module 2550 further generates one or more reports comprising information and details about various aspects associated with processing analyte measurement data 2580 and generating composite dilution models 2590. For example, such generated reports may include description about various findings including potential or actual data abnormalities in analyte measurement data 2580, pre-processing performed on analyte measurement data 2580, analysis of analyte measurement data 2580, generation of composite dilution models 2590, and predictive relative dilution determinations. In some examples, analyte variability control system 2530 stores generated reports in data store 2508 and may provide the reports and corresponding analyte measurement data 2580 and/or composite dilution models 2590 to client device 2570.

Figure 28:
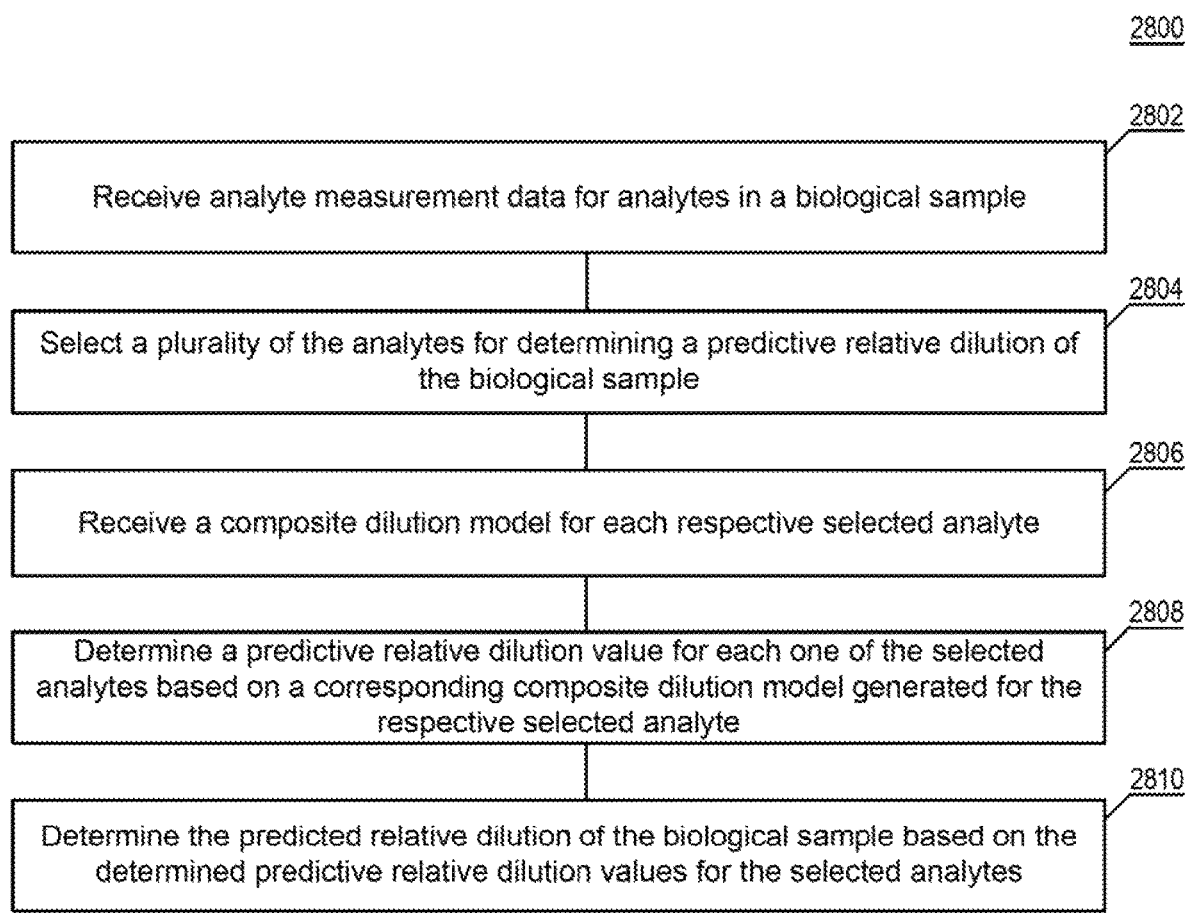
FIG. 28 is a flow diagram illustrating application of composite dilution models to a new biological sample for predicting a relative dilution of the new sample, according to an example of the present disclosure.

FIG. 28 is a flow diagram illustrating application of composite dilution models to a new biological sample for predicting a relative dilution of the new sample, according to an example of the present disclosure. Example method 2800 may be performed by processing logic that may comprise specialized hardware (circuitry, dedicated logic, programmable logic, microcode, etc.), specialized software (such as instructions run on a general purpose computer system, a dedicated machine, or hardware processing devices), firmware, or any combination thereof.

In general, support for example method 2800 is provided throughout the present disclosure including in association with the non-limiting examples, "Example 1: Generation of Empirical Matrix-Specific Standard Curves", "Example 2: Application of Empirical Matrix-Specific Standard Curves", and "Example 3: Pilot Study Design to Characterize and Normalize the Variation in Analyte Signal Due to Hydration Status of a Human Subject" as described above.

Method 2800 begins at block 2802 when analyte variability control system 2530 receives analyte measurement data for analytes in a biological sample. In an example, biological sample analyzer module 2540 of analyte variability control system 2530 may receive analyte measurement data 2580 of one or more new biological samples for analysis. For example, new biological samples generally may describe analyte measurement data 2580 of biological samples, not included or considered in the generation of composite dilution models 2590 for analytes of a biological sample type (e.g., urine). As such, new biological samples differ from biological samples used in generating composite dilution models and such associated analyte measurement data 2580 may be received before or after generation of such models.

At block 2804, analyte variability control system 2530 selects a plurality of the analytes for determining a predictive relative dilution of the biological sample. In an example, biological sample analyzer module 2540 of analyte variability control system 2530 analyzes analyte measurement data 2580 of a new biological sample. For example, biological sample analyzer module 2540 may select a subset of analytes in analyte measurement data 2580 based on user preference and/or one or more thresholds associated with relative fluorescence unit (RFU) measurements of analytes in analyte measurement data 2580.

In an example, biological sample analyzer module 2540 may select a top number of analytes in a new biological sample based on a "goodness of fit" as compared to corresponding composite dilution models for the biological sample type. In another example, biological sample analyzer module 2540 also may select a number of analytes that have the ability to flatten a serial titration series of the same sample. Further description and examples are provided in the present disclosure, for example, at least in non-limiting example, "Example 2: Application of Empirical Matrix-Specific Standard Curves".

At block 2806, analyte variability control system 2530 receives a composite dilution model 2590 for each one of the analytes that have been selected. In an example, relative dilution prediction module 2560 receives composite dilution models 2590 for each one of a plurality of analytes selected for determining a predictive relative solution of a biological sample. For example, relative dilution prediction module 2560 receives composite dilution models 2590 generated for the selected analytes. Such composite dilution models 2590 may be generated based on method 2600, method 2700, or other examples of the present disclosure.

At block 2808, analyte variability control system 2530 determines a predictive relative dilution value for each one of the selected analytes based on a corresponding composite dilution model associated with each respective analyte. In an example, for each one of the selected analytes, relative dilution prediction module 2560 projects a relative fluorescence unit (RFU) measurement for a respective analyte onto a generated composite dilution model corresponding to the respective analyte, thus generating a predicted relative dilution for each one of the respective analytes.

For example, relative dilution prediction module 2560 may take a first RFU measurement for a first analyte in a new biological sample, project the first RFU measurement for the first analyte onto a first composite dilution model generated for the first analyte, and determine a predictive relative dilution value for the first analyte of the new biological sample based on the projection. Similarly, relative dilution prediction module 2560 may take a second RFU measurement for a second analyte in the same new biological sample, project the second RFU measurement for the second analyte onto a second composite dilution model generated for the second analyte, and determine a predictive relative dilution value for the second analyte of the new biological sample based on that projection (and so on and so forth for each one of the other selected analytes). Further description and examples are provided in the present disclosure, for example, at least in non-limiting example, "Example 2: Application of Empirical Matrix-Specific Standard Curves".

At block 2810, analyte variability control system 2530 determines the predicted relative dilution of the biological sample based on the predictive relative dilution values determined for each one of the selected analytes. In an example, relative dilution prediction module 2560 creates a distribution of the predictive relative dilution values generated at block 2808 for the selected analytes of a new biological sample. Relative dilution prediction module 2560 then may determine and select which of those predictive relative dilution values to use when adjusting aspects of the new biological sample. For example, relative dilution prediction module 2560 may discard one or more sets of the generated predictive relative dilution values to create a final set of generated predictive relative dilution values for adjusting a new biological sample.

In an example, relative dilution prediction module 2560 trims tails from the distribution of predictive relative dilution values and uses a middle percentage of the remaining values for determining the predictive relative dilution for the new biological sample. Relative dilution prediction module 2560 then determines the predicted relative dilution of the biological sample. For example, relative dilution prediction module 2560 may analyze the remaining predictive relative dilution values and generate a predictive relative dilution for the new biological sample.

In one example, relative dilution prediction module 2560 determines the predictive relative dilution for the new biological sample based on the median of remaining predictive relative dilution values. Relative dilution prediction module 2560 generally also may determine the predictive relative dilution for the new biological sample based on using a formula or other analysis of the remaining predictive relative dilution values. Further description and examples are provided in the present disclosure, for example, at least in non-limiting example, "Example 2: Application of Empirical Matrix-Specific Standard Curves".

In an example, analyte variability control system 2530 adjusts one or more aspects of the new biological sample based on the predictive relative dilution determined by relative dilution prediction module 2560. For example, analyte variability control system 2530 may normalize or otherwise adjust analyte measurement data 2580 of the new biological sample based on the predictive relative dilution for the new biological sample determined by relative dilution prediction module 2560. Further, in some examples, analyte variability control system 2530 may generate an associated report describing the associated processing and adjustment. The adjusted analyte measurement data 2580 for the new biological sample then may be further examined and analyzed in view of the adjustment.

Figure 29:
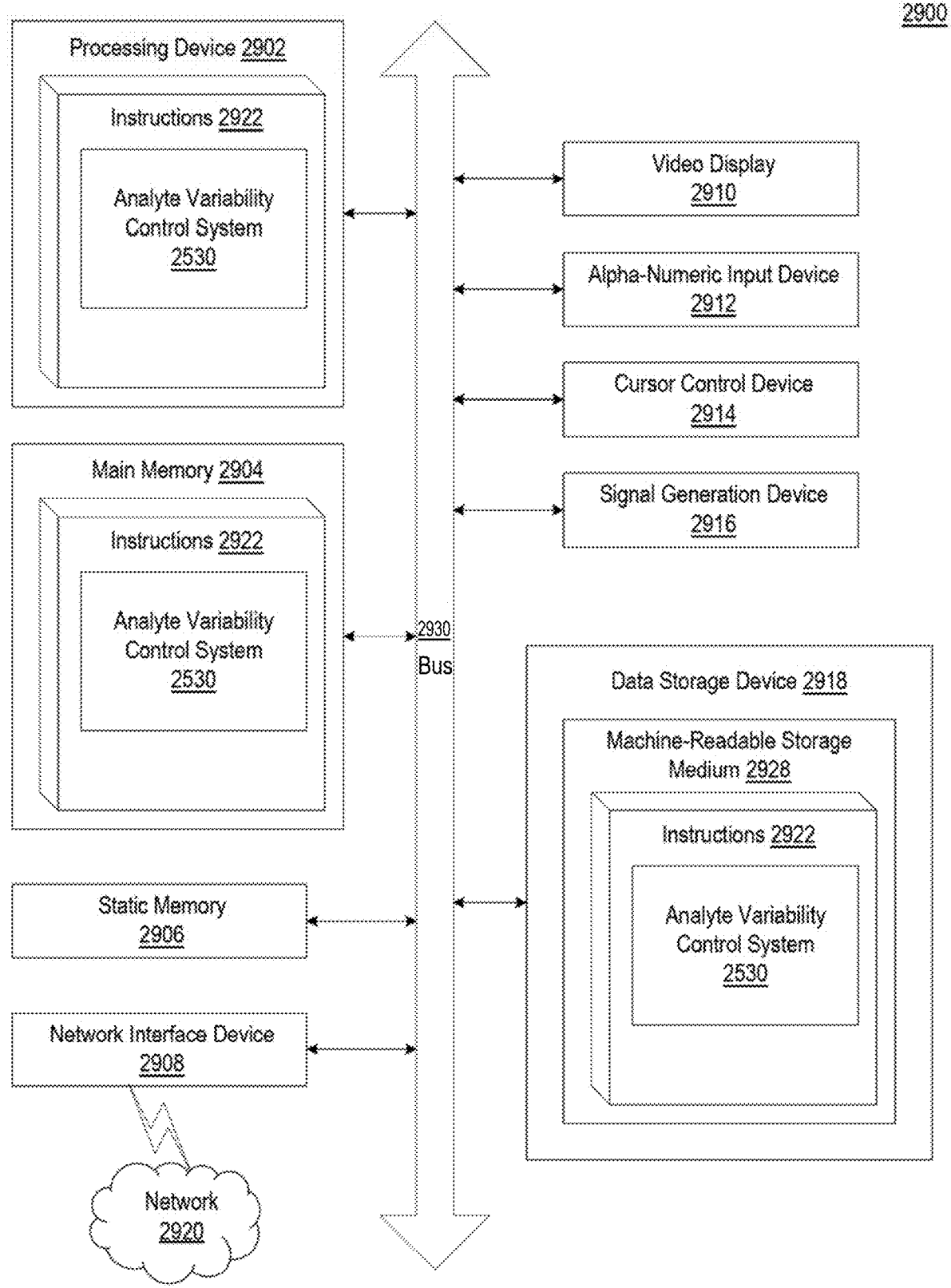
FIG. 29 is a block diagram of an exemplary computer system that may perform one or more of the operations described herein.

FIG. 29 illustrates a diagram of a machine in the exemplary form of a computer system 2900 within which a set of instructions, for causing the machine to perform any one or more of the methodologies discussed herein, may be executed. In an example, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. For example, the machine may be a personal computer (PC), a tablet PC, a Personal Digital Assistant (PDA), a cellular telephone, a wearable computing device, a web appliance, a server machine, a specialized diagnostic lab machine, or any other machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 2900 includes a processing device (processor) 2902, a main memory 2904 (e.g., read-only memory (ROM), flash memory, dynamic random access memory (DRAM) such as synchronous DRAM (SDRAM), double data rate (DDR SDRAM), or DRAM (RDRAM), etc.), a static memory 2906 (e.g., flash memory, static random access memory (SRAM), etc.), and a data storage device 2918, which communicate with each other via a bus 2930.

Processor 2902 represents one or more general-purpose processing devices such as a microprocessor, central processing unit, or the like. More particularly, the processor 2902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 2902 also may be one or more special-purpose processing devices such as an application specific integrated circuit (ASIC), a field programmable gate array (FPGA), a digital signal processor (DSP), network processor, or the like. The processor 2902 is configured to execute instructions 2922 for performing the operations and steps discussed herein.

The computer system 2900 may further include a network interface device 2908. The computer system 2900 also may include a video display unit 2910 (e.g., a liquid crystal display (LCD) or a cathode ray tube (CRT)), an alphanumeric input device 2912 (e.g., a keyboard), a cursor control device 2914 (e.g., a mouse), and a signal generation device 2916 (e.g., a speaker).

The data storage device 2918 may include a computer-readable storage medium 2928 on which is stored one or more sets of instructions 2922 (e.g., software) embodying any one or more of the methodologies or functions described herein. The instructions 2922 also may reside, completely or at least partially, within the main memory 2904 and/or within the processor 2902 during execution thereof by the computer system 2900, the main memory 2904 and the processor 2902 also constituting computer-readable storage media. The instructions 2922 may further be transmitted or received over a network 2920 via the network interface device 2908.

In one example, the instructions 2922 include instructions for an analyte variability control system (e.g., analyte variability control system 2530 of FIG. 25) and/or a software library comprising methods that call an analyte variability control system. While the computer-readable storage medium 2928 (machine-readable storage medium) is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. Further, the term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of steps leading to one or more desired results. Generally, such steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a specialized computer system, or similar specialized electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise specialized computer hardware and/or specialized computer programs selectively installed, activated, or configured to perform the intended purposes. Such computer programs may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

EXAMPLES

The following examples are provided to illustrate certain particular features and/or embodiments. These examples should not be construed to limit the disclosure to the particular features or embodiments described.

Example 1: Generation of Empirical Matrix-Specific Standard Curves

This example provides the means by which an exemplary composite dilution model was generated from a complex biological matrix, for example urine, using relative protein measurements, as assayed with a capture reagent, for example an aptamer.

Traditionally, proteins levels in urine are normalized to physiological-based measurements (e.g., total urine volume, creatinine concentration or albumin:creatinine ratio) or restricted median normalization, which identifies a subset of capture reagents (e.g., aptamers) that exhibit dilution linearity (or scale with the protein content of the sample) and use this information for standard median normalization.

A new normalization approach was developed that creates a composite dilution curve for each analyte (measured protein) based on a titration series of multiple samples from a complex matrix such as urine. Many composite dilution curves can then be used to more accurately estimate the overall dilution of protein levels. Protein measurements were made in urine using an aptamer based assay whereby protein levels were represented by relative amounts (RFU or relative fluorescent units). Urine was chosen as an example matrix due to the commonly observed inter-sample variability in protein levels that results, for example, from the hydration level of the individual at the time the urine is collected. Hydration levels may confound the relationship between a protein level as measured from urine, and the clinical evaluation of the subject being tested. Thus, by generating a composite dilution model, which compensates for the inter-sample variability, consistent and clinically relevant information about the test subject may be derived from the protein levels in urine. Further, once the composite dilution model is generated for the matrix, the same composite dilution model may be used to compensate for inter-sample variability in samples from many subjects, and consistent and clinically relevant information may be derived from the analyte measurements for those subjects.

By way of background information, quantitative inputs to a function will be denoted X while outputs will be denoted by the variable Y. If X or Y is a matrix, the individual components can be accessed by subscripts X. For example, the output value of the $j^{th}$ sample for the $i^{th}$ aptamer would be $X_{ij}$. The next sample for the same aptamer would be $X_{i(j+1)}$. Vectors of values will be denoted as upper case while scalar values will be lower case.

The protein levels from at least three (3) serial titrations from at least two (2) samples of the biological matrix of interest were analyzed, with i analytes (aptamers) for j samples with k serial titrations represented as dilutions $X_{ijk}$ and corresponding RFU values $Y_{ijk}$. For each analyte (or protein), the linear dilution range is defined, which in the case of an aptamer based assay is the range of dilutions where the measured RFU values scale approximately linearly with the dilution of the sample. Starting with the lowest dilution, the RFU measurement for each dilution is used to establish a nominal level where subsequent dilutions can be compared. The percent recovery is defined as the measured RFU value divided by the expected RFU value given an n-fold dilution. Starting at the $k^{th}$ dilution in a series, the percent recovery of the $m^{th}$ subsequent dilution is defined as $$\% \ Recovery_m = 100\left(\frac{Y_k}{Y_{k+m}/n^m}\right)$$

An acceptable dilution range has percent recoveries within 50% of the nominal value determined at the highest dilution in the linear range. A minimum of three serial dilutions from a nominal value are required to define a linear range. The linear range (5 data points from 5 serial dilutions) is shown in FIG. 1 as the data points between the vertical dashed lines (Note the scale is logarithmic for visualization purposes, not suggesting log-linearity).

Analyte cystatin C (CST3) was used as a specific example. Nineteen (19) urine samples were serially diluted and the analyte CST3 levels were measured and plotted (see FIG. 2A). Thus, for each analyte i (e.g., CST3), identify the sample j (of the 19 samples) with the greatest linear dilution range. Fit a weighted linear regression model to the data in the linear dilution range with weights inversely proportional to the RFU measurement $Y_{ij}$. The linear model for the $i^{th}$ analyte would be the following:

$$\hat{Y}_i(x) = \beta_{0i} + \beta_{1i} x$$

Analyte ephrin type-B receptor 6 (EPHB6) was used as another specific example. Nineteen (19) urine samples were serially diluted and the analyte EPHB6 levels were measured and plotted (see FIG. 2D). Thus, for each analyte i (e.g., EPHB6), identify the sample j (of the 19 samples) with the greatest linear dilution range. Fit a weighted linear regression model to the data in the linear dilution range with weights inversely proportional to the RFU measurement $Y_{ij}$. The linear model for the $i^{th}$ analyte would be the following:

$$\hat{Y}_i(x) = \beta_{0i} + \beta_{1i} x$$

Figure 2B:
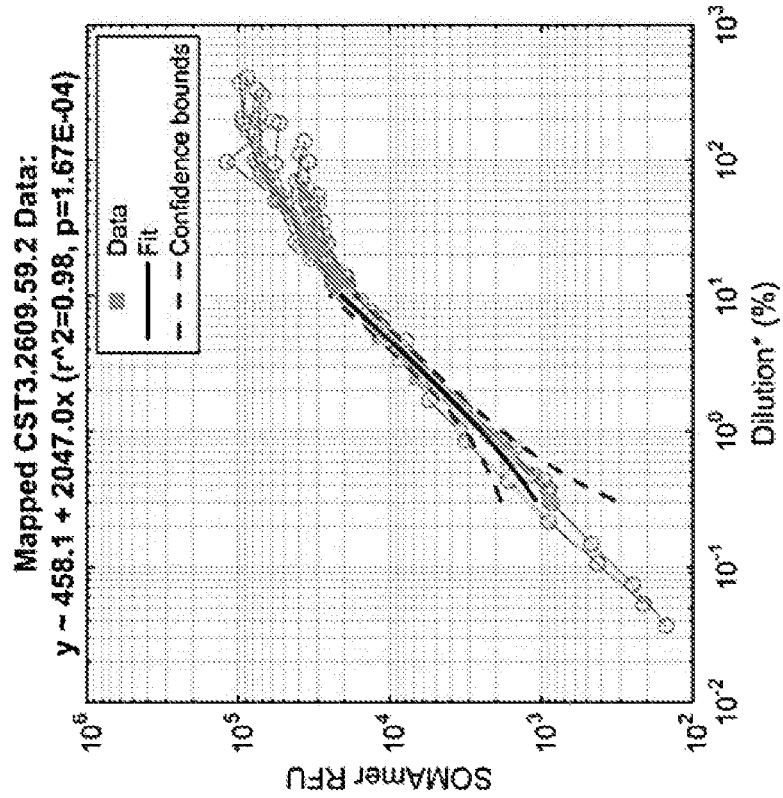
FIGS. 2A-2E show analysis of cystatin C (CST3) levels and ephrin type-B receptor 6 (EPHB6).
Figure 2A:
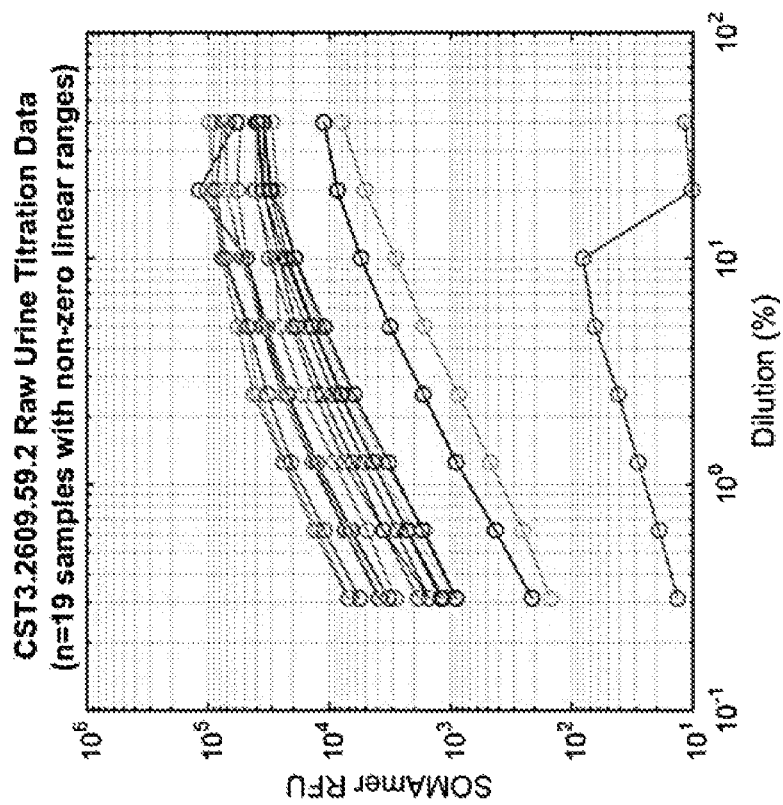
Figure 2C:
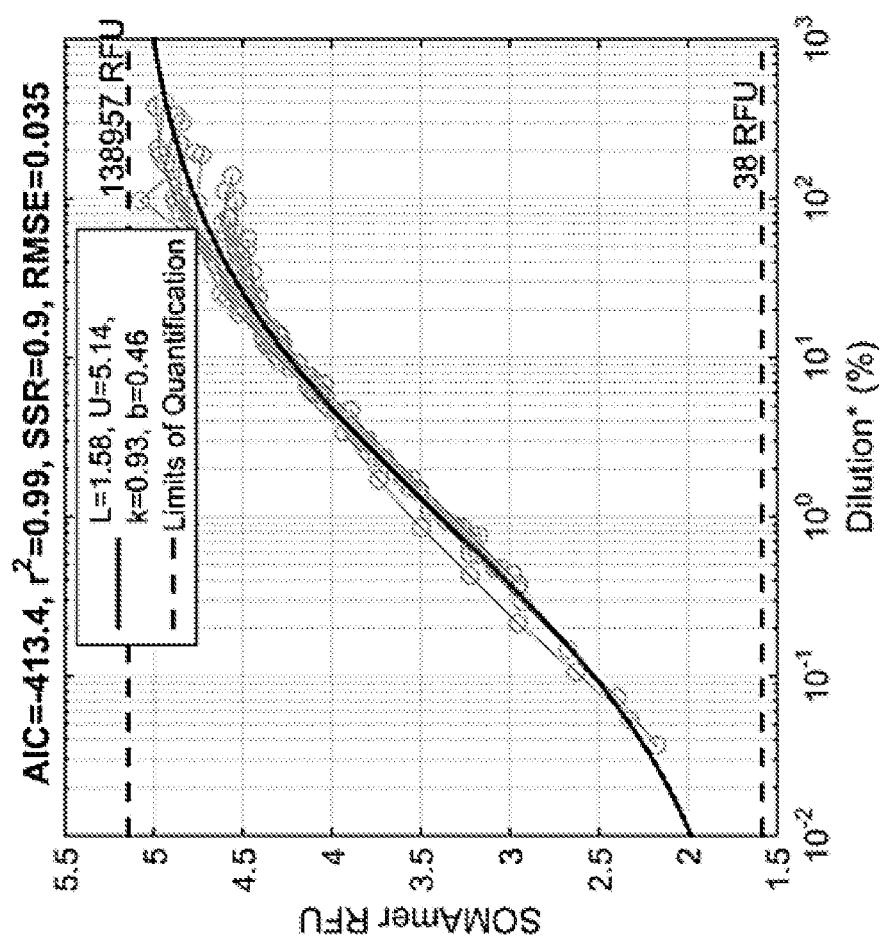
Figures 2D, 2E:
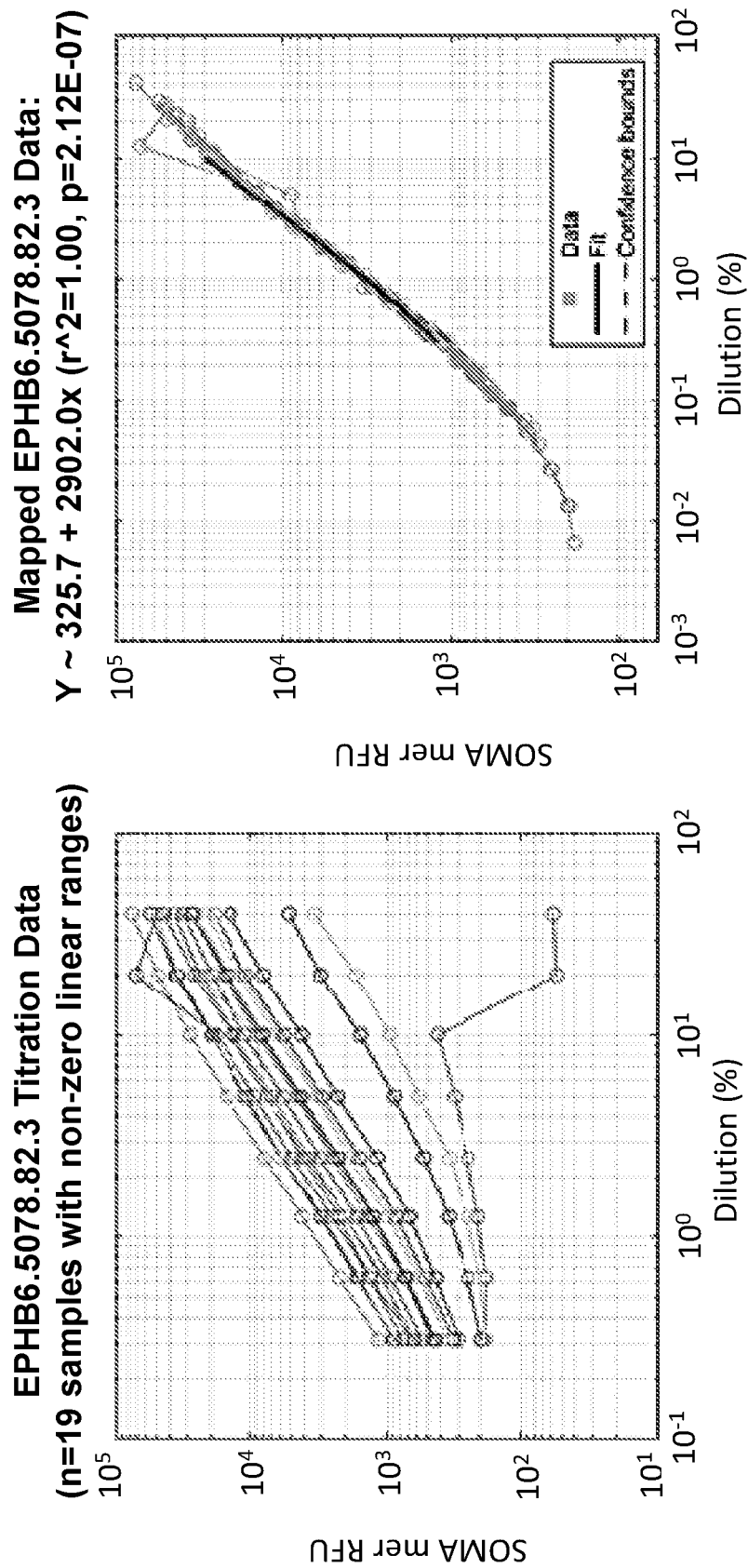
Figure 3B:
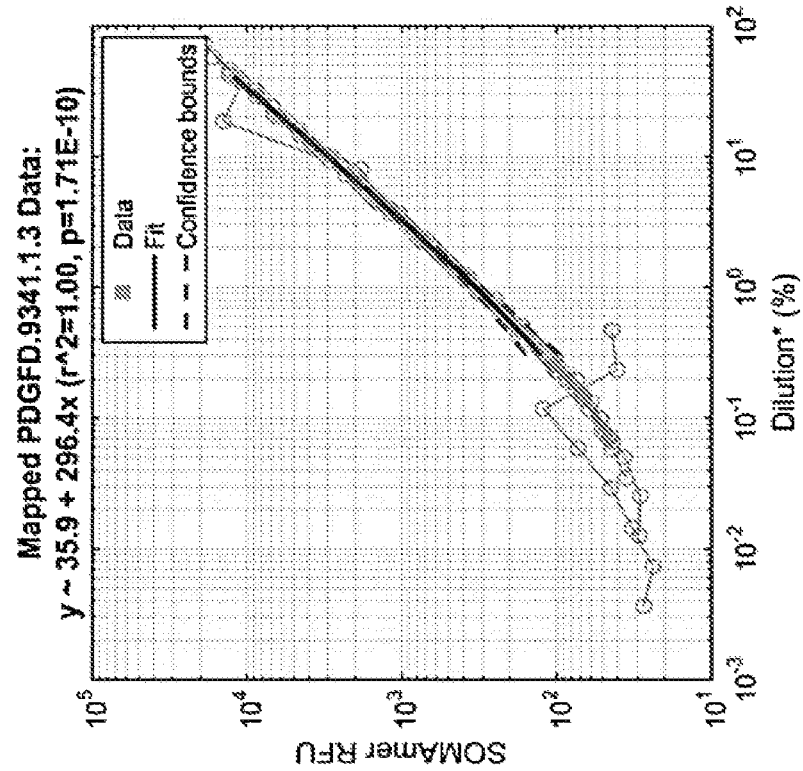
FIGS. 3A-3C show analysis of platelet derived growth factor D (PDGFD) levels.
Figure 3A:
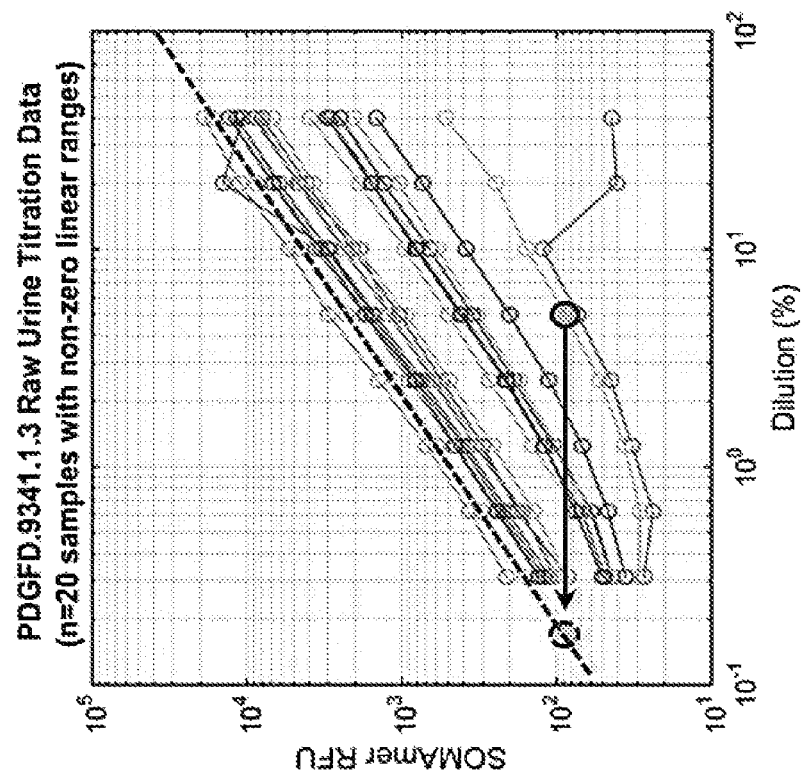
Figure 3C:
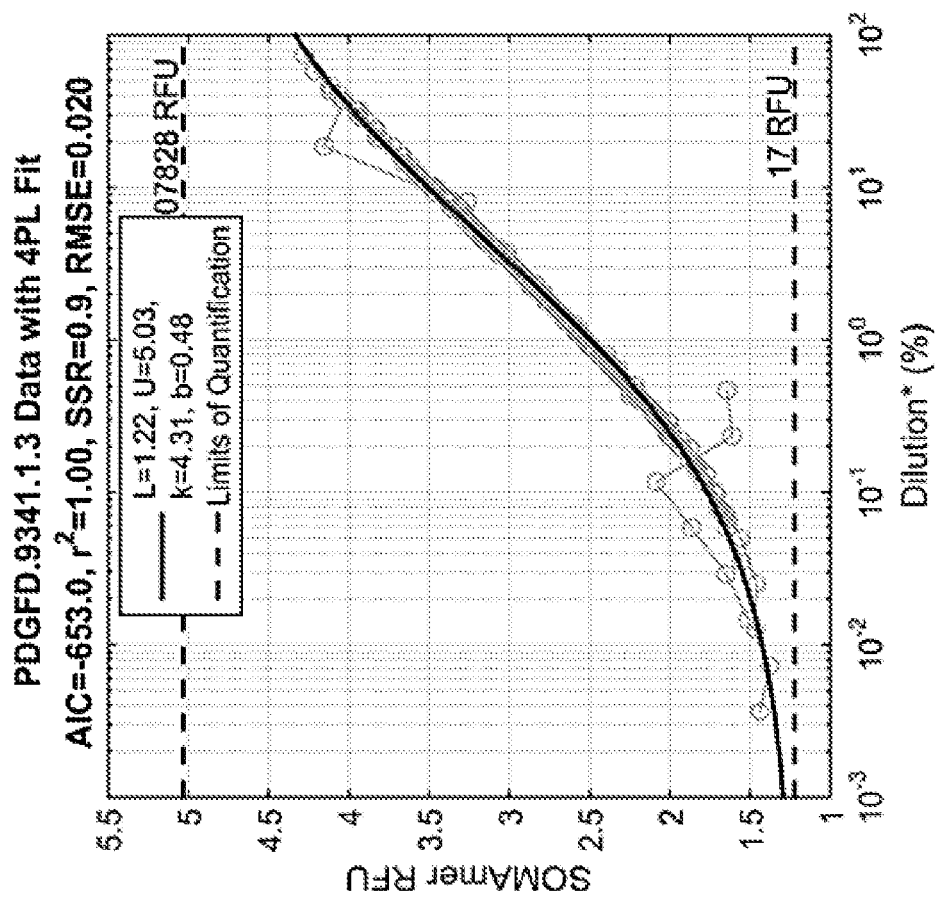

This regression line (or regression model) is now the reference to which all other curves will be registered (the black line in FIG. 2B for CST3 and FIG. 2E for EPHB6).

For each analyte i, register the titration curves by mapping (or horizontally translating) the RFU value of the center point of its linear range $y_{ci}$ (or the reference value) to the regression line (regression model) to determine its relative dilution to the reference $\hat{x}$ (relative reference dilution). For the $j^{th}$ sample of the $i^{th}$ analyte the relative reference dilution is the following:

$$\hat{x}_{ij} = \frac{y_{ci} - \beta_{0i}}{\beta_{1i}}$$

Horizontally translate each titration curve $Y_{ij}$ for a given analyte by its relative dilution value $\hat{x}_{ij}$ (or $\Delta X$) to generate the translated curve $\hat{Y}_{ij}$ (composite dilution model), where the center point of its linear range falls onto the reference regression line. Alternatively, another way to go about this would be to fit a linear model for each titration series and register the curves by setting the intercepts to the same value (e.g. 1). This process aligns the curves relative to the reference, as shown in the right hand plot above.

$$\hat{Y}_{ij} = Y_{ij} + \hat{x}_{ij}$$

Fit a 4 parameter logistic function (4PL) to the registered data for each analyte. The 4PL equation is comprised of parameters for the lower asymptote L, the upper asymptote U, the inflection point k, and Hill's slope b. The model is symmetric about the inflection point and is fit using nonlinear least squares.

$$F(x) = \frac{L - U}{1 + (x/k)^b} + U$$

This generates an empirical standard curve for each analyte in the matrix of interest and in the presence of all capture reagents (e.g., aptamers) and their respective target proteins. This is represented in the FIG. 2C for CST3. Each 4PL fit (composite dilution model) can be ranked by its goodness-of-fit using the Akaike information criterion (AIC).

Figure 4B:
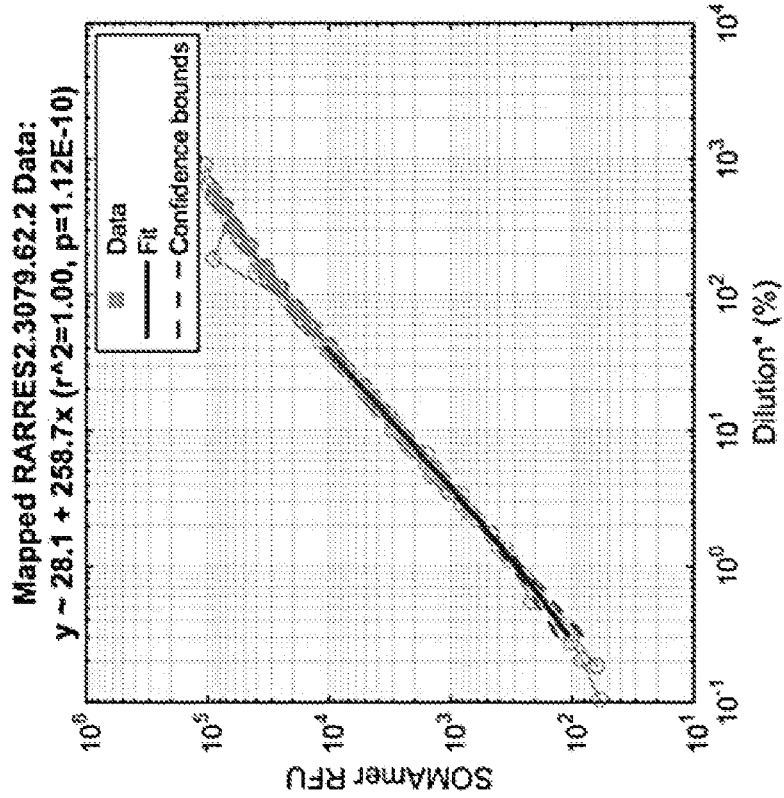
FIGS. 4A-4C show analysis of retinoic acid receptor responder 2 (RARRES2) levels.
Figure 4A:
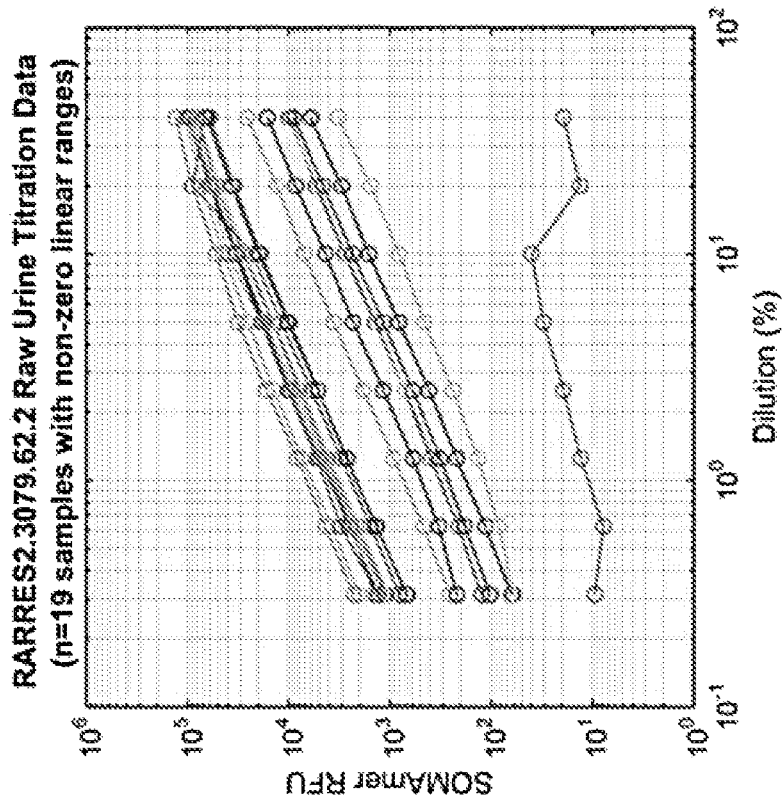
Figure 4C:
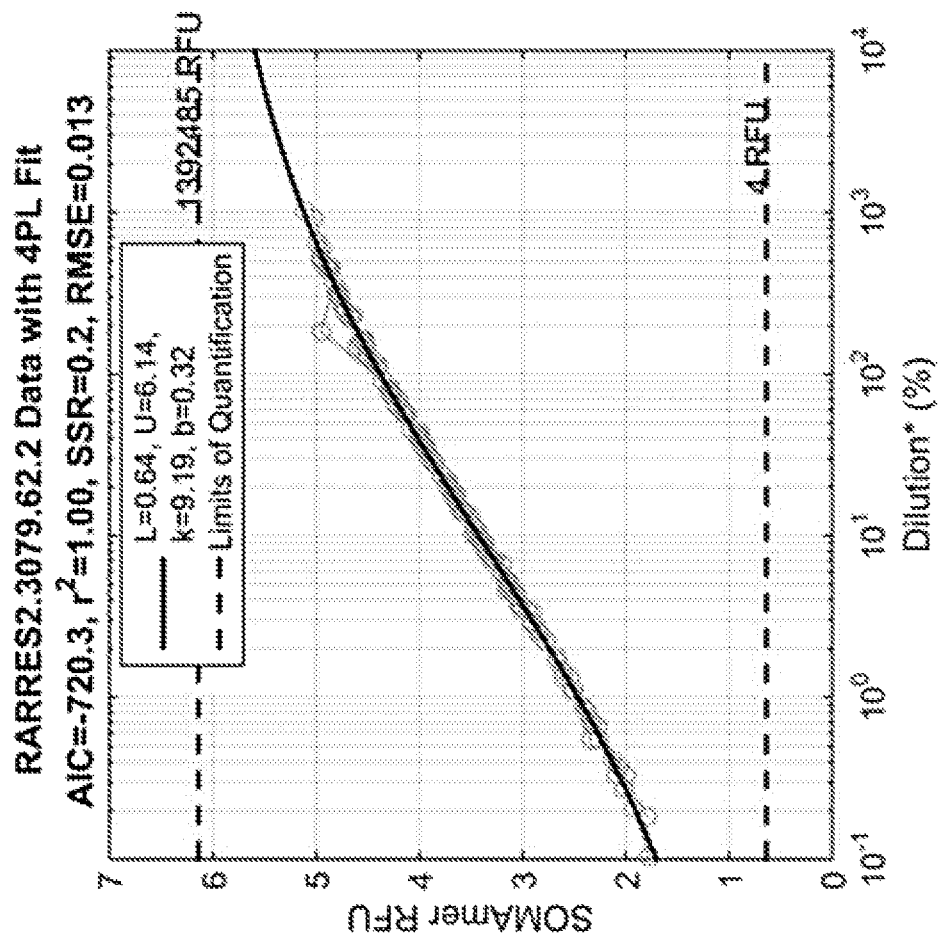
Figure 5B:
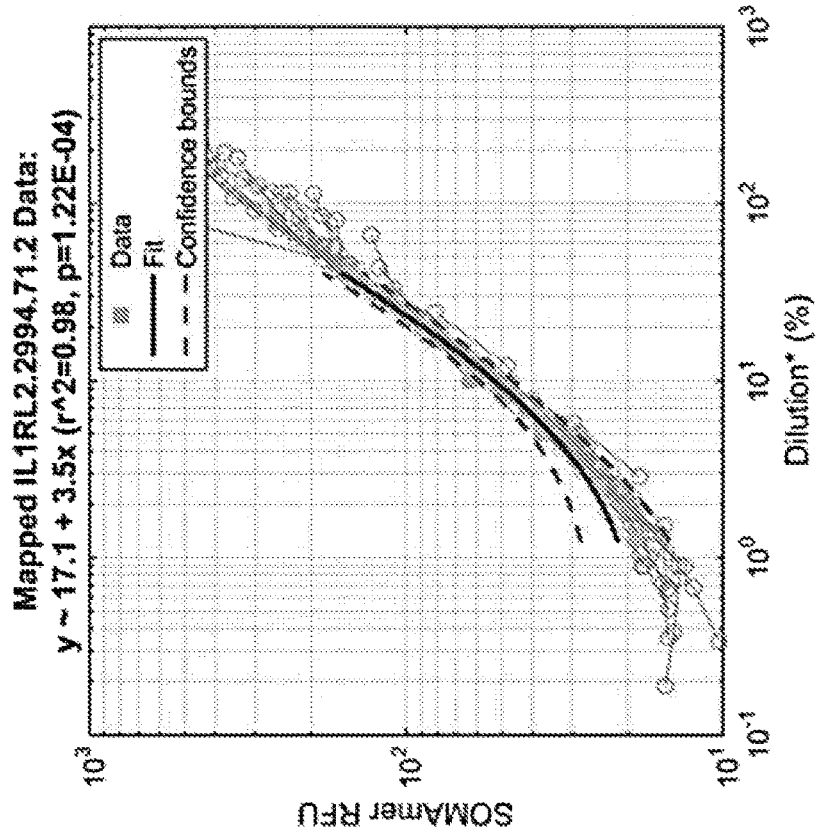
FIGS. 5A-5C show analysis of interleukin 1 receptor like 2 (IL1RL2) levels.
Figure 5A:
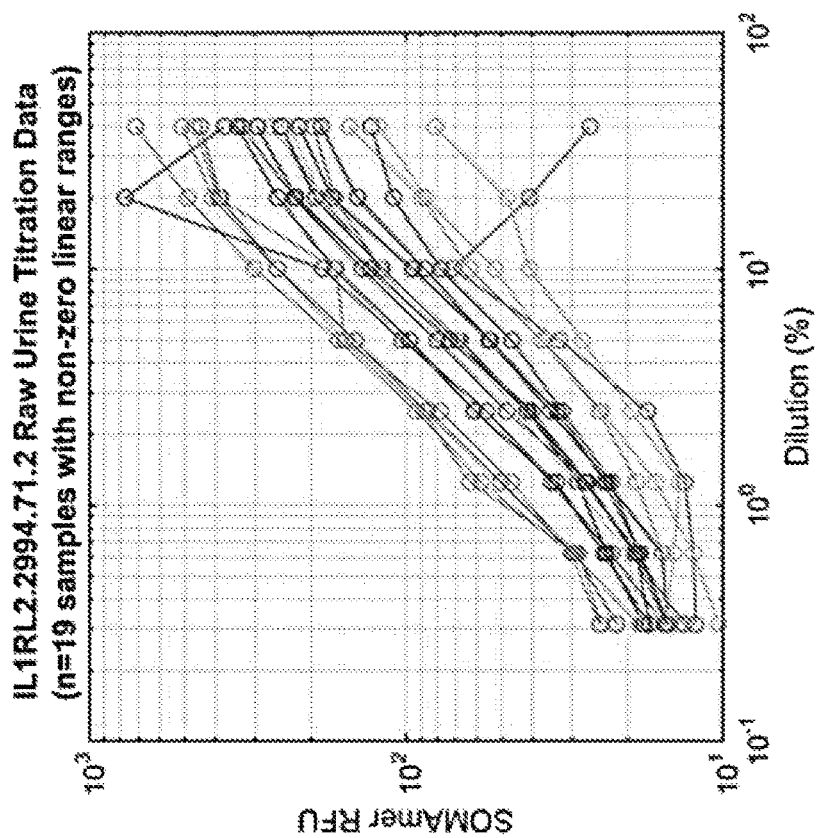
Figure 5C:
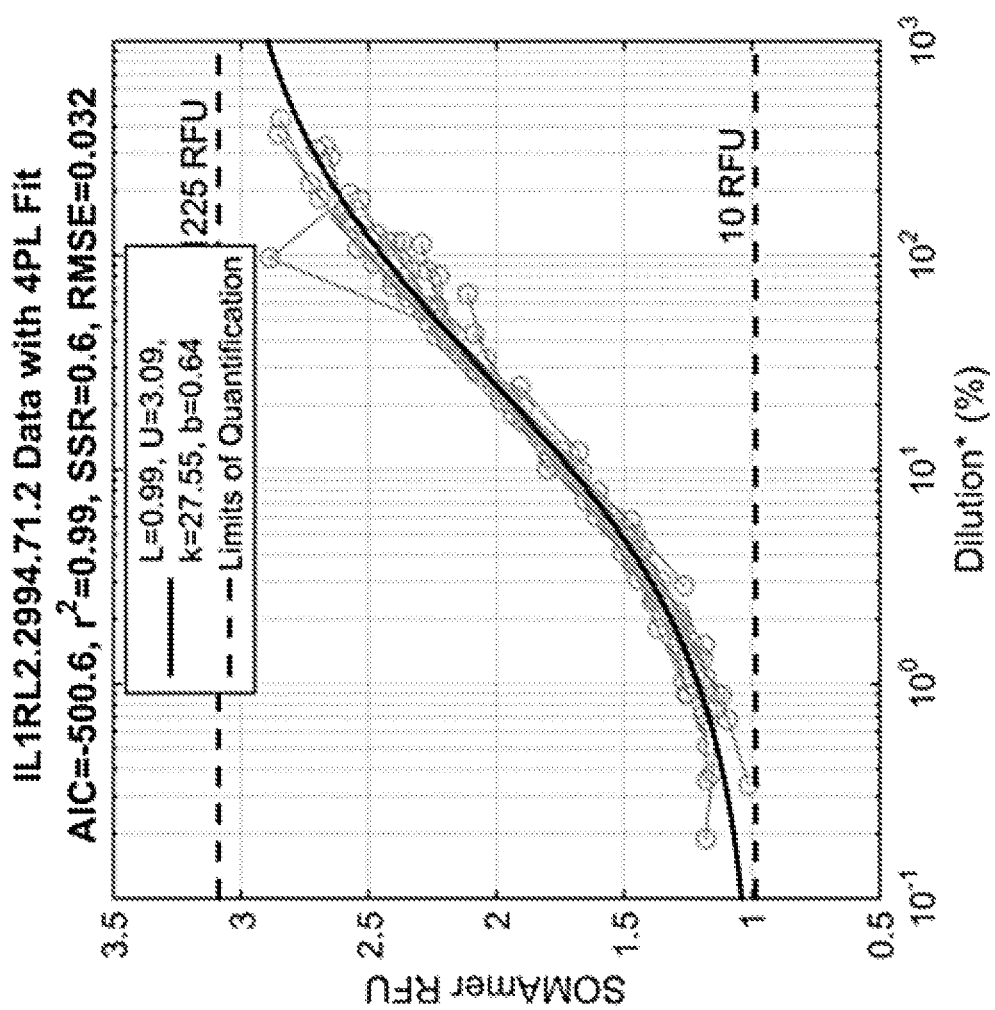
Figure 6B:
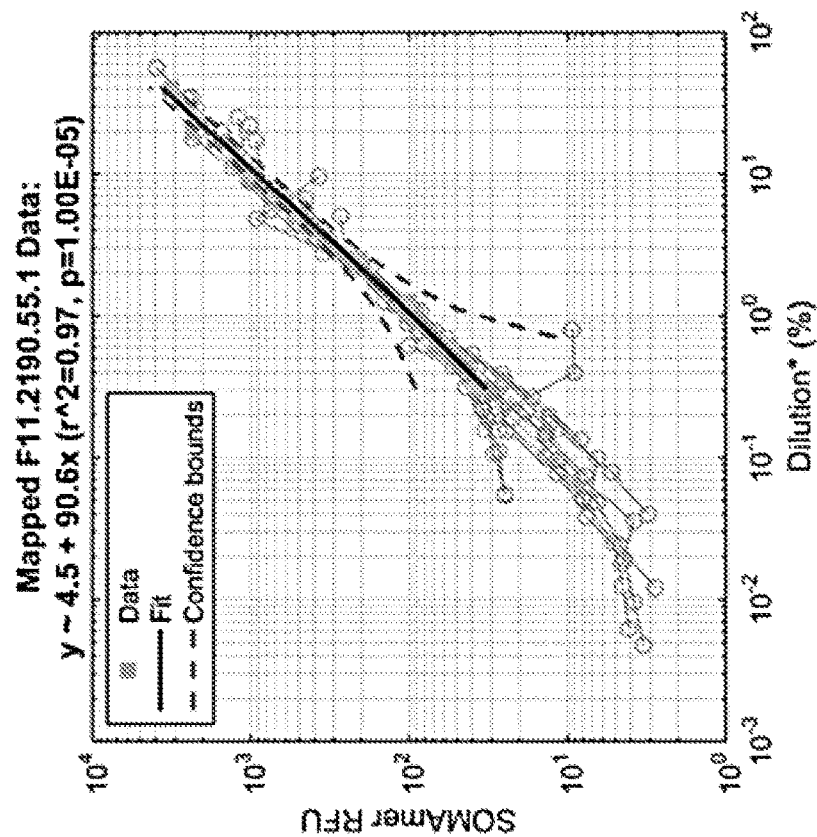
FIGS. 6A-6C show analysis of coagulation factor XI (F11) levels.
Figure 6A:
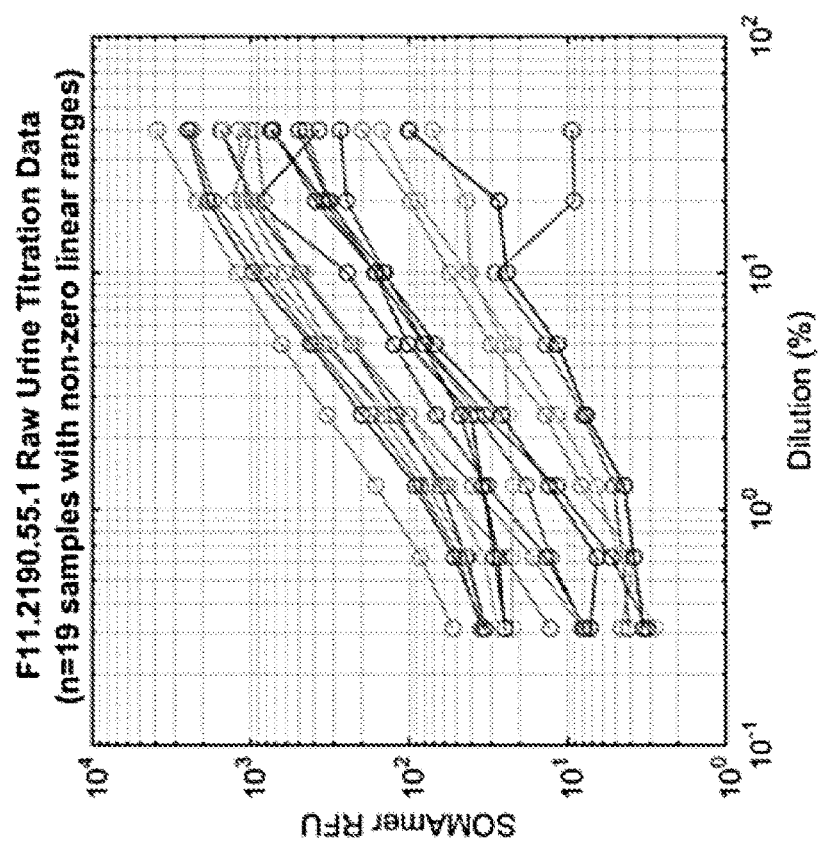
Figure 6C:
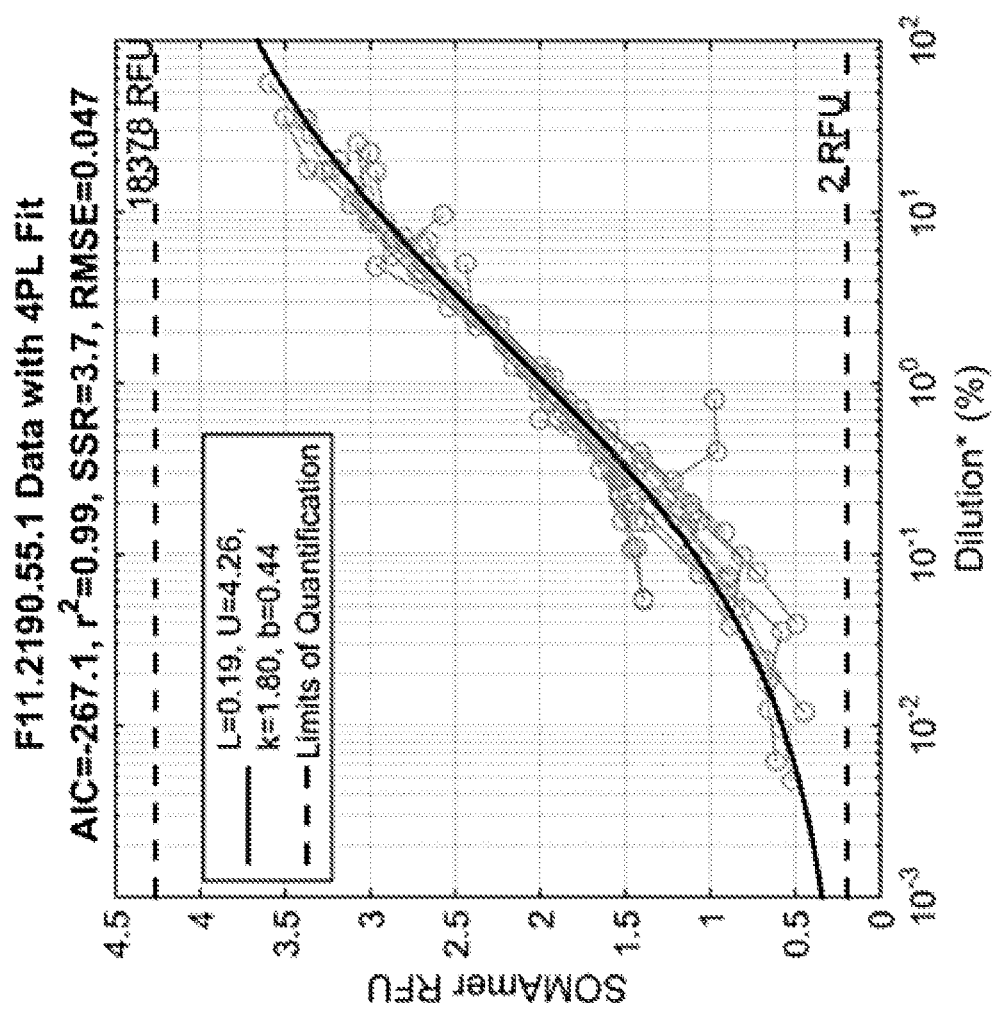
Figure 7C:
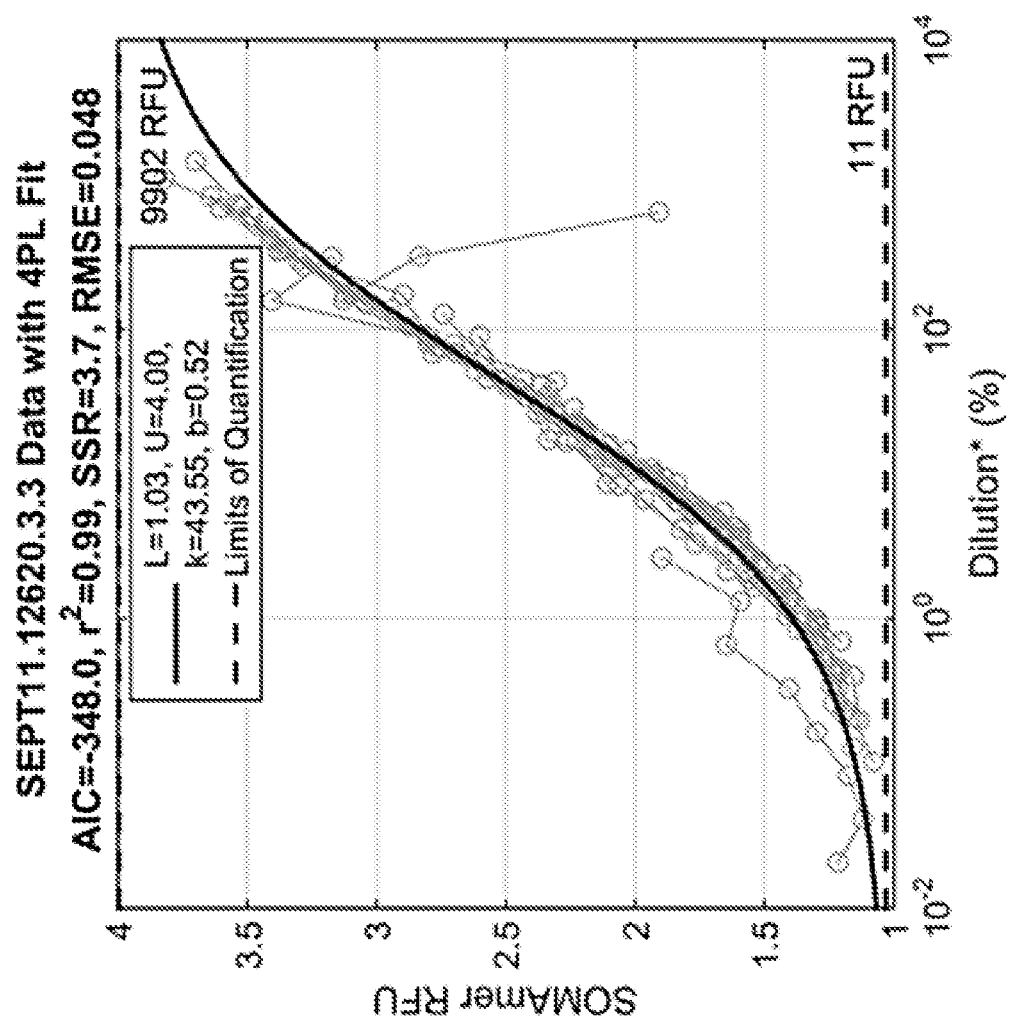
Figure 8B:
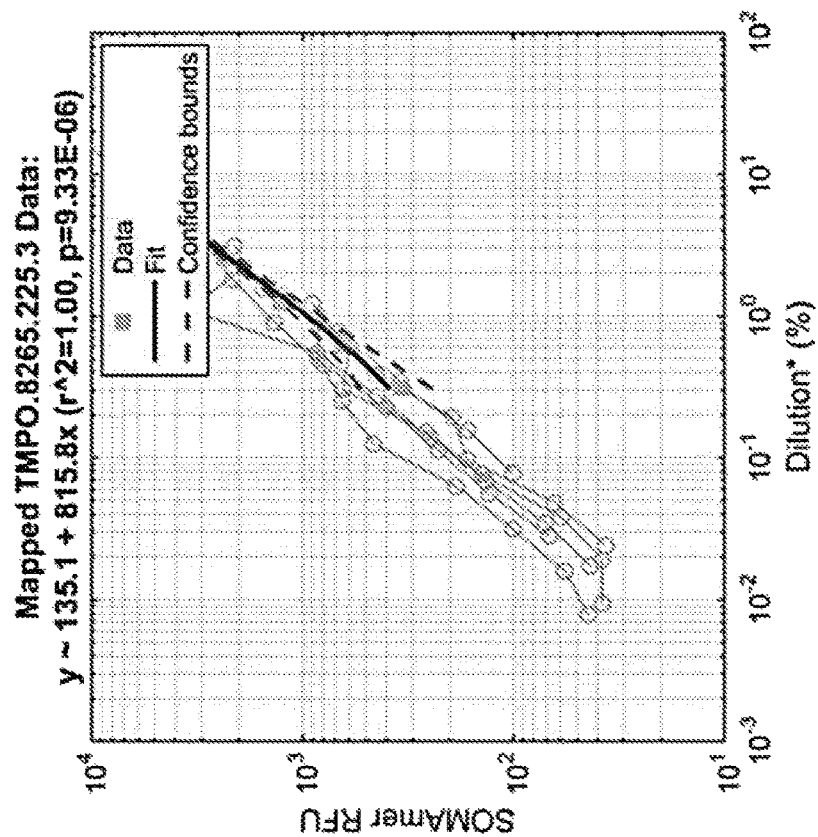
FIGS. 8A-8C show analysis of thymopoietin (TWO) levels.
Figure 8A:
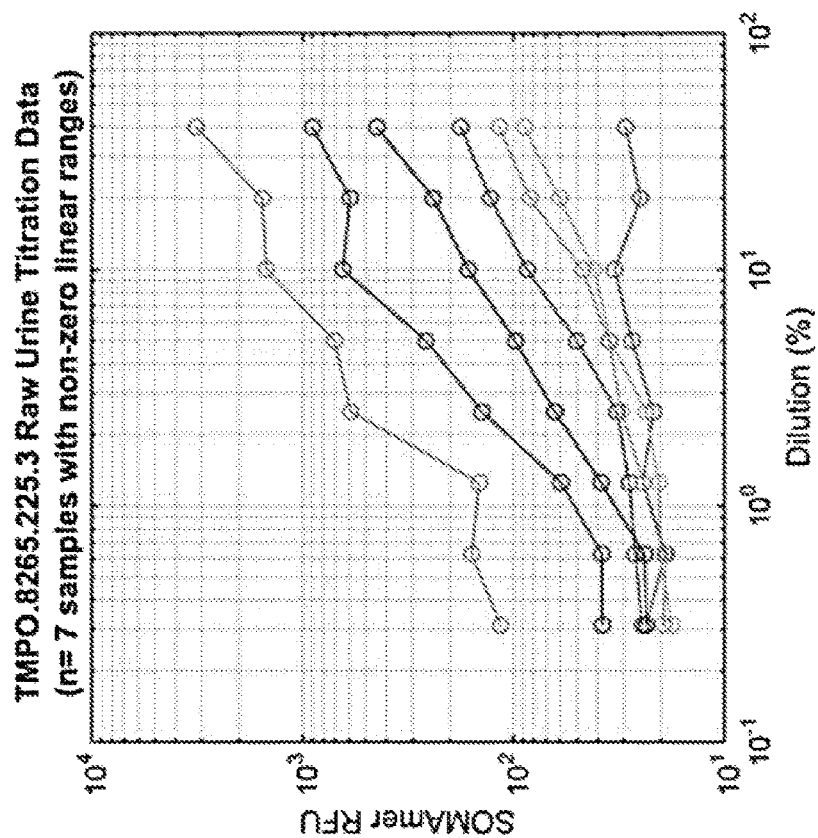
Figure 8C:
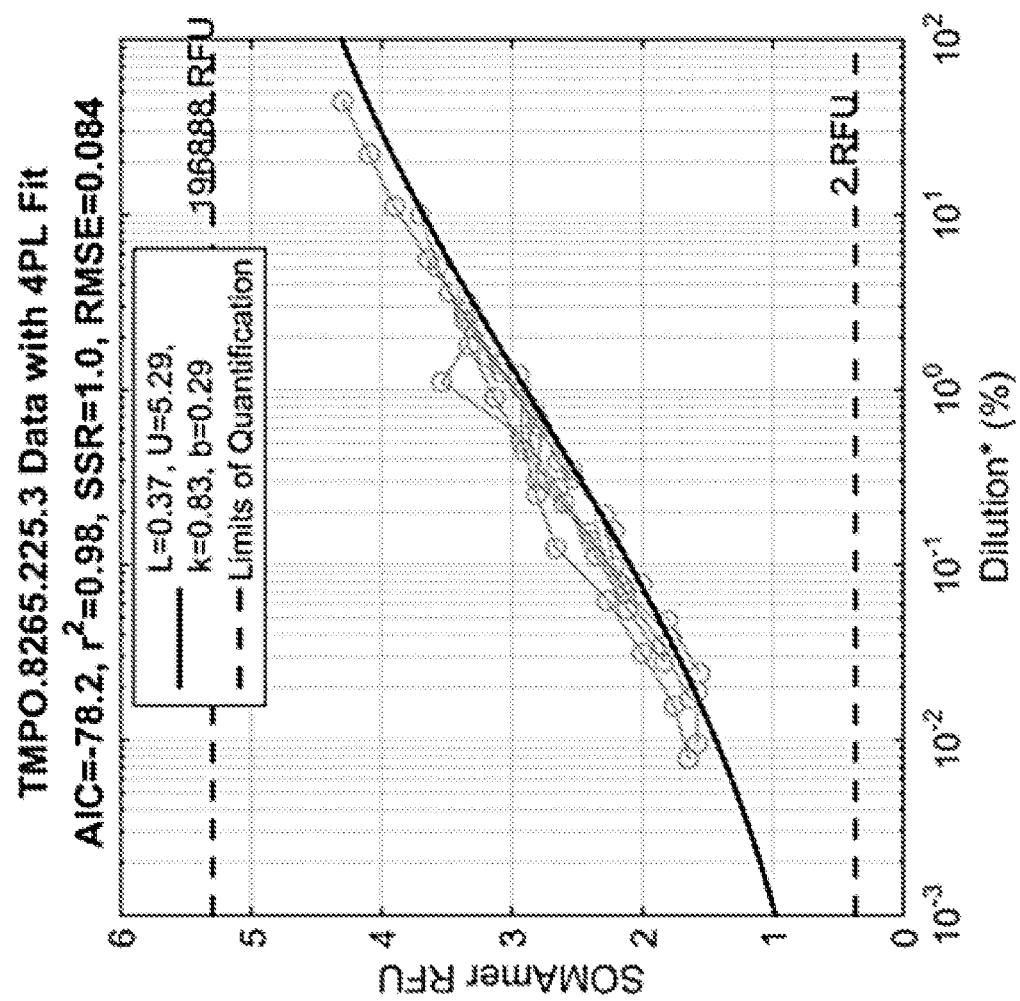
Figure 9B:
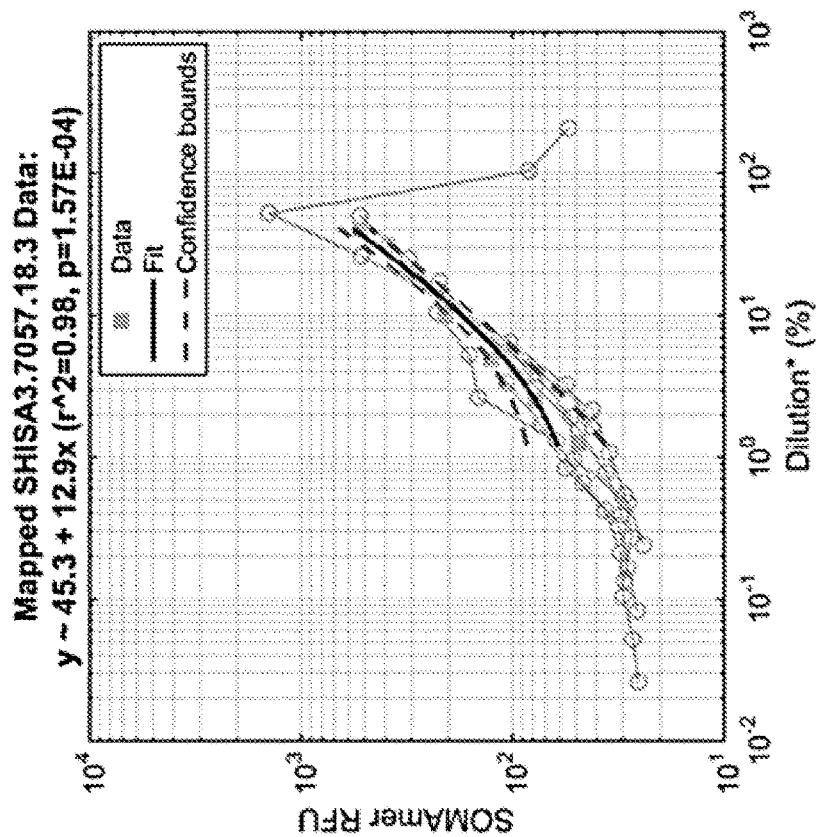
FIGS. 9A-9C show analysis of shisa family member 3 (SHISA3) levels.
Figure 9A:
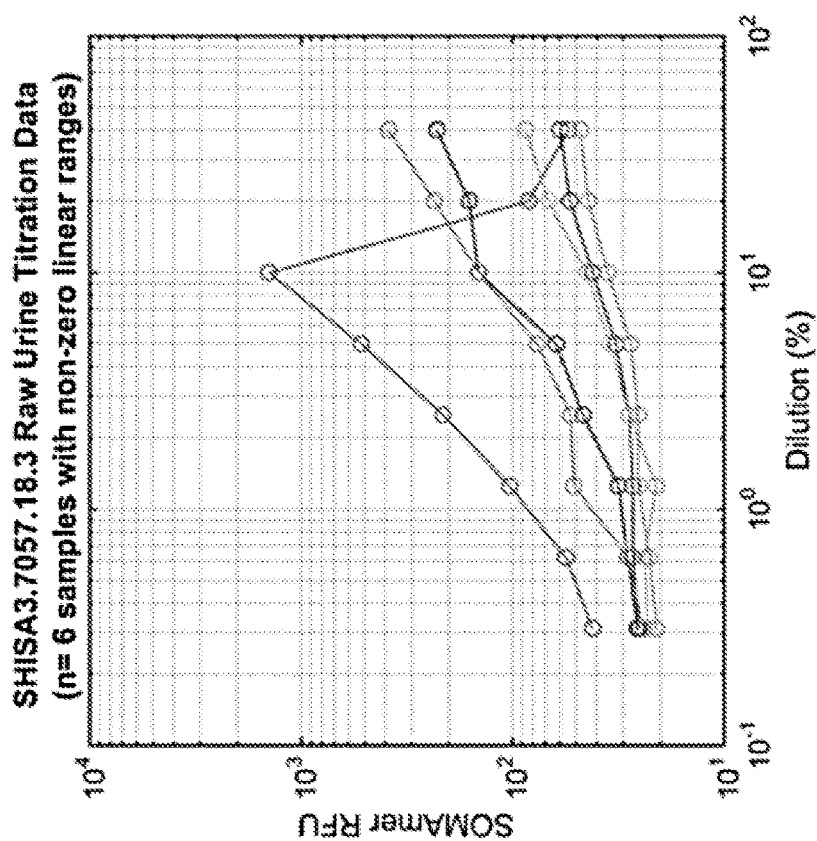
Figure 9C:
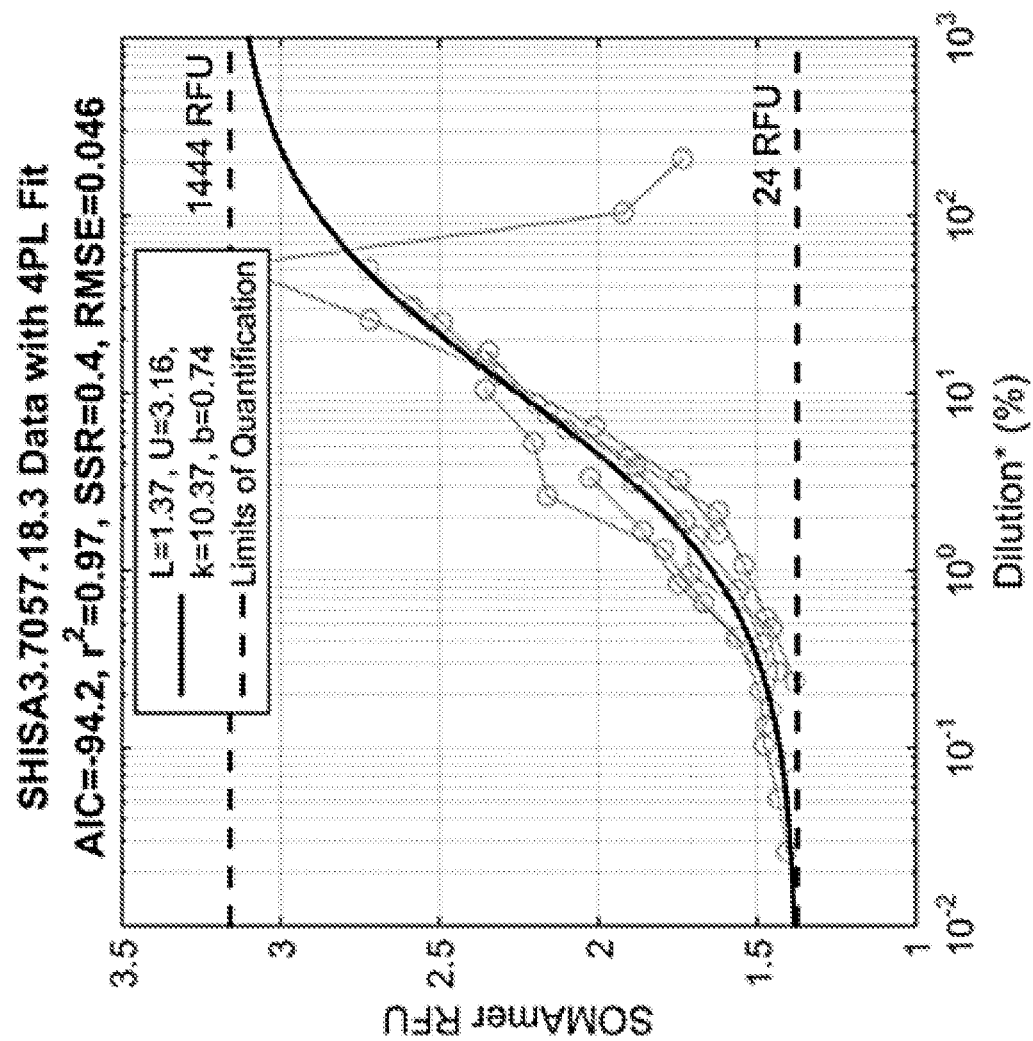

FIGS. 3A-3C through 9A-9C show similar analysis of platelet derived growth factor D (PDGFD, FIGS. 3A-3C), retinoic acid receptor responder 2 (RARRES2, FIGS. 4A-4C), interleukin 1 receptor like 2 (IL1RL2, FIGS. 5A-5C), coagulation factor XI (F11, FIGS. 6A-6C), septin 11 (SEPT11, FIGS. 7A-7C), thymopoietin (TMPO, FIGS. 8A-8C), and shisa family member 3 (SHISA3, FIGS. 9A-9C)

Example 2: Application of Empirical Matrix-Specific Standard Curves

This example provides a method used to normalize the level of an analyte measured in an assay using the empirical matrix-specific standard curve (or composite dilution model or the 4PL curve) generated in Example 1.

In general, the method entails selecting a subset of i analytes (aptamer based protein measurements) to use in the normalization computations.

Feature selection can be performed in many ways. Three examples are: 1) by selecting the top i analytes by 4PL goodness of fit, ranked by AIC; 2) performing feature selection for i analytes which have the ability to flatten a serial titration series of the same sample and/or 3) selecting analytes that have signal level above background (e.g., 2-fold, 3-fold, 4-fold, 5-fold, 6-fold, 7-fold, 8-fold, 9-fold or 10-fold level of above background).

For example, in relation to option 2 above, you would expect a two-fold increase in the normalization scale factor for every 1:2 dilution. Then for each sample to be normalized, find the predicted relative dilution by inversely solving the 4PL equation for all i analytes in the normalization subset. For the $i^{th}$ analyte (of n total) of sample k, the estimated relative dilution $\tilde{x}_{ij}$ is $$\tilde{x}_{ij} = \left( \frac{L_i - y_{ik}}{y_{ik} - U_i} \right)^{1/b_i}$$

Figures 10A, 10B:
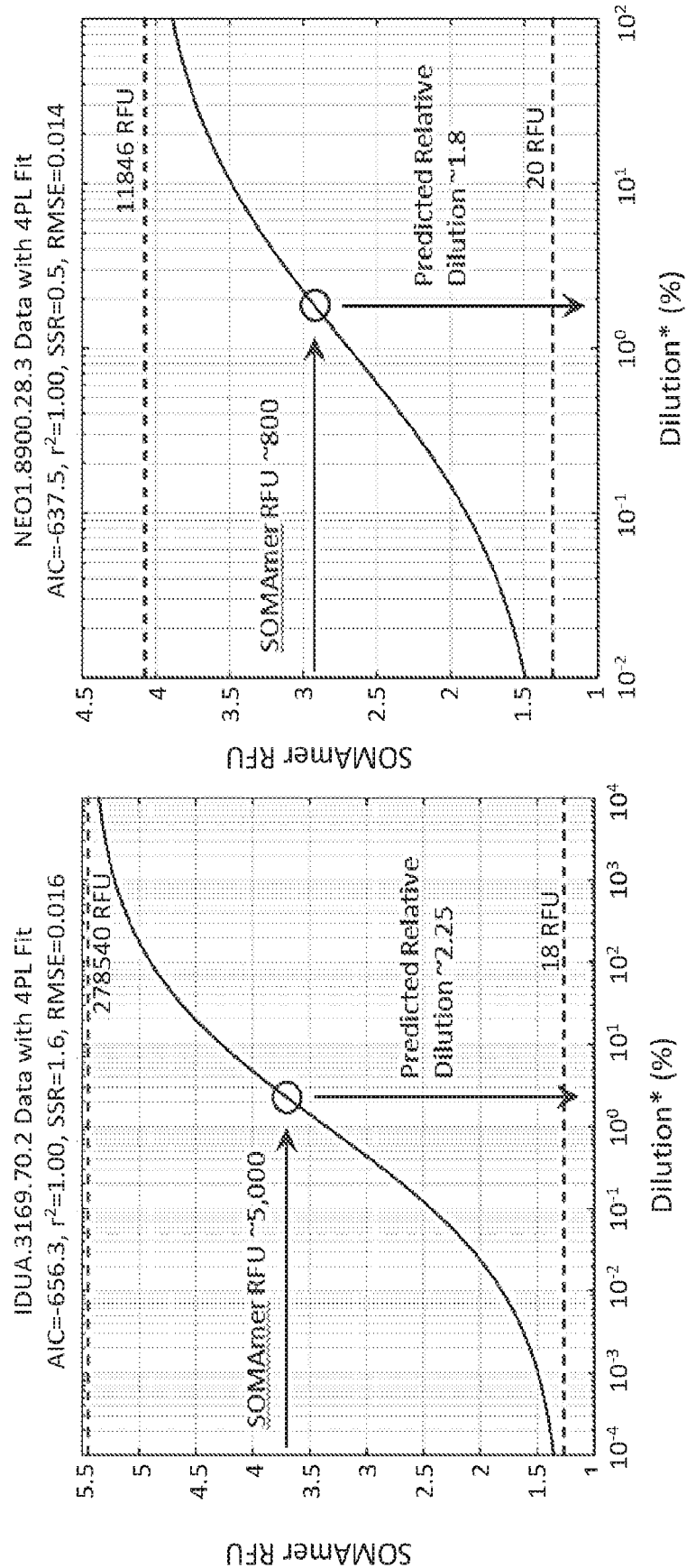
FIGS. 10A-10B show results of normalization of analyte levels for iduronidase (IDUA, 10A) and neogenin 1 (NEO1, 10B).

FIGS. 10A and 10B show the application of the general process for 2 analytes (iduronidase [IDUA] and neogenin 1 [NEO 1]). The RFU measurements for the samples that were normalized were projected onto the 4PL curve to generate two predicted relative dilutions.

This information can then be used to find the estimated relative dilution for that sample. In some embodiments, the median predicted relative dilution of all $i^{th}$ analytes is determined. This process results in a distribution of n predicted relative dilutions for each sample to be normalized. The median of this distribution is the predicted relative dilution for that sample, and the 4PL normalization scale factor for that sample is 1 over the predicted relative dilution.

In some embodiments, the median, mean, or a value derived from the central tendency of the estimated relative dilutions is selected. The estimated relative dilution for each sample can then be used to normalize that sample. In some embodiments, a scaling factor for each sample is generated by dividing a reference value by the estimated relative dilution for that sample. This reference value can, in some embodiments, be 1 (making the scaling factor the inverse of the estimated relative dilution) or the median estimated relative dilution over all the samples to be normalized.

Figure 11:
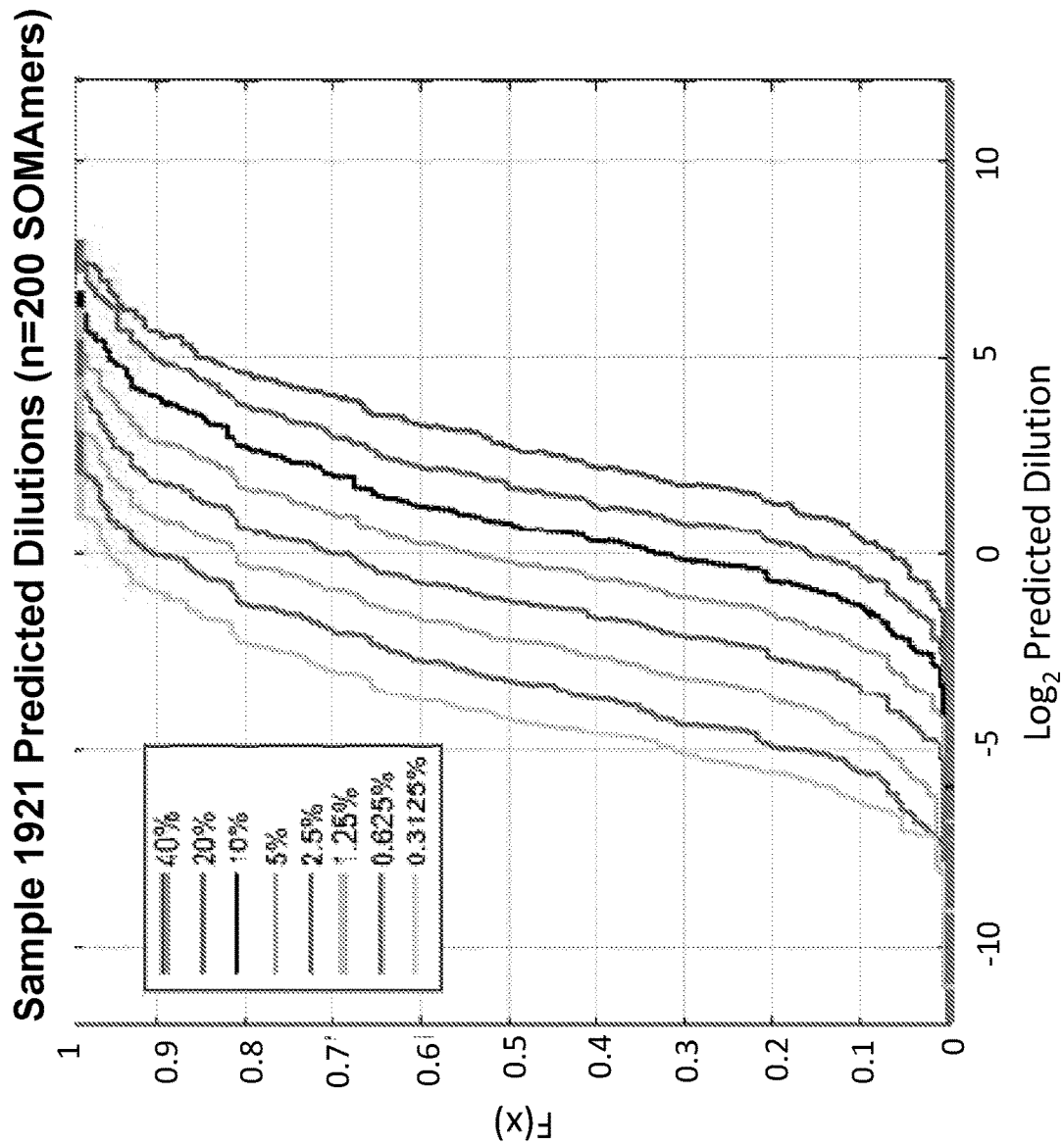
FIG. 11 shows distributions of predicted relative dilutions for 4 serial 1:2 dilutions of a single sample. The lines shown are, from left to right, 0.3125%, 0.625%, 1.25%, 2.5%, 5%, 10%, 20%, and 40%.

FIG. 11 shows distributions of predicted relative dilutions for 4 serial 1:2 dilutions of a single sample, the median value is observed to scale perfectly with the dilution of the sample using the 200 analytes with the best AIC.

Example 3: Pilot Study Design to Characterize and Normalize the Variation in Analyte Signal Due to Hydration Status of a Human Subject This example provides an overview of a pilot study used to characterize and validate a normalization scheme for the variation of analyte signal measurements in human subjects under controlled hydration conditions.

A gender balanced cohort of 16 study participants aged 26 to 57 years (mean age of 33 years) was recruited for the study. The informed consent for this study fell under the IRB-approved SomaLogic Biorepository Research Protocol, or WIRB #20150206. All participants signed the consent form and completed a brief health questionnaire where metadata was collected, including age, gender, height, weight and other demographic information. All metadata was kept anonymous within the study.

Collection Protocol: The clinical information obtained from a urine specimen may be influenced by the collection method and handling. Thus, the collection procedure employed for the study was a "midstream clean catch" in order to reduce the incidence of cellular and microbial contamination. Participants were requested to void the first portion of the urine stream into the toilet, which flushes the urethra and significantly reduces the opportunities of contaminants to enter the stream.

The urine midstream was collected into a 90 ml preservative-free, pre-labeled sterile collection cup with a secure, leak-resistant lid. Samples collected at SomaLogic were placed in a pre-labeled biohazard bag and immediately placed in a laboratory refrigerator designated for biological samples for later aliquoting and storage at −80° C.

In order to maintain sample conditions similar to those received from future prospective subjects, no pretreatment or centrifugation was performed before aliquoting. The time of collection was recorded for all samples. In addition to 4 to 6 assay aliquots, one 8 ml aliquot was created for urinalysis.

Samples were anonymized by assigning a unique alphanumeric identifier to each study participant and all collection tubes and biohazard bags were labeled with this identifier as well as the time and date of collection. All metadata and proteomic data was entered into the database using this identifier. This process created a barrier of anonymity that prevented metadata or proteomic data from being associated with a participant. The master key tying the identifier to the participant was created internally, and was kept confidential and only select individuals had access on a need to know basis.

Participants were asked to refrain from anti-inflammatory medications for 48 hours pre-study and to stop drinking fluids at 10:00 PM the night before the study. Urination was allowed throughout the night, if necessary, but the "first void" urination in the morning was collected.

The Study Protocol: All participants were asked to refrain from drinking any liquids (water, coffee, etc.) or exercising in the morning. The first void sample collected at home was immediately placed on ice until arrival at SomaLogic, where it was placed in the refrigerator at 2 to 8° C.

Participants were fed a calorically-balanced breakfast and asked to consume 1.5% of the participant's body weight in water over a 30 minute period ("hydration challenge"). This amounts to ~850 ml for a 125 lb individual and ~1120 ml for a 175 lb individual. Instead of pre-specifying the amount of food for each participant, food intake was controlled by simply asking participants to eat a conservative amount.

From 9 AM until noon, a portion of each urination was collected, with a final 'exit' urine sample collected at approximately 12:00 PM. No water was allowed between 9:00 AM and 12:00 PM. Two to five serial samples followed the hydration challenge with the last sample occurring at approximately 12 PM. In addition, 15 participants provided an uncontrolled sample at 12 PM on the following day. In total, 81 urine samples were collected from the 15 participants.

Per the collection protocol, all samples were collected "mid-stream" and were sent to a clinical lab for a complete urinalysis, including specific gravity, total protein, urea, total salts and microbial titers. Total urine volume was not recorded.

Figure 12:
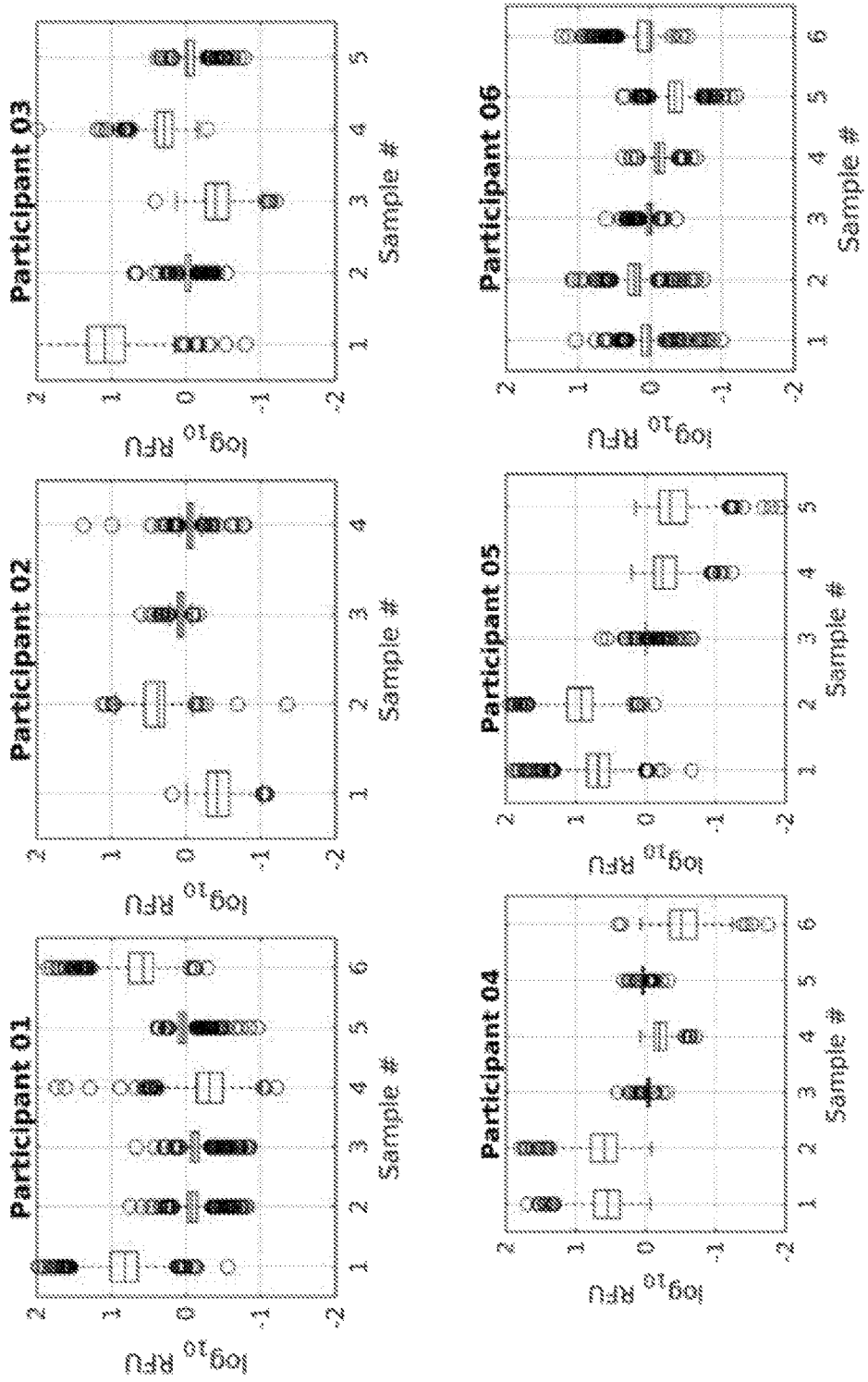
FIG. 12 shows the target protein levels before normalization for 15 study participants.
Figure 12:
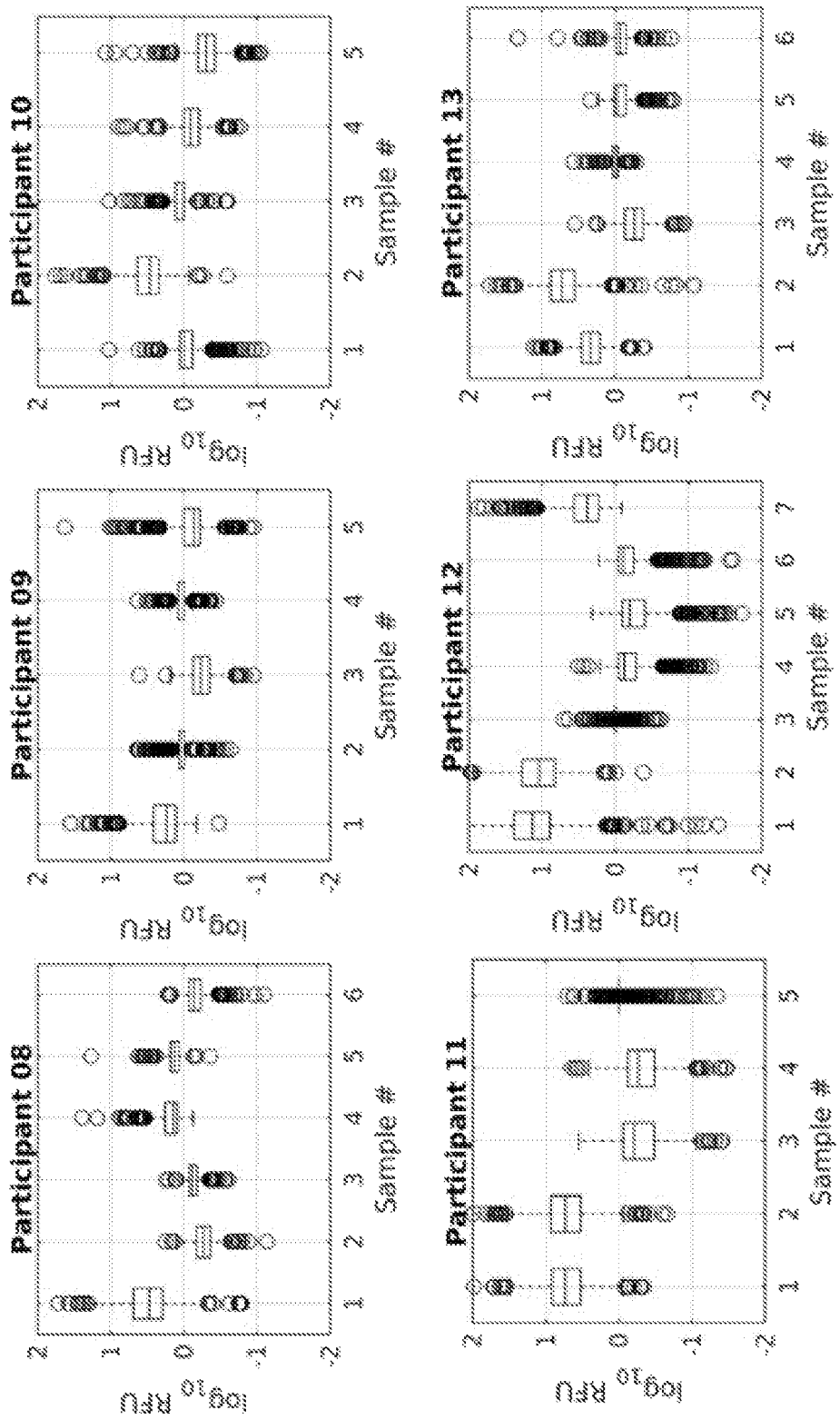
Figure 12:
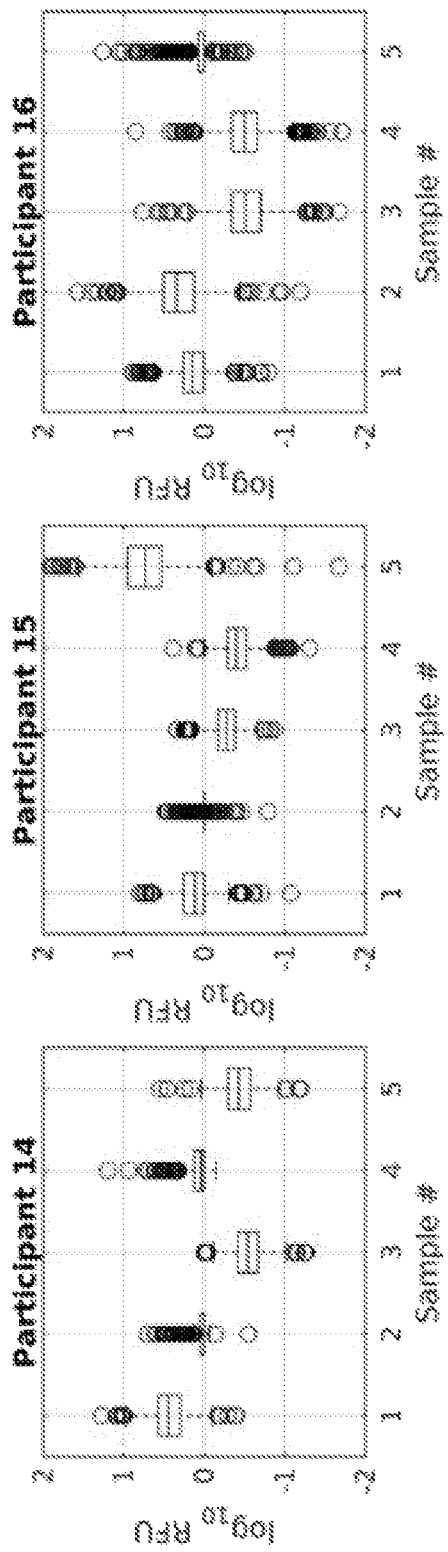

Measurement of Analytes from Collected Samples:

Urine samples from the subjects in the study were assayed using an aptamer based assay that measured the levels of over a thousand proteins. For each study participant, FIG. 12 shows the data for each aptamer before normalization (represented as a line across multiple time points) represented as $\log_{10}$ change from the median RFU signal for that aptamer. A general bias exists in the non-normalized data due to hydration state of the participant, where signals for the first morning void sample (most concentrated) are higher compared to the median. This signal then diminishes due to the hydration challenge, and then increases since the study participants refrained from drinking water post-hydration challenge.

Figure 13:
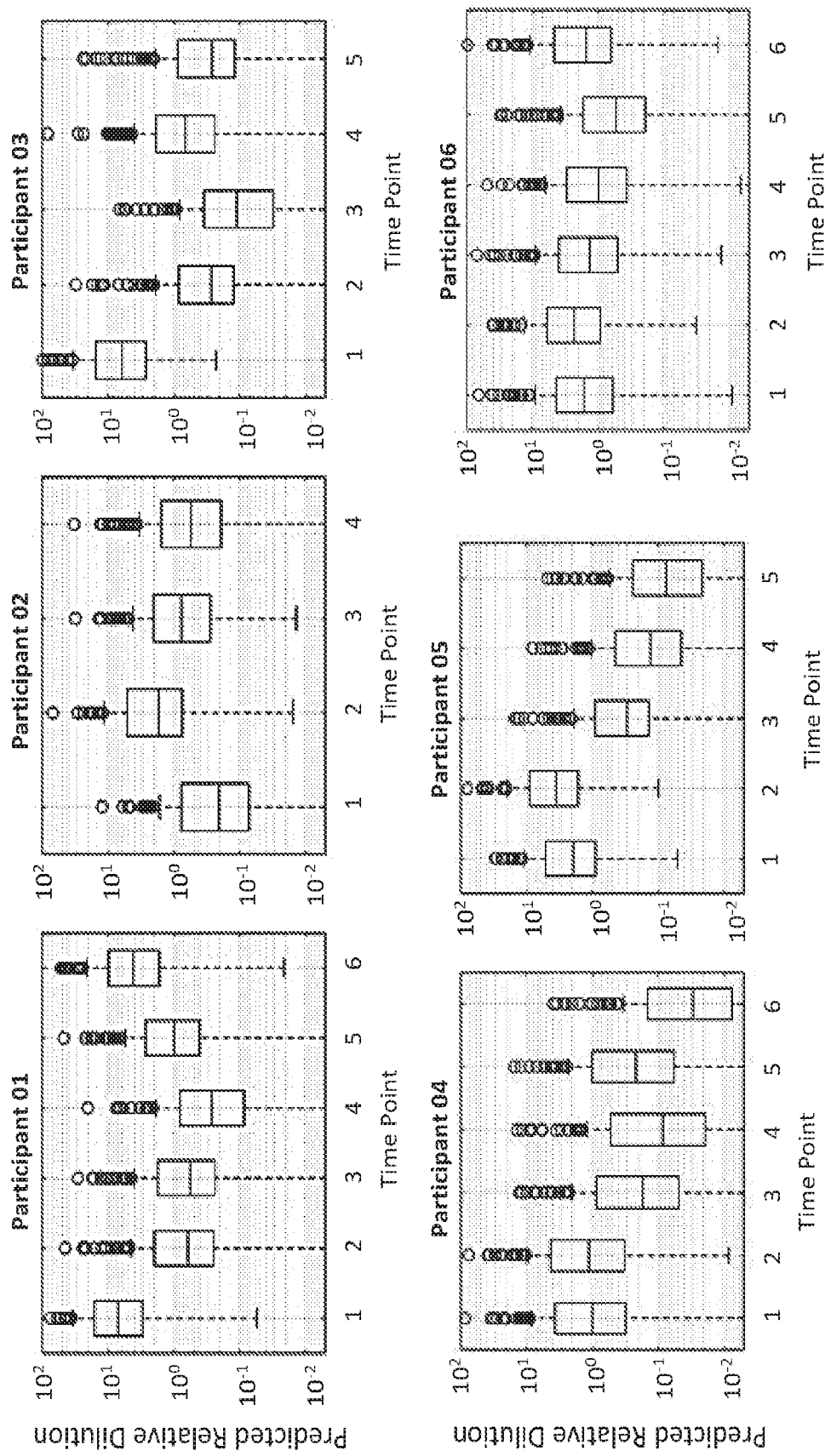
FIG. 13 shows the predicted relative dilution of each sample calculated from composite dilution curves, for 15 study participants.
Figure 13:
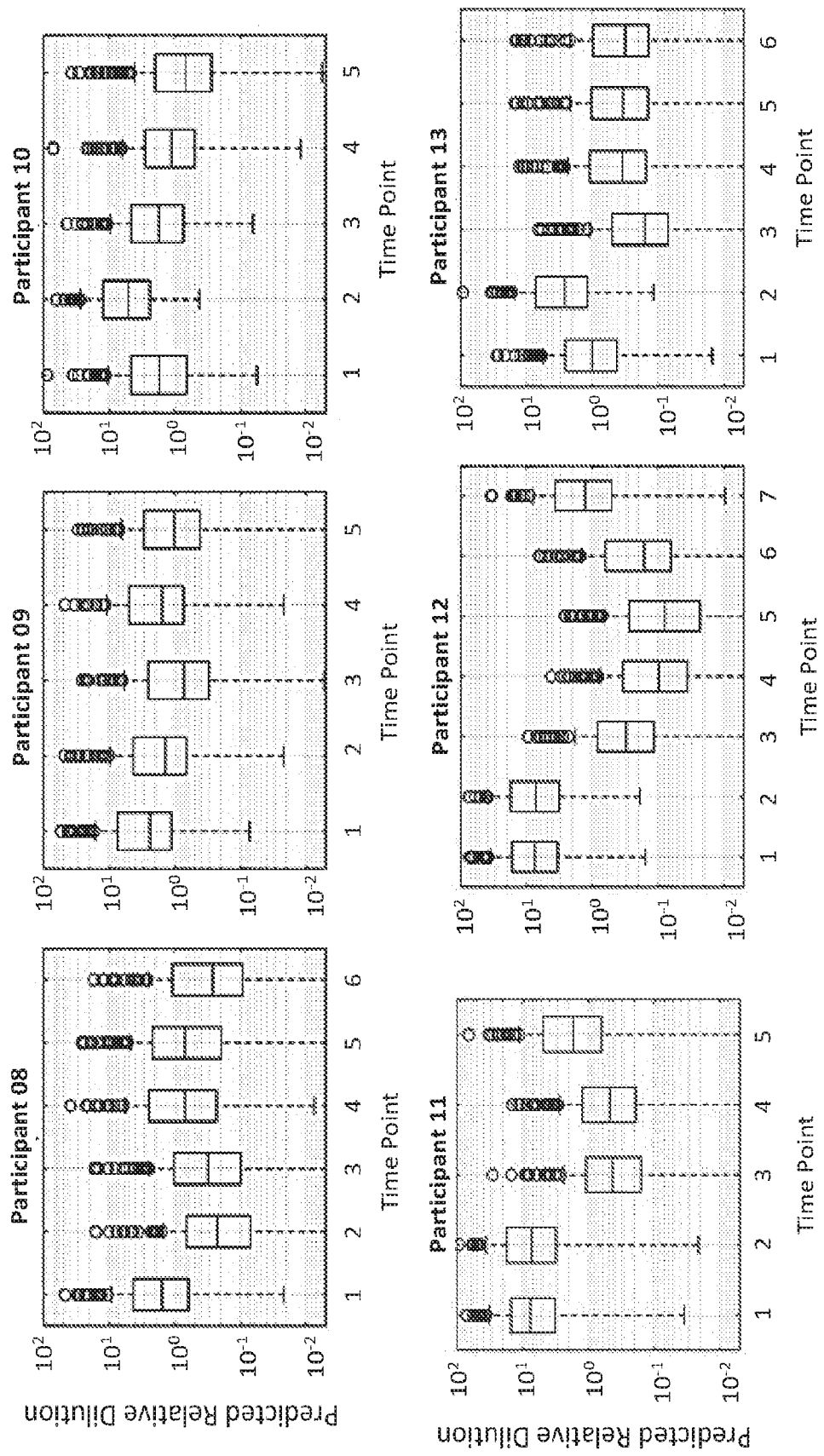
Figure 13:
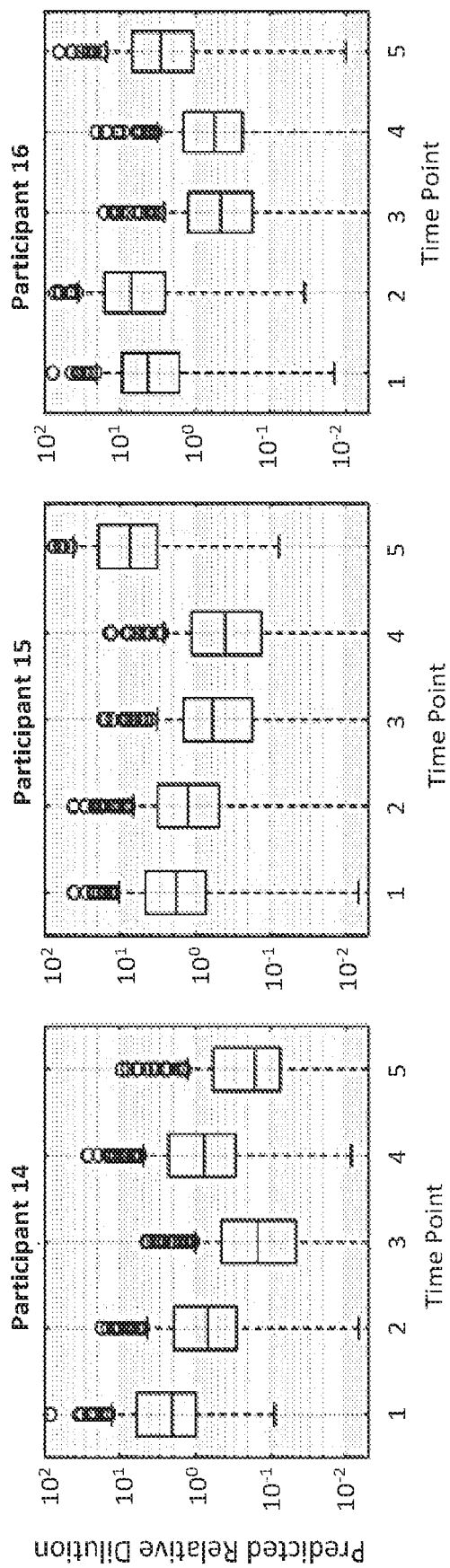
Figure 14:
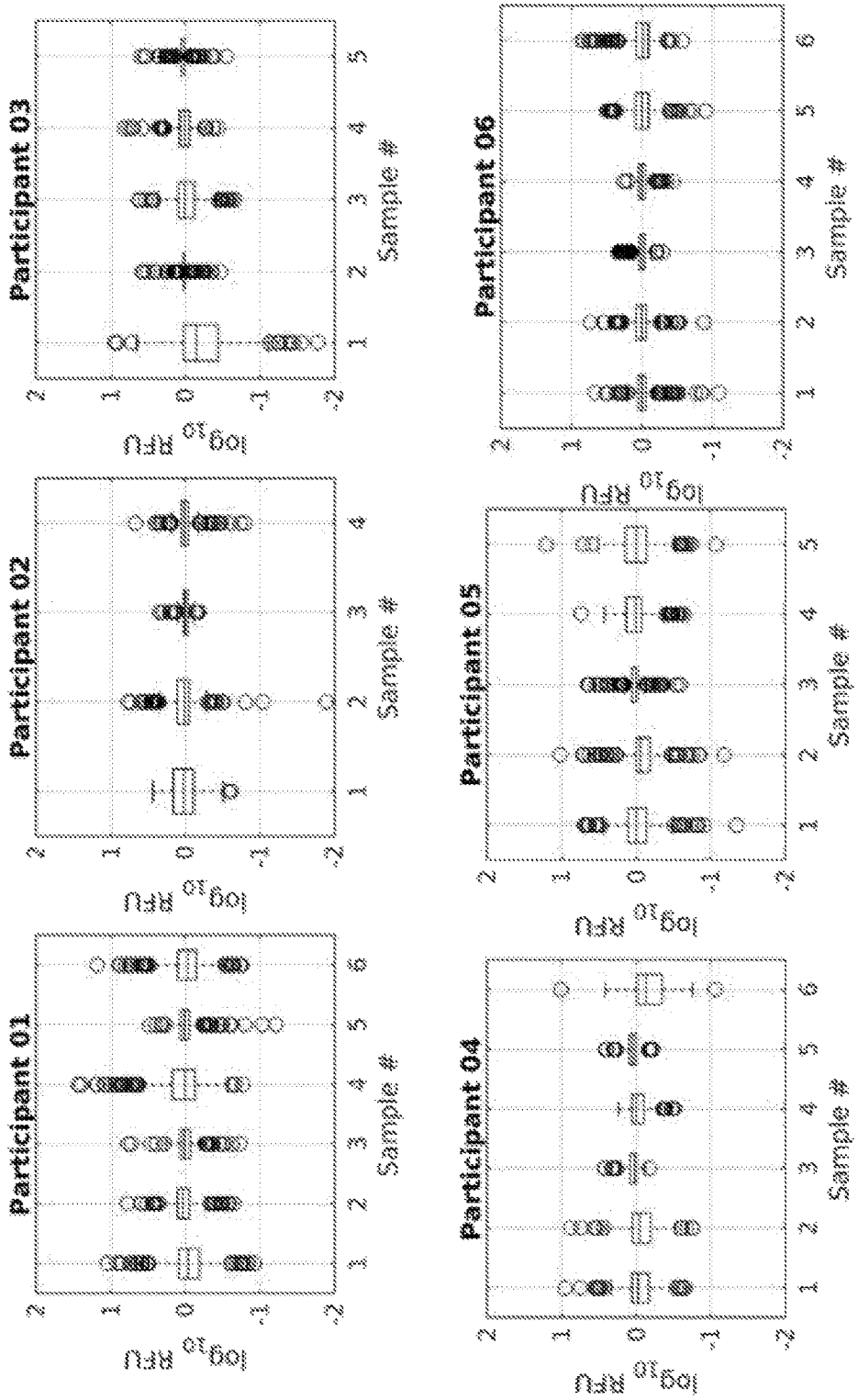
FIG. 14 shows the normalized samples for the 15 study participants.
Figure 14:
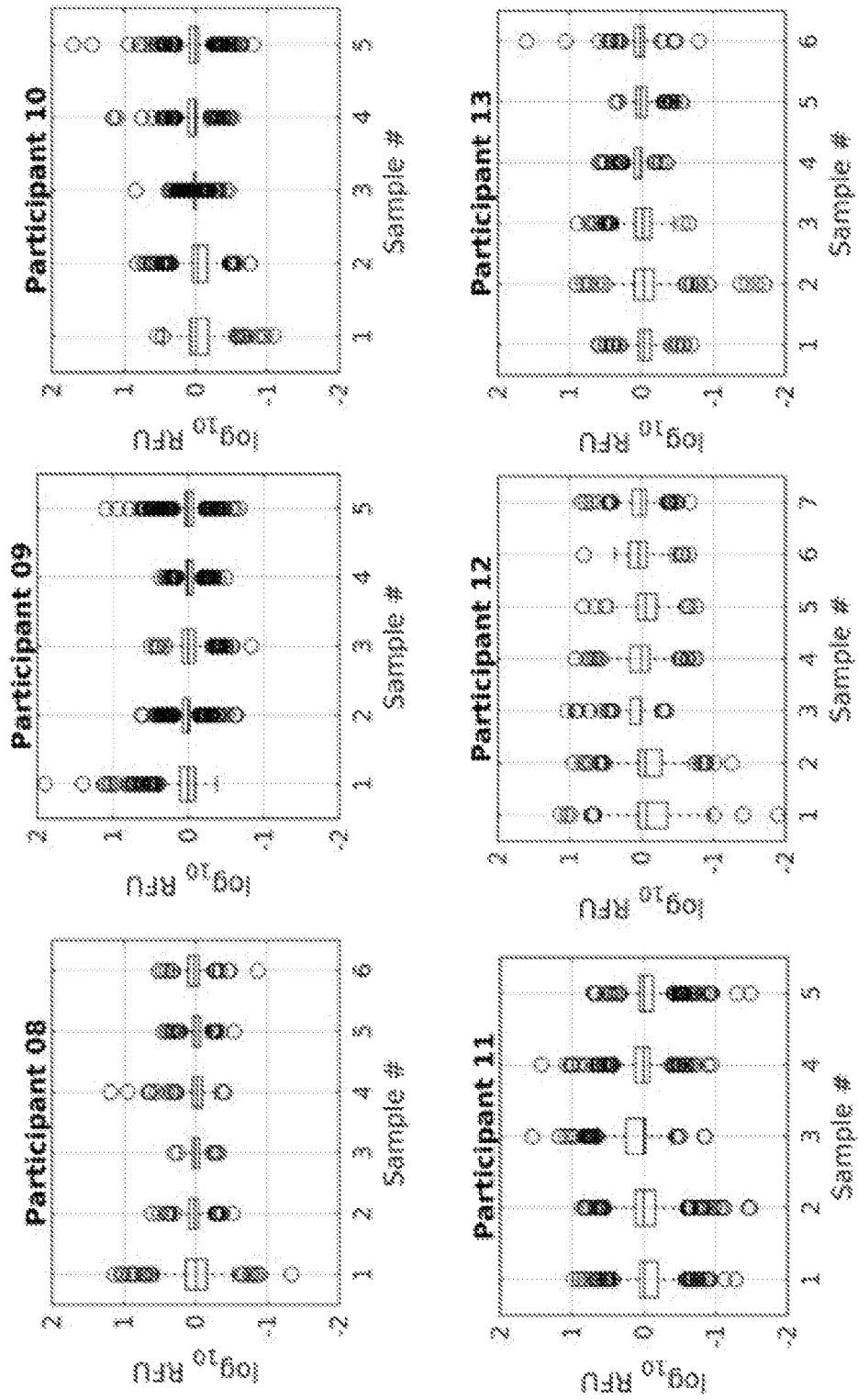
Figure 14:
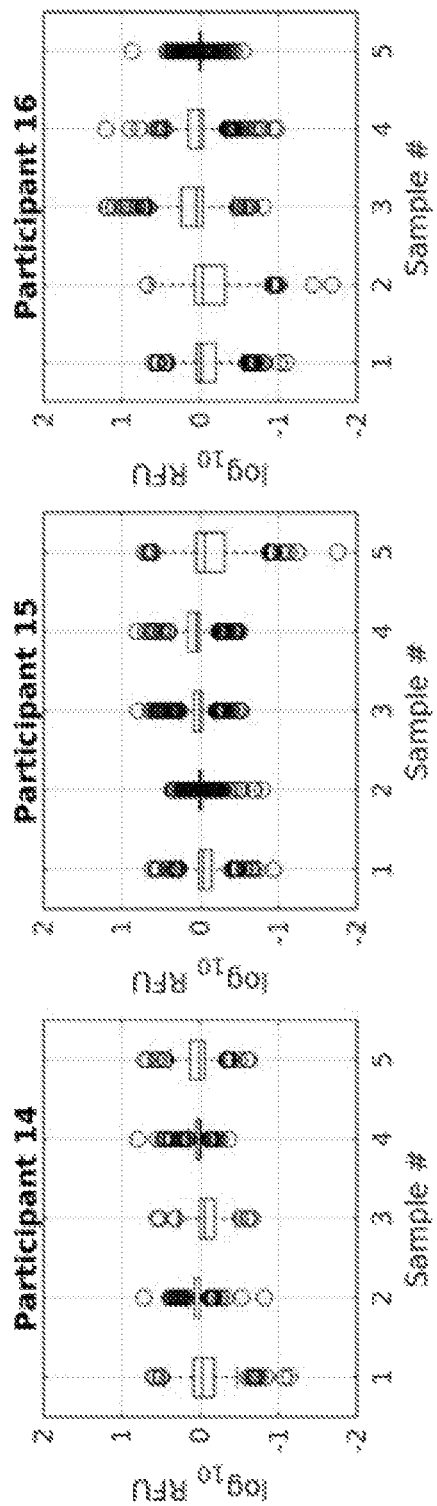

This data was used to demonstrate the efficacy of the composite dilution model to compensate for the hydration level of the subject and extract consistent and clinically relevant information about the test subject. The composite dilution model was applied to all serial samples for each study participant. Boxplots of the predicted relative dilutions for all serial samples for each study participant are shown in FIG. 13. These values were calculated from the composite dilution curves for all aptamers. The normalization process then computes a scale factor for each sample by shifting the median of each boxplot to 1. FIG. 14 shows the resulting time series after normalization using the composite dilution model to compensate for the hydration level of the subject, which is represented as RFU change from the median level of each aptamer.

Figure 15A:
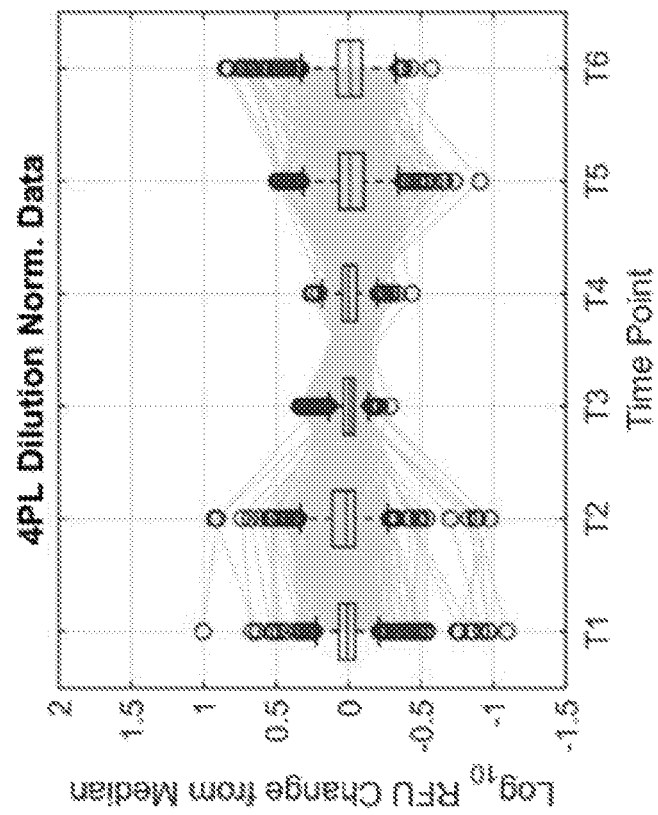
FIGS. 15A-15D show non-normalized (15A and 15C) and normalized (15B and 15D) measurements of analytes from urine of a single study participant.
Figure 15B:
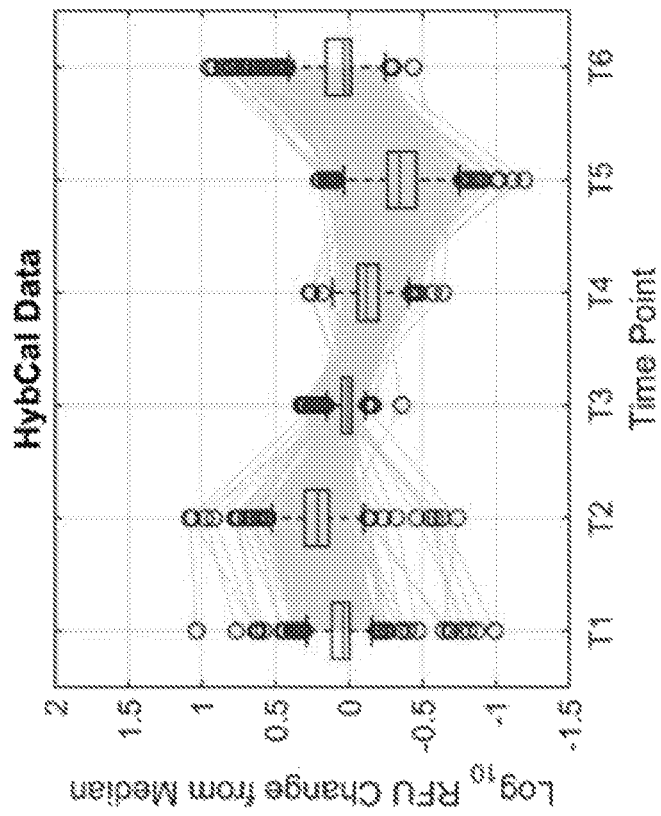
Figures 15C, 15D:
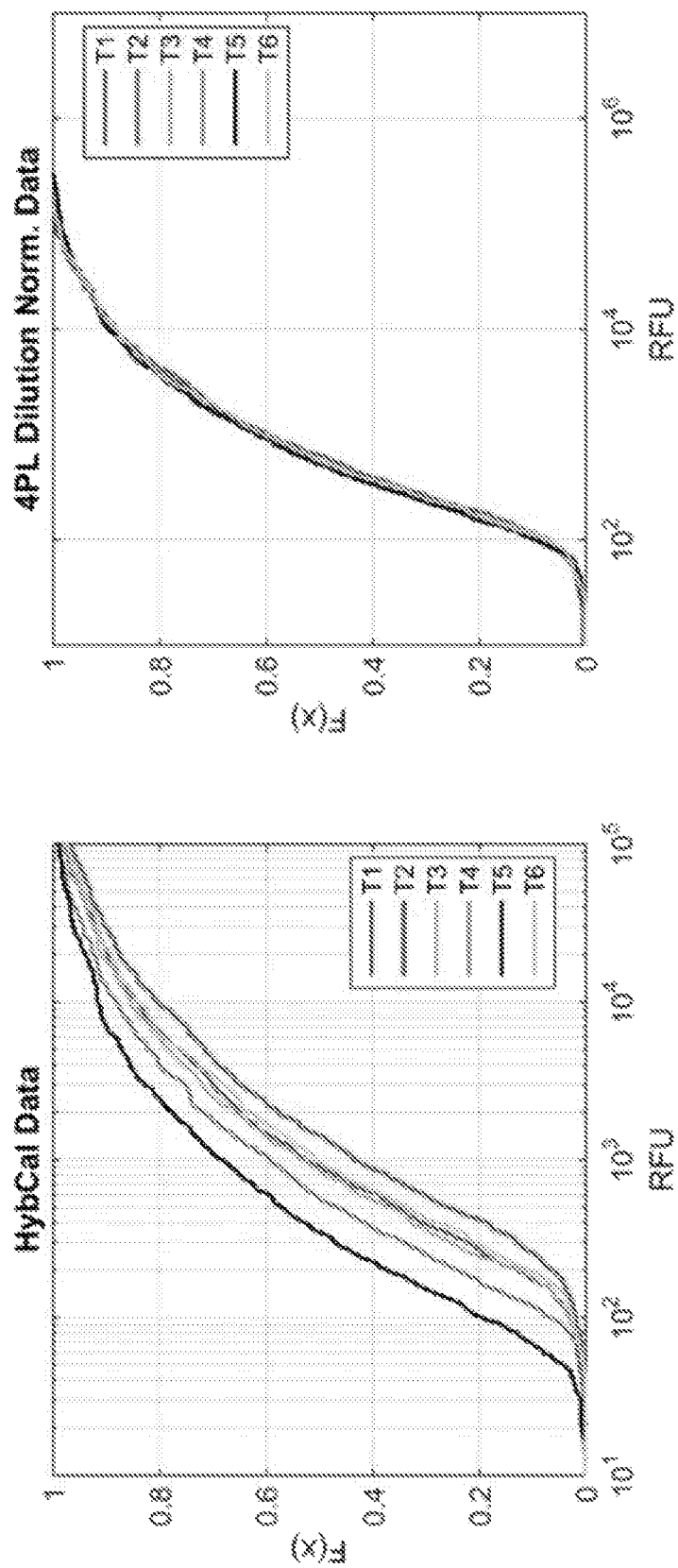
Figure 16B:
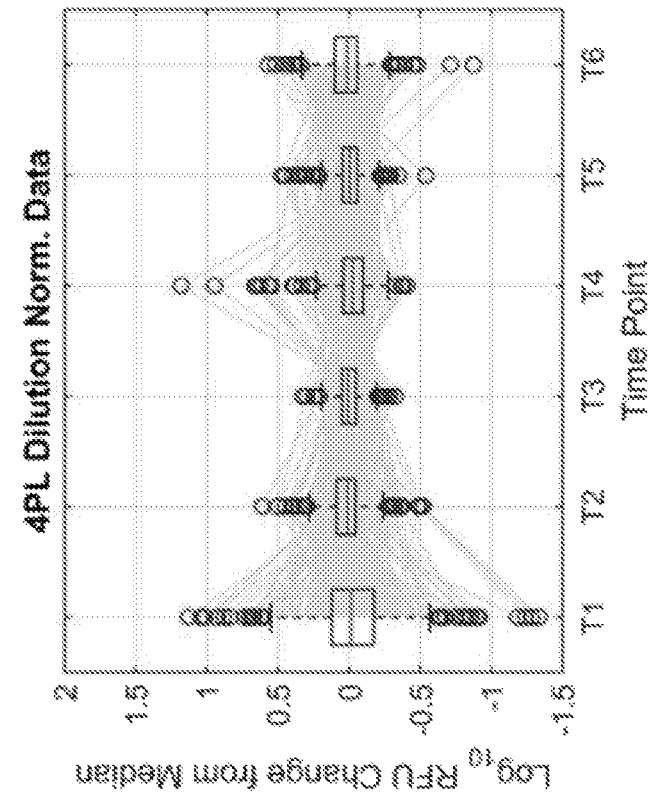
FIGS. 16A-16D show non-normalized (16A and 16C) and normalized (16B and 16D) measurements of analytes from urine of a single study participant.
Figure 16A:
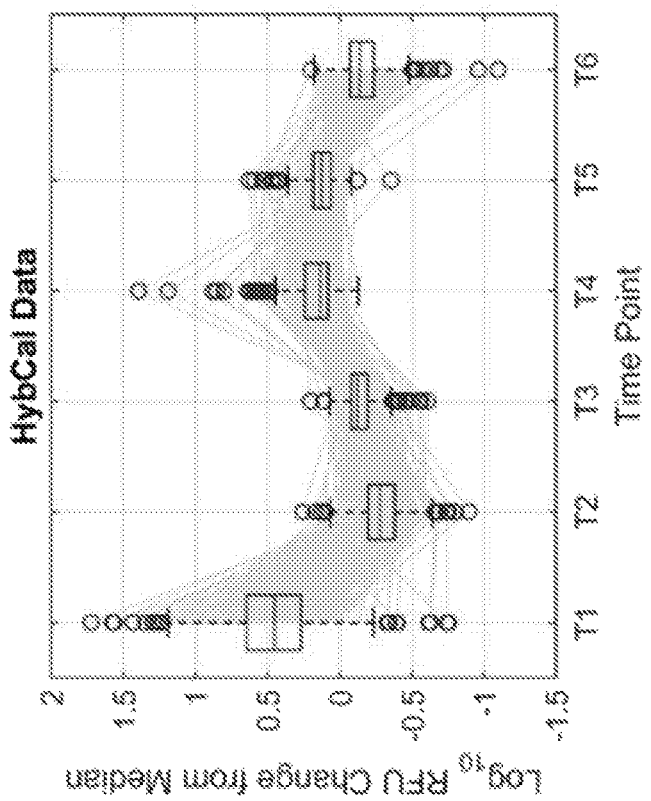
Figures 16C, 16D:
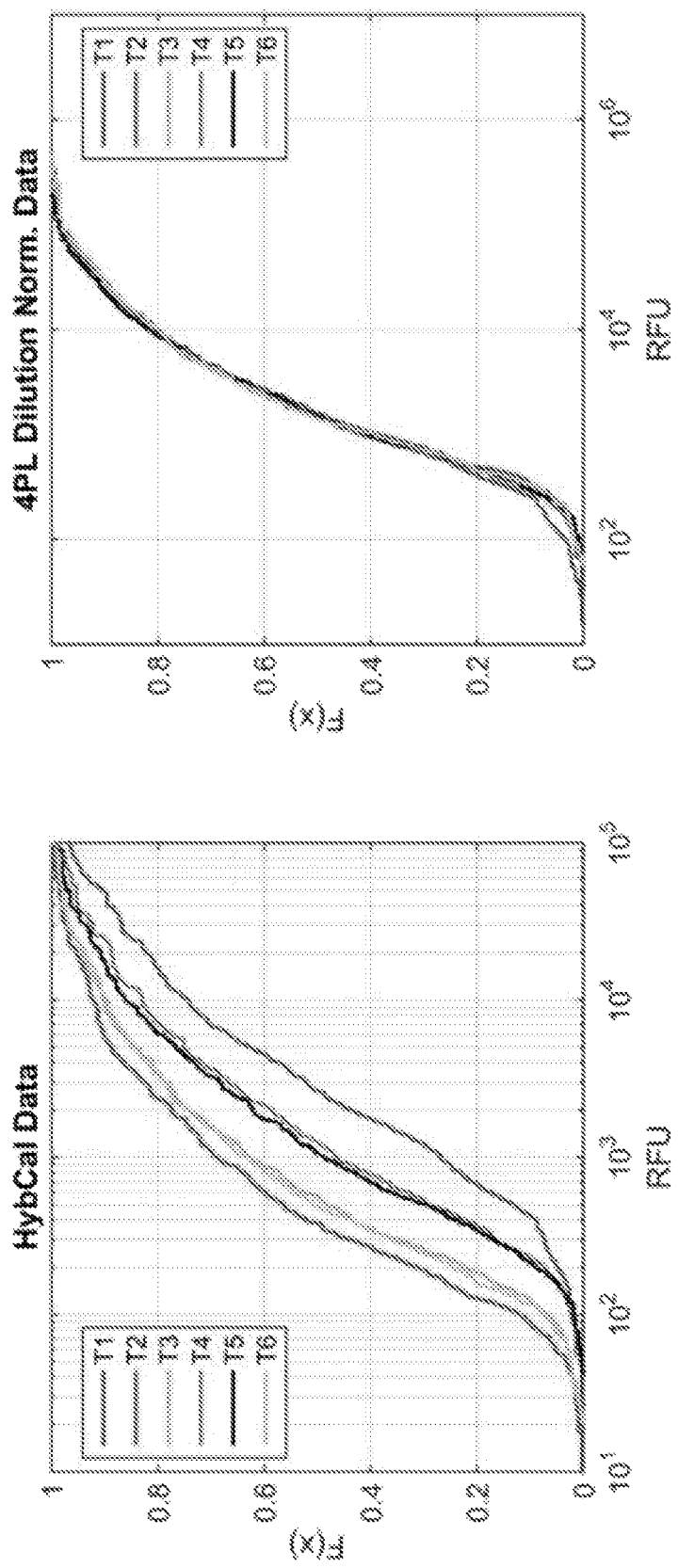

The boxplots and cumulative distribution functions (CDFs) in FIGS. 15 and 16 show the distribution of signal at each time point in two separate study individuals. FIGS. 15A/C and 16A/C show the bias in signal level before normalization and FIGS. 15B/D and FIGS. 16B/D show the distributions of signal level after normalization. Each line in the upper plots represents an aptamer signal level across samples.

FIGS. 15B and 16B show the reduction in systematic bias/variance quantified the repeated measures ANOVA F statistic, which may be interpreted as the ratio of within group difference to between group differences. High F statistics result from large differences between time points, and low F statistics show that differences between time points resemble what is to be expected given random chance. The F-statistic was computed for the non-normalized and normalized data for each study participant and is shown in FIG. 17A. The normalization procedure resulted in a highly significant reduction in longitudinal variance (p<1E-8, N=15). FIG. 17B shows fold reduction in F statistic for each study participant, which had a median of 81.88 and a range of 13.12-524.96.

The invention claimed is:

1. A method for determining a relative dilution of a biological test sample from at least one subject, the method comprising:
developing a composite dilution model for at least one analyte from the biological test sample by steps comprising:
a) determining a level of the analyte in a first dilution series of a first biological sample comprising the analyte, wherein the first dilution series comprises at least three (3) different dilutions, and the level of the analyte is determined in each of the at least three different dilutions;
b) determining a level of the analyte in a second dilution series of a second biological sample comprising the analyte, wherein the second dilution series comprises at least three (3) different dilutions, and the level of the analyte is determined in each of the at least three different dilutions of the second dilution series;
c) performing at least one horizontal translation, wherein the at least one horizontal translation is selected from:
(i) a horizontal translation (AX) of the second dilution series to the first dilution series; and
(ii) horizontal translations of the first dilution series (AX) and the second dilution series (ΔY) to an arbitrary reference value, wherein the arbitrary reference value is an analyte level at a specific dilution, wherein the analyte level at the specific dilution is not found in the first dilution series or the second dilution series;
wherein the at least one horizontal translation results in a lined composite translation series; and
d) fitting a function to the lined composite translation series thereby forming the composite dilution model; and
horizontally translating a level of the at least one analyte from the biological test sample to the composite dilution model developed for the at least one analyte, thereby determining the relative dilution of the biological test sample from the subject.

2. The method of claim 1, wherein the method for developing the composite dilution model further comprises:
generating a first model based on the levels of the analyte of the first dilution series and a second model based on the levels of the analyte of the second dilution series;
selecting a reference value, wherein the reference value is selected from:
(i) a first model reference value that is an analyte level at a specific dilution of the first model; and
(ii) an arbitrary reference value that is a second analyte level at a second specific dilution, wherein the second analyte level at the second specific dilution is not found in the first model or the second model.

3. The method of claim 1, wherein the horizontally translating the level of the at least one analyte from the biological test sample to the composite dilution model developed for the at least one analyte comprises horizontally translating the level of at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 50, at least 75, at least 100, at least 150, or at least 200 different analytes from the biological test sample to the respective composite dilution model developed for each of the different analytes to determine a relative dilution of the biological test sample for each of the different analytes, and using the relative dilution for each of the different analytes to determine the relative dilution of the biological test sample.

4. The method of claim 3, wherein the relative dilution of the biological test sample is derived from a central tendency of the relative dilutions of each of the different analytes.

5. The method of claim 3, wherein the relative dilution of the biological test sample is derived from a median, mean or mode of the relative dilutions of each of the different analytes.

6. The method claim 1, wherein each of the biological test sample, the first biological sample, and the second biological sample are a same sample type.

7. The method of claim 6, wherein each of the biological test sample, the first biological sample, and the second biological sample are urine samples or derived from urine samples.

8. The method of claim 1, wherein the first biological sample and the second biological sample are collected from different subjects.

9. The method of claim 1, wherein the first biological sample is collected at a first time point and the second biological sample is collected at a second time point.

10. The method of claim 9, wherein the first time point and the second time point differ by at least about 0.5 hours, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 36 hours, 48 hours, 60 hours or 72 hours.

11. The method of claim 1, further comprising calculating the relative dilution of the biological test sample with a derived relative dilution factor.

12. The method of claim 1, wherein each of the at least one analyte from the biological test sample is a target protein.

13. The method of claim 1, wherein the level of the analyte in the first dilution series is determined in each of at least 4, 5, 6, 7, 8, 9, 10, 11, 12, 13, 14, 15 or 16 different dilutions in the first dilution series and/or the level of the analyte in the second dilution series is determined in each of at least 4, 5, 6, 7, 8, 9, 10, 11, 12, 13, 14, 15 or 16 different dilutions in the second dilution series.

14. The method of claim 1, wherein the composite dilution model is independently selected from a linear regression model, a LOESS curve fitting model, a non-linear regression model, a spline fit model, a mixed effects regression model, a fixed effects regression model, a generalized linear model, a matrix decomposition model, and a four parameter logistic regression (4PL) model.

15. The method of claim 1, wherein the reference value is within a linear range of the first dilution series or the composite dilution model.

16. The method of claim 15, wherein the reference value is a center point of the linear range.

17. The method of claim 1, wherein the level of the analyte in the first dilution series and the level of the analyte in the second dilution series are measured by an assay that uses an aptamer, an antibody, a mass spectrophotometer or a combination thereof.

18. The method of claim 1, wherein a dilution factor for each of the first dilution series and the second dilution series is a constant dilution factor or wherein the dilution factor for each of the first dilution series and the second dilutions series is an exponential or logarithmic dilution factor.

19. The method of claim 18, wherein the dilution factor for each of the first dilution series and the second dilutions series is at least a two-fold, a three-fold, a four-fold, a five-fold, a six-fold, a seven-fold, an eight-fold, a nine-fold, or a ten-fold dilution.

20. The method of claim 1, comprising:
- receiving, by one or more processing devices, analyte measurement data from a plurality of different biological samples;
- analyzing, by one or more of the processing devices, respective analyte measurements for each one of a plurality of selected analytes in the analyte measurement data; and
- generating, by one or more of the processing devices, the composite dilution model for each one of the selected analytes based on the analyzing.

* * * * *

UNITED STATES PATENT AND TRADEMARK OFFICE
CERTIFICATE OF CORRECTION

PATENT NO. : 12,480,956 B2
APPLICATION NO. : 17/610927
DATED : November 25, 2025
INVENTOR(S) : Thomas Hraha Page 1 of 1

It is certified that error appears in the above-identified patent and that said Letters Patent is hereby corrected as shown below:

In the Claims

In Claim 1, Column 47, Line 27, "(AX)" should read --($\Delta$X)--
In Claim 1, Column 47, Line 29, "(AX)" should read --($\Delta$X)--

Signed and Sealed this
Sixth Day of January, 2026

John A. Squires
*Director of the United States Patent and Trademark Office*